United States Patent [19]

Hara et al.

[11] 4,085,090

[45] Apr. 18, 1978

[54] AROMATIC POLYMERS CONTAINING A NITROGEN-CONTAINING RING GROUP, AND PROCESS FOR PREPARATION THEREOF

[75] Inventors: Shigeyoshi Hara, Hino; Masao Senoo, Ehime; Koh Mori; Yutaka Taketani, both of Hino, all of Japan

[73] Assignee: Teijin Limited, Osaka, Japan

[21] Appl. No.: 581,933

[22] Filed: May 29, 1975

[30] Foreign Application Priority Data

May 31, 1974 Japan .................................. 49-60964

[51] Int. Cl.$^2$ ...................... C08G 71/04; C08G 73/18; C08G 73/06

[52] U.S. Cl. ..................................... 260/49; 260/2 R; 260/2 M; 260/2 S; 260/2 P; 260/47 CP; 260/47 CB; 260/47 CZ; 260/30.4 N; 260/30.8 DS; 260/31.2 N; 260/61; 260/77.5 C; 260/77.5 A; 260/77.5 B; 260/77.5 AA; 260/77.5 D; 260/78 R

[58] Field of Search .............. 260/2 R, 47 CP, 47 CB, 260/47 CZ, 61, 77.5 C, 2 P, 2 S, 2 M, 77.5 A, 77.5 B, 77.5 AA, 77.5 D, 78 R, 49

[56] References Cited

U.S. PATENT DOCUMENTS

| | | | |
|---|---|---|---|
| 3,630,994 | 12/1971 | Culbertson | 260/49 |
| 3,708,439 | 1/1973 | Sayigh et al. | 260/49 |
| 3,920,768 | 11/1975 | Kwiatkowski | 260/49 |

*Primary Examiner*—V. P. Hoke

*Attorney, Agent, or Firm*—Sherman & Shalloway

[57] ABSTRACT

Novel aromatic polymers containing a nitrogen-containing ring group which comprises at least 30 mol% of a recurring unit of the formula

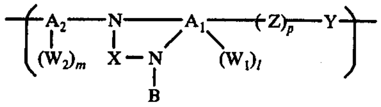

Preferably,, the nitrogen-containing ring group

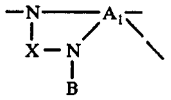

is a benzimidazolone, benzimidazolthione, benzimidazole, quinoxalidinedione, benzotriazole, benzothiazolidine, benzothiadiazolidine-S-oxide, benzothiadiazolidine-S-dioxide, benzodithiadiazine, benzodiazophosphole-p-oxide, benzodiazophosphole, benzodiazosilole, or benzodiazoborole ring.

These polymers are soluble in various polar solvents. They find a wide range of applications ascribable to these ring groups, for example, as thermally stable resins and permselective membranes. These polymers can be prepared by reacting substantially linear aromatic polymers comprising at least 30 mol% of a recurring unit of the formula

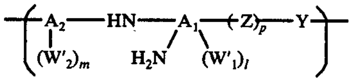

with reagents capable of forming 5- or 6-membered nitrogen-containing rings.

25 Claims, No Drawings

AROMATIC POLYMERS CONTAINING A NITROGEN-CONTAINING RING GROUP, AND PROCESS FOR PREPARATION THEREOF

This invention relates to a novel aromatic polymer containing a nitrogen-containing ring group, and a process for preparing the novel atomatic polymer. The invention also relates to a permselective membrane composed mainly of the novel aromatic polymer.

More specifically, this invention relates to a novel nitrogen-containing aromatic polymer comprising in the main polymer chain a nitrogen-containing ring group of the formula

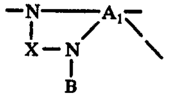
(a)

wherein the dotted line represents the presence or absence of a bond; $A_1$ is an aromatic group; the two nitrogen atoms bonded to $A_1$ are both attached to the nucler carbon atoms at the ortho-position of the aromatic group represented by $A_1$; B represents a hydrogen atom or a bond with X in which case N-X forms a double bond; and X is an atomic grouping which forms a 5-membered or 6-membered ring together with the above two nitrogen atoms and the two carbon atoms at the ortho-position of $A_1$ to which these two nitrogen atoms are attached.

and to a process for preparing the novel nitrogen-containing aromatic polymer.

These nitrogen-containing aromatic polymers are useful as thermally stable and hydrophilic polymers, and also as substrates of permselective membranes.

It has previously been known that polybenzimidazoles are useful for such applications as thermally stable fibers, adhesives, films, and permselective membranes because of their superior thermal stability and unique hygroscopicity. However, the known polybenzimidazoles are only those having a model structure composed of the following structural units (B-1) and (B-2)

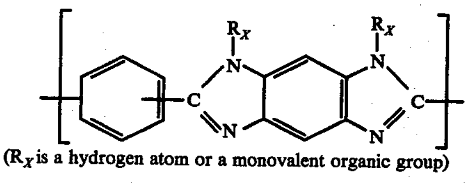
(B-1)

($R_X$ is a hydrogen atom or a monovalent organic group)

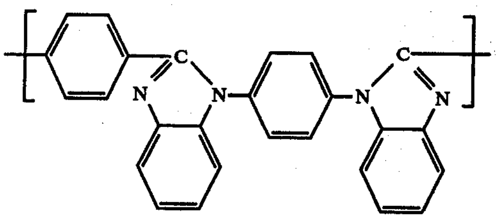
(B-2)

Polymers containing in the main chain a nitrogen-containing 5-membered ring or nitrogen-containing 6-membered ring group of the following formula, which includes a benzimidazole ring,

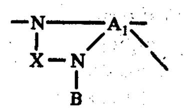
(a)

wherein $A_1$, X, B and the dotted line are the same as defined above, have not been known in the past. In contrast, the present invention has made it possible to produce polymers which contain the nitrogen-containing 5-membered ring or nitrogen-containing 6-membered ring group of formula (a).

The novel nitrogen-containing polymer of this invention is characterized in that at least 30 mol% of its total recurring units consists of at least one recurring unit of the following formula

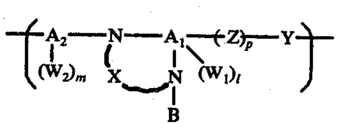
(I)

wherein $A_1$ is an aromatic group having a valence of (3 + $l$), and the two nitrogen atoms, Z and $W_1$ are all bonded to the nuclear carbon atoms of the aromatic group $A_1$; $A_2$ is an organic group having a valence of (2 + $m$); Z is $-SO_2-$ or —CO—; $p$ is 0 or 1, and when $p$ is 0, $-A_1-$ is directly bonded to Y; Y is —O— or

in which $R_1$ is a hydrogen atom or a monovalent hydrocarbon residue, and the two nitrogen atoms bonded to $A_1$ are bonded to the nuclear carbon atoms at the ortho-position of the aromatic group $A_1$; B is a hydrogen atom or a bond with X in which case N-X forms a double bond; X is an atomic grouping which forms a 5-membered or 6-membered ring together with the two nitrogen atoms and the two carbon atoms at the ortho-position of the aromatic group $A_1$ to which these nitrogen atoms are attached; $l$ and $m$ are identical or different and each represent an integer of 0 to 3; when $p$ is 0, Y is

and one of $W_1$ groups is bonded to the nuclear carbon atom at the ortho-position of the aromatic group $A_1$ together with Y, the $W_1$, Y and $A_1$ can form a 5-membered or 6-membered ring same as

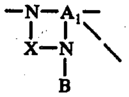

in which all symbols are the same as defined above and the dotted line represents the presence or absence of a bond; and when $W_1$ does not form the 5- or 6-membered ring, $W_1$ and $W_2$ are identical or different and represent at least one group selected from a primary amino group and mono- and disubstituted nitrogen-containing groups derived from the primary amino group.

Suitable atomic groupings of formula (a) included in the formula (I) above are the two nuclear carbon atoms at the ortho-position of the aromatic group $A_1$, the two nitrogen atoms bonded to these nuclear carbon atoms, and groupings that come within the definition of X above and form 5- or 6-membered rings through one or two of carbon, nitrogen, sulfur, phosphorus, oxygen, silicon and boron atoms.

Especially preferred nitrogen-containing ring groups of formula (a) are:

(a-1) 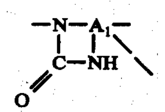 (benzimidazolone ring)

(a-2) 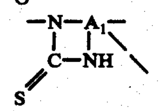 (benzimidazolthione ring)

(a-3) 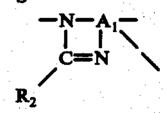 (benzimidazole ring)

($R_2$ is a hydrogen atom or an organic group having a valence of 1 to 4)

(a-4) 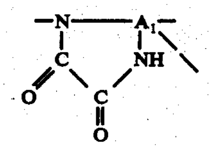 (quinoxalidinedione ring)

(a-5) 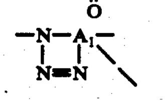 (benzotriazole ring)

(a-6) 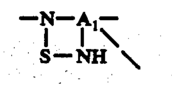 (benzothiazolidine ring)

(a-7) 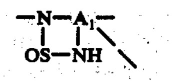 (benzothiadiozolidine-S-oxide ring)

(a-8) 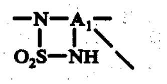 (benzothiadiazolidine-S-dioxide ring)

(a-9) 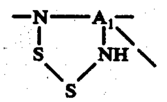 (benzothiadiazine ring)

(a-10) 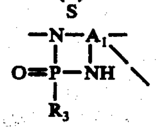 (benzodiazophosphole-P-oxide ring)

($R_3$ is an organic group having a valence of 1 to 4)

(a-11) 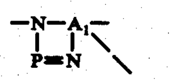 (benzodiazophosphole ring)

(a-12) 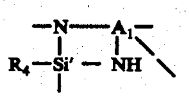 (benzodiazosilole ring)

and (a-13) 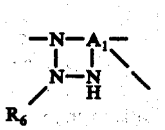 (benzodiazoborole ring)

(In the formulae (a-12) and (a-13), $R_4$, $R_5$ and $R_6$ are identical or different, and $R_4$ represents a hydrogen atom or a monovalent organic group, and $R_5$ and $R_6$ are each an organic group having a valence of 1 to 4).

When $R_2$, $R_3$, $R_5$ or $R_6$ is an organic group having a valence of at least 2, each end is bonded in principle to carbon, phosphorus, silicon or boron to which the nitrogen atom is attached, thereby to form an intermolecular bridging group.

In the case of a linear polymer, it is necessary that $R_2$ should be a hydrogen atom or a monovalent organic group, and $R_3$, $R_5$ and $R_6$ are each monovalent organic group. In the case of a cross-linked polymer, too, not all of organic groups, $R_2$, $R_3$, $R_5$ and $R_6$ need to have a valence of at least 2. But in many cases, it is preferred for the preparation and properties of the polymer that at least a part of them is a group having a valence of at least 2, and the remainder are monovalent groups.

Incidentally, when $R_1$ to $R_6$ are organic groups, they generally have 1 to 30, preferably 1 to 20, carbon atoms, and are composed mainly of an aliphatic, aromatic, alicyclic or heterocyclic group or combinations of these which may contain an inert substituent such as nitro, halogen or alkoxy.

Polymers containing the benzimidazolone ring (a-1), the benzimidazolthione ring (a-2), or the benzimidazole ring (a-3), especially the groups (a-1) or (a-3), are especially useful.

In the above formula (I), $A_1$ is preferably a group having a valence of $(3 + l)$ composed mainly of an aromatic group preferably having 6 to 50 carbon atoms, especially 6 to 45 carbon atoms, and may contain a substantially inert substituent such as nitro, alkoxy or halogen in addition to $W_1$. Likewise, $A_2$ in formula (I) is preferably an organic group containing preferably 2 to 50 carbon atoms, especially 2 to 30 carbon atoms, composed mainly of an aromatic, aliphatic or alicyclic group or combinations of these. $A_2$ may also contain an inert substituent such as exemplified above in addition to $W_2$. More specific preferred examples of $A_1$ and $A_2$ will be described hereinbelow.

When Y is

, $R_1$ is preferably a hydrogen atom, and when $R_1$ is a monovalent hydrocarbon residue, it is preferably an alkyl group containing 1 to 3 carbon atoms.

In the above formula (I), $W_1$ and $W_2$ are identical or different and each represent a least one group selected from the group consisting of a primary amino group ($-NH_2$) and mono- and di-substituted nitrogen-containing groups derived from the primary amino group. Suitable $W_1$ and $W_2$ groups are selected from the following groups:

(i) $-NH_2$, (ii) 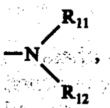, (iii) 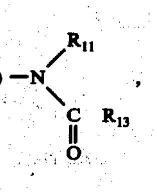,

-continued (iv) 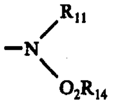, (v) 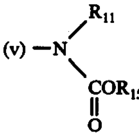, (vi) 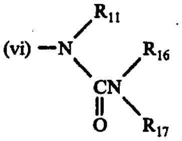

(vii) 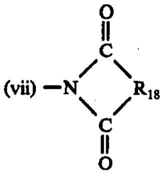

and (viii) groups formed by the reaction of the primary amino group with nitrogen-containing ring forming reagents to be described hereinbelow.

In the above formulae (i) to (vii), $R_{11}$, $R_{13}$, $R_{16}$ and $R_{17}$ are identical or different and each represent a hydrogen atom or an organic group containing 1 to 20 carbon atoms and in principle having a valence of 1 (which may partly contain a group having a valence of 2 to 4); $R_{12}$ and $R_{15}$ are organic groups containing 1 to 20 carbon atoms and in principle having a valence of 1; $R_{14}$ is an organic group containing 1 to 20 carbon atoms and in principle having a valence of 1, or a hydroxyl group; $R_{18}$ is a divalent organic group containing 1 to 20 carbon atoms; and $R_{11}$ can be bonded to each of $R_{12}$, $R_{13}$, $R_{14}$, $R_{15}$ and $R_{16}$, and $R_{16}$ to $R_{17}$, directly or through a hetero atom. $R_{11}$ and $R_{16}$ are preferably a hydrogen atom, and $R_{13}$, $R_{14}$, $R_{15}$, and $R_{17}$ are preferably an alkyl or alkylene group containing 1 to 8 carbon atoms, or a mono- or divalent, especially monovalent, aromatic group composed mainly of a benzene ring with 6 to 15 carbon atoms. Preferably, $R_{18}$ is an alkylene or alkenylene group containing 2 to 6 carbon atoms or an aromatic group composed mainly of a benzene ring with 6 to 15 carbon atoms and having a valence of 2 to 4, especially 2. Suitable $R_{13}$, $R_{15}$, $R_{16}$ and $R_{17}$ are the residues of benzoimidazolone-forming or benzimidazole-forming reagents to be described hereinbelow.

Especially preferred $W_1$ and/or $W_2$ groups are (i) a primary amino group, (iii) a carbonamide group, (iv) a sulfonamide group, (v) a urethane group, (vi) a urea group, and (vii) an imide group.

The characteristic feature of the polymer of this invention is that the nitrogen-containing cyclic group of formula (a) is present in its main chain in the form of a recurring unit of formula (I). Generally, in order to have the polymer fully exhibit its characteristics ascribable to its structure, it is necessary and sufficient that the recurring unit of formula (I) be contained in an amount of at least 30 mol% of the entire recurring units. More preferably, the content of the recurring unit of formula (I) is at least 50 mol%. Especially when it is contained in an amount of at least 80 mol%, the characteristics of the polymer of this invention can generally be exhibited fully satisfactorily in spite of the structure of the remainder of the recurring units.

It has been found that a polymer composed of at least 30 mol% of the recurring unit of formula (I) and a specific copolymer component is advantageous from the standpoint of both the method of its preparation and its use, and can find a wide range of applications.

Such a polymer is an aromatic polymer containing a nitrogen-containing cyclic group, which comprises 1. 30 to 100 mol%, especially 30 to 95 mol%, especially 30 to 80 mol%, based on the entire recurring units, of the recurring unit of formula (I), and 2. 0 to 70 mol%, especially 5 to 70 mol%, particularly 20 to 70 mol%, based on the entire recurring units, of at least one recurring unit selected from the group consisting of 2-A. an unsubstituted or substituted amino-containing recurring unit of the formula

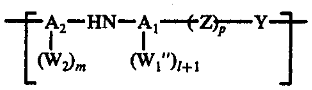 (II)

wherein $A_1$, $A_2$, Z, Y, *p*, *l* and *m* are the same as defined in formula (I); $W''_1$ and $W_2$ are identical or different and each represent at least one group selected from the group consisting of a primary amino group and mono- and di-substituted nitrogen-containing groups derived from the primary amino group, and 2-B. a third recurring unit of the formula

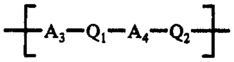 (III)

wherein $A_3$ and $A_4$ are identical or different, and each represent an organic group having a valence of 2 to 4; and $Q_1$ and $Q_2$ are identical or different and represent a group selected from the class consisting of (c-1) 

(c-2) 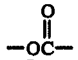

(c-3) 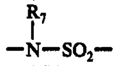

(c-4) $-OSO_2-$ (c-5) 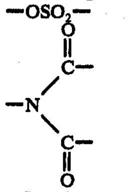

(c-6) 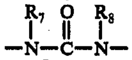

(c-7) 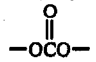

and (c-8) 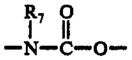

in which $R_7$ and $R_8$ are identical or different and each represent a hydrogen atom, a monovalent or divalent hydrocarbon residue or a mere bond, with the proviso that when these groups represent a divalent hydrocarbon residue or a bond, they can be bonded to $A_3$ or $A_4$, or $R_6$ and $R_7$ may be bonded to each other.

Preferred $W''_1$ groups are the same as those exemplified with regard to $W_1$. $A_3$ and $A_4$ are generally the same in definition as

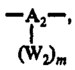, and the preferred species are also the same. Especially preferred species of $Q_1$ and $Q_2$ are groups (c-1), (c-2), (c-3), (c-4) and (c-5), especially the group (c-1). Preferred species of $R_7$ and $R_8$ are a hydrogen atom or a lower alkyl or alkylene group containing 1 to 2 carbon atoms.

More preferred species of the aromatic polymer containing a nitrogen-containing cyclic group in accordance with this invention comprise 30 to 100 mol%, based on the entire recurring units, of (I-A) a recurring unit containing a nitrogen-containing group expressed by the following formula

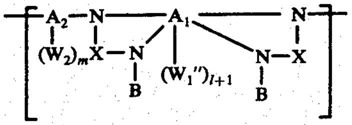

(I-A)

wherein $A_1$, $A_2$, $W_2$, $m$, $W_1$, $l$, X and B are the same as defined in formula (I), with the proviso that $1 - 1 \geqq 0$, and/or (I-B) a recurring unit containing a nitrogen-containing cyclic group expressed by the following formula

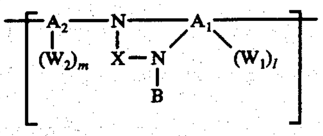

(I-B)

wherein $A_1$, $A_2$, $W_1$, $W_2$, $m$, 1, Y, X and B are the same as defined in formulae (I) and (I-A) above.

The remainder of the recurring units of the above polymer is preferably at least one recurring unit selected from the group consisting of an unsubstituted or substituted amino-containing recurring unit expressed by the following formula

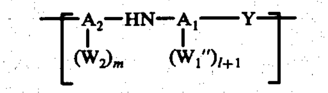

(II-A)

wherein $A_1$, $A_2$, Y, $W''_1$, 1, $W_2$ and $m$ are the same as defined in formula (II) above, and the recurring unit of formula (III).

In order to have the polymer exhibit its characteristics ascribable to the above-nitrogen-containing cyclic group, the content of the recurring units of formula (I-A) and/or (I-B) is preferably at least 50 mol%, more preferably at least 80 mol%. Especially preferably, the content of the recurring unit of formula (I-A) alone is at least 30 mol%, especially at least 50 mol%.

An especially preferred species of $A_1$ in the above formulae (I), (I-A), (I-B), (II) and (II-A) is at least one tetravalent aromatic group expressed by the following formula

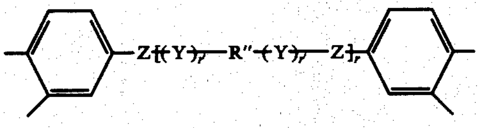

($A_1$-1)

wherein R'' represents an organic group containing 2 to 30 carbon atoms or two divalent alkylene groups; Z is —CO— or —$SO_2$—; Y is —O— or

with the proviso that when R'' represents two alkylene groups, $r$ is 1 and Y is

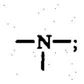

and $r$ and $r'$ are 1 or 0.

When Y is

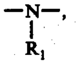

$R_1$ is preferably a hydrogen atom, and when $R_1$ is a monovalent hydrocarbon residue, it is preferably an alkyl group containing 1 to 3 carbon atoms. Especially preferred species of R'' are an aromatic group containing 6 to 15 carbon atoms or a piperazine residue (corresponding to two ethylene and/or propylene groups). $R_1$ is most preferably a hydrogen atom. $A_2$ to be combined with ($A_1$-1) is preferably an organic group containing 2 to 30 carbon atoms, above all 6 to 16 carbon atoms, and $m$ is preferably 0.

According to this invention, the nitrogen-containing polymer comprising at least 30 mol%, based on the entire recurring units, of the recurring unit of formula (I) is prepared by reacting a substantially linear aromatic polymer containing a primary amino group comprising at least 30 mol%, based on the entire recurring units, of at least one recurring unit of the following formula

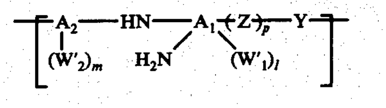

(IV)

wherein $A_1$ is an aromatic group having a valence of $(3 + l)$, and the two nitrogen atoms, Z and $W'_1$ in the above formula are all bonded to the nuclear carbon atoms of the aromatic $A_1$; $A_2$ is an organic group having a valence of $(2 + m)$; Z is —$SO_2$— or —CO—; $p$ is 0 or 1, and when $p$ is 0, —$A_1$— is directly bonded with Y; Y is —O— or

in which $R_1$ is a hydrogen atom or a monovalent hydrocarbon residue; the —$NH_2$ group bonded to $A_1$ is bonded together with the —NH— group to the nuclear carbon atom at the ortho-position of the aromatic group $A_1$; $W'_1$ and $W'_2$ are identical or different and each represent at least one group selected from the group consisting of a primary amino group and mono- and di-substituted nitrogen-containing groups derived from the primary amino group; and 1 and $m$ are identical or different and each represent an integer of 0 to 3, with a reagent capable of reacting with the secondary and primary amino groups bonded to the aromatic group $A_1$ in the formula (IV) above to form a 5- or 6-membered ring. Preferably, such a reagent capable of reacting with the secondary and primary amino groups bonded to the aromatic group $A_1$ in the formula (IV) to form a 5- or 6-membered ring is an acid containing carbon, nitrogen, sulfur, phosphorus, silicon or boron as a central element of the ring-forming atoms and also containing a group capable of being split off together with the hydrogen atoms of the primary and secondary amino groups, or a functional derivative thereof. More preferably, the reagent is one capable of introducing each of the following atomic groupings between the two nitrogen atoms by reaction with the primary amino group ($H_2N$—) and the secondary amino group (—HN') bonded to the two nuclear carbon atoms at the ortho-position of the aromatic group $A_1$ in the formula (IV), which is selected from the following group:

b-1. a benzimidazolone-forming agent capable of introducing

b-2. a benzimidazolethione-forming agent capable of introducing

b-3. a benzimidazole-forming agent capable of introducing

in which $R_2$ is a monovalent organic group, preferably an organic group containing 1 to 20 carbon atoms, b-4. a quinoxalinedione-forming agent capable of introducing

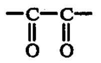

b-5. a benzotriazole-forming agent capable of introducing —N=, b-6. a benzothiazolidine-forming agent capable of introducing —S—, b-7. a benzothiazolidine-S-oxide-forming agent capable of introducing

b-8. a benzothiazolidine-S-dioxide-forming agent capable of introducing —$SO_2$—, b-9. a benzodithiadiazine-forming agent capable of introducing —S—S—, b-10. a benzodiazophosphosphole-P-oxide-forming agent capable of introducing

in which $R_3$ is a monovalent organic group, preferably having 1 to 20 carbon atoms, b-11. a benzodiazophosphole-forming agent capable of introducing —P=N—, b-12. a benzodiazosilole-forming agent capable of introducing

in which $R_4$ and $R_5$ are identical or different and each represent a monovalent organic group preferably containing 1 to 20 carbon atoms, and b-13. A benzodiazoborole-forming agent capable of introducing

in which $R_6$ is a monovalent organic group preferably containing 1 to 20 carbon atoms. Especially advantageously, the atomic grouping of formula (a)

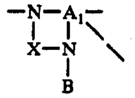

in the formula (I) forms at least one nitrogen-containing cyclic group selected from the following, correspondingly to the above agents (b-1) to (b-13)

(a-1) 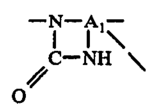 (benzimidazolone ring)

(a-2) 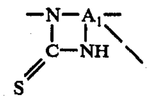 (benzimidazolthione ring)

(a-3) 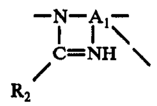 (benzimidazole ring)

($R_2$ is a monovalent organic group)

(a-4) 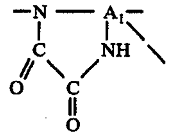 (quinoxalinedione ring)

(a-5)  (benzotriazole ring)

(a-6) 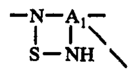 (benzothiazolidine ring)

-continued (a-7) 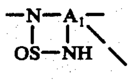 (benzothiadiozolidine-S-oxide ring)

(a-8)  (benzothiadiazolidine-S-dioxide ring)

(a-9) 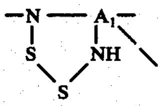 (benzodithiadiazine ring)

(a-10) 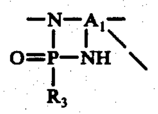 (benzodiazophosphole-P-oxide ring)

($R_3$ is a monovalent organic group)

(a-11) 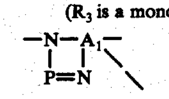 (benzodiazophosphole ring)

(a-12) 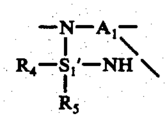 (benzodiazosilole ring)

($R_4$ and $R_5$ are identical or different, and represent a monovalent organic group)

(a-13) 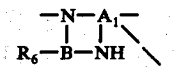 (benzodiazoborole ring)

($R_6$ is a monovalent organic group)

A more preferred process for preparing the polymer of this invention comprises reacting a substantially linear aromatic polymer containing a primary amino group and having at least 30 mol%, based on the entire recurring units of at least one recurring unit expressed by the following formula

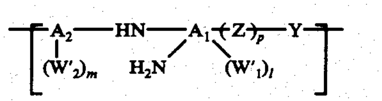 (IV)

wherein $A_1$, $A_2$, Z, Y, l, *m*, *p*, $W'_1$ and $W'_2$ are the same as defined in the formula (IV), with a reagent capable of forming the 5- or 6-membered ring described above in an inert solvent capable of swelling or dissolving said polymer, thereby to convert at least a part of the recurring unit of formula (IV) to a recurring unit of the following formula

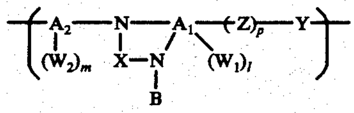 (I)

wherein $A_1$, $A_2$, Z, Y, l, *m*, *p*, $W_1$, $W_2$, X and B are the same as defined above, or to convert at least a part of the recurring unit of formula (IV) to a recurring unit of the following formula

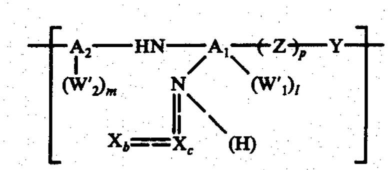 (IV-a)

wherein $A_1$, $A_2$, Z, Y, l, *m*, *p*, $W'_1$, and $W'_2$ are the same as defined in formula (IV); the dotted line represents the presence or absence of a bond; one of the dotted line between $X_c$ and N and the dotted line between N and (H) represents a bond, and when the dotted line between $X_c$ and N represents a bond, the hydrogen atom bonded to N is split off; $X_b$ is a reactive group capable of reacting with the secondary amino group (—NH—) bonded to the aromatic group $A_1$ to split off $HX_b$ or $H_2X_b$; and $X_c$ represents a group selected from the following (b-1) 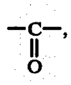, (b-2) 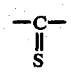

(b-3) 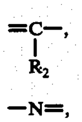, (b-4) 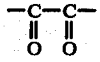

(b-5) —N=, (b-6) —S—

(b-7) , (b-8) $—SO_2—$ (b-9) —S—S, (b-10) 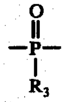

(b-11) —P=N— and (b-12) 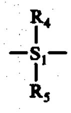

or an atomic grouping which forms a group selected from the above class upon splitting off $HX_b$ or $H_2X_b$, followed by heating, or adding an agent for promoting the splitting off of the above $HX_b$ or $H_2X_b$ to convert the recurring unit of formula (IV-a) to the recurring unit of formula (I).

When $W'_1$ and/or $W'_2$ can react with the above ring-forming reagent, they are converted to their reaction products with the above reagents in the course of the above reaction. For example, when $W'_1$ and/or $W'_2$ is a primary amino group, and the ring-forming reagent is a carboxylic acid halide, an acid amide group is formed. Such a reaction product is also embraced by the definition of the derivatives of the amino group, and represented by $W_1$ and $W_2$. Accordingly, $W_1$ and $W_2$ are the same as $W'_1$ and $W'_2$, or reaction products of them with ring-forming agents.

Preferably, at least a part of $W'_1$ and $W'_2$, above all $W'_1$, in the above formula (IV-a) is contained in the form of

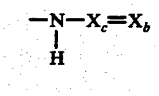

as a result of its reaction with the ring-forming agent. Especially when p is 0, the presence of the above intermediate-state group for ring formation as $W_1$ at the ortho-position of $A_1$ to which Y is bonded is necessary for the formation of the recurring unit of formula (I-A).

Polymers containing a nitrogen-containing ring group can also be prepared by reacting an aromatic polymer containing a primary amino group and consisting of (1) 30 to 100 mol%, based on the entire recurring units, of a recurring unit of formula (IV) and (2) 0 to 70 mol%, based on the entire recurring units, of at least one recurring unit selected from the group consisting of the recurring units of formula (II) and (III), with the above-described ring-forming agents.

When the copolymer component (2) contains a group reactive with the ring-forming agents, this group is sometimes converted to a group resulting from the reaction of it with the above ring-forming agent. When the reactive group is an amino group or a group derived from it, the conversion is the same as the conversion of $W'_1$ to $W''_1$ or $W_1$.

The primary amino-containing polymers containing the recurring unit of formula (IV), the process for their preparation, the process for preparing nitrogen-containing cyclic polymers and their characteristics and application will be described in detail hereinbelow.

[I] Aromatic polymers containing a primary amino group and having a recurring unit of formula (IV), and the process for their preparation:

(I-a) Primary amino-containing aromatic polymers of formula (IV)

These polymers contain at least 30 mol%, based on the entire recurring units, of the recurring unit of formula (IV)

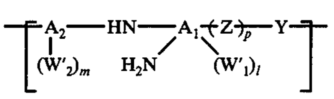
(IV)

The bond units and substituents consituting the recurring unit of formula (IV) are described below.

In the formula (IV), $A_1$ is an aromatic group having a valence of (3 + 1), advantageously containing 6 to 50 carbon atoms, and preferably 6 to 45 carbon atoms. The ring which forms this aromatic group includes not only a wholly conjugated aromatic ring group such as a benzene, naphthalene, anthracene, biphenyl or terphenyl ring, but also a polynuclear aromatic ring group resulting from the bonding of at least two identical or different wholly aromatic ring groups to each other through various bridging group.

Suitable bridging groups for bridging at least two of such wholly aromatic ring groups include, for example, at least one member selected from the group consisting of

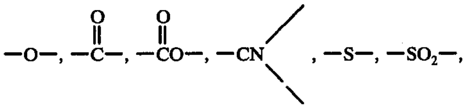

-continued

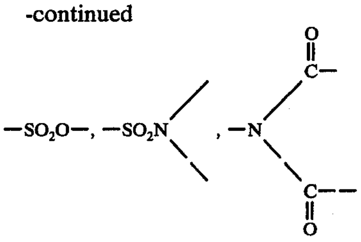

and alkylene groups containing 1 to 6 carbon atoms (in the above formulae, the dotted line represents the presence of a bond or a hydrogen atom).

Especially preferred primary amino-containing aromatic polymers ae those in which

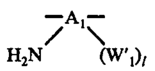

is expressed by the following formula (V)

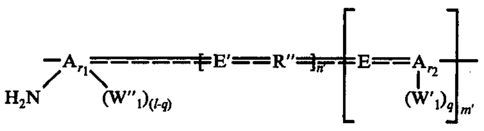

wherein $Ar_1$ is an aromatic ring group having a valence of $(1-q+3)$ or $(1-q+4)$ and containing 6 to 20 carbon atoms; $Ar_2$ is an aromatic ring group having a valence of $(q+2)$ or $(q+3)$ and containing 6 to 20 carbon atoms; $AR_1$ and $AR_2$ are identical or different; 1 and q are identical or different, and each represent an integer of 0 to 3, and 1 is not smaller than $q$; $m'$ and $n'$ each represent 0 or 1, and when $m'$ is 0, $n'$ is also 0; the dotted line represents the presence or absence of a bond; E and E' are identical or different non-aromatic bridging groups, preferably at least one bridging group selected from the class consisting of

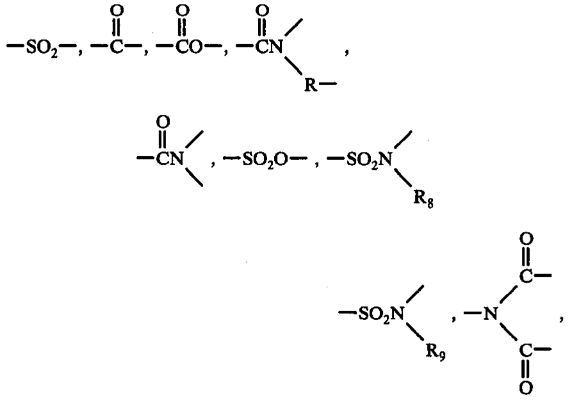

—O—, —S— and alkylene groups containing 1 to 6 carbon atoms, in which $R_8$ and $R_9$ are identical or different and each represent a hydrogen atom or an organic group containing 1 to 6 carbon atoms; and R" represents an organic group having a valence of 2 to 4 and containing 2 to 30 carbon atoms, or two divalent alkylene groups (preferred species of R" are generally the same as those of $A_2$ to be described). Especially preferably,

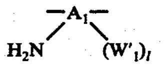

is expressed by the following formula m (V-B)

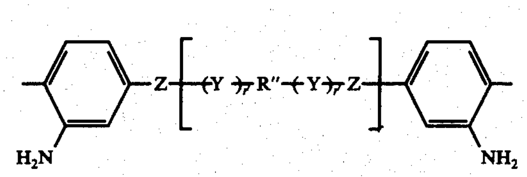

wherein Z, Y, R″, r, and r′ are the same as defined in the above formula ($A_1$-1). When the formula (V-B) is made to correspond to the formula (V), the following can be said:
when
r=1,

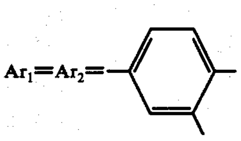

$E'=-(Z-Y)_{r'}$, $E=(Y)_{r'}Z-$, 1=q=1, $W'_1=-NH_2$, $n'=n'=1$.
When $r=0$
$Ar_1$, $Ar_2$, $W'_1$, $l$ and $q$ are the same, and E=Z, $m'=1$, $n'=0$.

Preferred species of $A_2$ in formula (IV) are organic groups containing 2 to 50 carbon atoms, especially 2 to 30 carbon atoms. Of these, especially preferred are

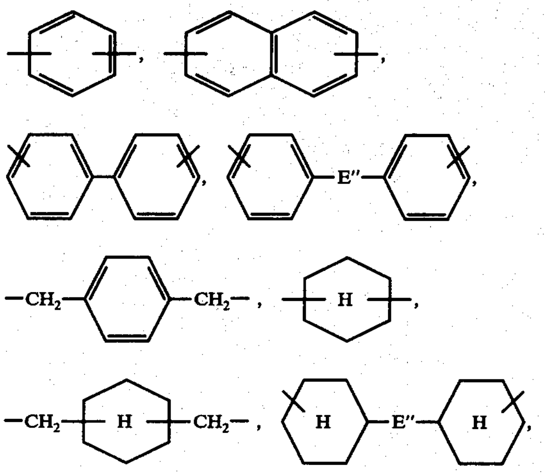

and alkylene groups containing 2 to 15 carbon atoms. E″ in the above formula is a non-aromatic bridging group, preferably at least one bridging group selected from the class consisting of

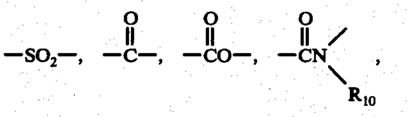

-continued

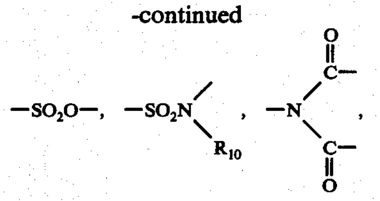

—O—, —S— and alkylene groups containing 1 to 6 carbon atoms ($R_{10}$is a hydrogen atom or an alkyl group containing 1 to 6, preferably 1 to 3, carbon atoms.)

Specific examples of preferred $A_2$ given above are divalent, but depending upon the value of m in $-(W_2)_m$, they can have a valence of 3 or more.

$W'_1$ and $W'_2$ in the formulae (IV) and (V) above are identical or different, and represent a primary amino group or mono- or di-substituted nitrogen-containing groups derived from the primary amino group. Examples of these groups are included within the examples of $W_1$ and $W_2$ already given hereinabove. Of these, at least one of primary amino ($-NH_2$), sulfonamide ($-NH-SO_2R_{14}$) and imide

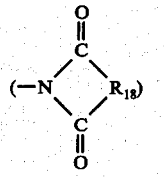

is preferred. The primary amino group is especially preferred. Preferred spcies of $R_{14}$ are alkyl groups with 1 to 3 carbon atoms and aromatic groups with 6 to 8 carbon atoms, and preferred species of $R_{18}$ are alkylene and alkenylene groups with 2 to 8 carbon atoms and aromatic groups with 6 to 15 carbon atoms.

(I-b) Process for preparing the primary amino-containing aromatic polymer of formula (IV)

The primary amino-containing aromatic polymer of formula (IV) can be prepared advantageously by the following method, for example.

A nitro-containing aromatic polymer (VI) comprising at least 30 mol%, based on the entire recurring units, of at least one recurring unit of the following formula

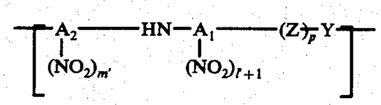

(VI)

wherein Z is $-SO_2-$ or —CO—; p is 0 or 1, and when p is 0, $A_1$ is directed bonded to —Y; $A_1$ is an aromatic group having a valence of (l + 3), and at least one nitro group bonded to $A_1$ is bonded to the nuclear carbon atom at the ortho-position of the aromatic group $A_1$ together with —HN—; $A_2$ is an organic group having a valence of (m + 2); Y is —O— or

in which $R_1$ is a hydrogen or a monovalent hydrocarbon residue; and 1′ and m′ are identical or different and each represent an integer of 0 to 3, is reduced to form a primary amino-containing aromatic polymer (IV') having a recurring unit of the following formula

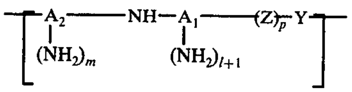

(IV')

wherein $A_1$, $A_2$, Z, *p* and Y are the same as defined in formula (VI); m and l are identical or different and each represent an integer of 0 to 3; on an average, *m'* is not less than *m* and l' is not less than l; and when *m'* is larger than *m* and/or l' is larger than l, $A_2$ and/or $A_1$ can contain nitro groups in the number corresponding to *m'-m* and/or l'-l.

This can be used directly as the polymer (IV), or by converting a part of the amino group bonded to $A_1$ and/or $A_2$ of formula (IV') to its derivative, this polymer can be made into a primary aminocontaining aromatic polymer of formula (IV). In this case, at least one primary amino group bonded to $A_1$ needs to be bonded to the nuclear carbon atom at the ortho-position of the aromatic group $A_1$ together with the —N— group.

The above-mentioned reducing method is most advantageous for commercial operations, but other methods can also be used.

The method for reducing the nitro-containing aromatic polymer of formula (VI) to convert at least a part of the substituent nitro group to an amino group may be any method which can reduce a nitro group to an amino group and does not adversely affect the formation of the primary amino-containing aromatic polymer.

For example, suitable methods include a method using a chemical reducing agent, and a catalytic hydrogenation method.

The method using a chemical reducing agent involves the use of, for example, a combination of a metal such as iron, zinc or tin or a low-valence metallic salt and an acid such as hydrochloric acid or an alkali, or only a sulfur compound such as sodium hydrosulfite or sodium sulfite.

Since this is the reduction of a polymer, it is preferable to carry out the reaction in the copresence of a solvent capable of dissolving the polymer or in the presence of a strong reducing agent which can perform the reduction even in a heterogenerous system. Suitable solvents that can be used for this purpose are N,N-disubstituted amide solvents which are inert under the reducing conditions, such as N-methyl pyrrolidone or dimethyl acetamide. Depending upon the type of the reducing agent, the presence of water sometimes causes the reaction to proceed favorably. Suitable strong reducing agents which can induce the reduction of the nitro group even in a heterogeneous system include, for example, sodium hydrosulfite. When not so strong a reducing agent such as lithium aluminum hydride or sodium borohydride is used in the present invention, there is a possibility that not only the nitro group, but also the arylenimine bond, arylenether bond or aromatic group will be hyrogenated. Hence, this requires a special care, and the method is used only in very special instances.

The catalytic hydrogenation method is performed in the presence of a catalyst usually employed in the catalytic hydrogenation of a nitro group to an amino group, for example, a noble metal such as platinum or a nickel, cobalt or copper-type catalyst. Preferably, the polymer is used as a homogeneous system resulting from the dissolving of the polymer in an inert aprotic polar solvent such as N-methyl pyrrolidone or dimethyl acetamide, or as a heterogeneous system such as a suspension. The proceeding of the reducing reaction can be confirmed by measuring the infrared absorption or ultraviolet absorption spectrum of the polymer. Severe reducing conditions are not preferred since they may cause the cleavage of the main chain of the polymer.

Primary amino-containing aromatic polymers having a recurring unit of formula (IV') can be obtained by reducing nitrocontaining aromatic polymers comprising at least 30 mol%, based on the entire recurring units, of at least one recurring unit expressed by formula (VI) by, for example, the methods described above.

The reduction may be carried out so that all the nitro groups are converted to amino groups, or some remain unreduced. In the latter case, primary amino-containing polymers containing unreduced nitro groups are obtained. So long as such polymers comprise at least 30 mol% of the recurring unit of formula (IV), they can be used for preparing the aromatic polymers of this invention containing a nitrogen-containing cyclic group.

Nitrogen-containing aromatic polymers comprising at least 30 mol%, based on the entire recurring units, of the recurring unit of formula (I) are prepared from the primary aminocontaining aromatic polymers comprising at least 30 mol%, based on the entire recurring units, of at least one recurring unit of formula (IV). Such primary amino-containing aromatic polymers may contain 0 to 70 mol%, based on the entire recurring units, of another recurring unit in addition to the recurring unit of formula (IV). Preferably, the other recurring unit is a third recurring unit of the following formula $$-\!\!\left[A_3-Q_1-A_4-Q_2\right]\!\!- \qquad \text{(III)}$$

wherein $A_3$ and $A_4$ are identical or different and each represent an organic group having a valence of 2 to 4; and $Q_1$ and $Q_2$ are identical or different, and represent a member selected from the group consisting of

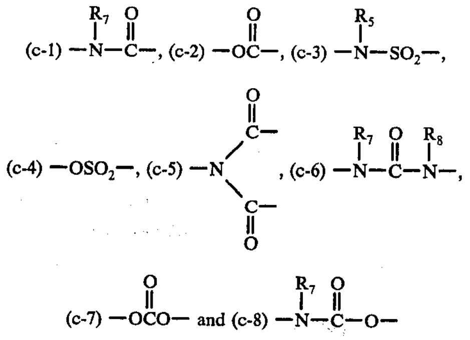

in which $R_7$ and $R_8$ are identical or different and each represent a hydrogen atom, a monovalent or divalent hydrocarbon residue or a mere bond, and when these groups represent a divalent hydrocarbon residue or a bond, they can be bonded to $A_3$ or $A_4$, or $R_7$ and $R_8$ can be bonded to each other.

$A_3$ and $A_4$ in the formula (III) are identical or different organic groups having a valence of 2 to 4, and specifically the same groups as defined with regard to

above can be used. In other words, they can have $W_2$ which is an amino group or its derivatives in addition to the $—A_2—$ skeletal structure.

(I-c) Preparation of nitro-containing aromatic polymers having the recurring unit of formula (VI)

The nitro-containing aromatic polymers comprising at least 30 mol%, based on the entire recurring units, of at least one recurring unit of the following formula

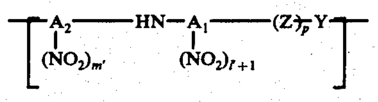 (VI)

wherein all the symbols are the same as defined above, are novel polymers discovered by the inventors of the present application and the method for their preparation is disclosed in detail in co-pending application Ser. No. 550,738 filed Feb. 18, 1975. The nitro-containing aromatic polymers can be produced basically by the method disclosed in the copending application, which is briefly described below.

These nitro-containing aromatic polymers or copolymers can be prepared by reacting aromatic dihalogen compounds of the following formula

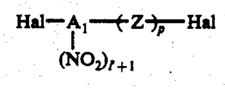 (VII)

wherein $A_1$, Z, $p$ and l′ are the same as defined above, and Hal represents a halogen atom, the two Hal's are identical or different, with difunctional compounds of the following formula

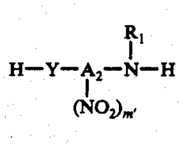 (VIII)

wherein all symbols are the same as defined above.

When the above reaction is carried out in the presence of a difunctional copolymer component of the following formula

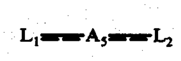 (IX)

wherein $A_5$ represents an organic group containing 2 to 30 carbon atoms and having a valence of 2 to 4 of two divalent alkylene groups; the dotted line represents the presence or absence of a bond; and $L_1$ and $L_2$ are identical or different and represent at least one member selected from the group consisting of

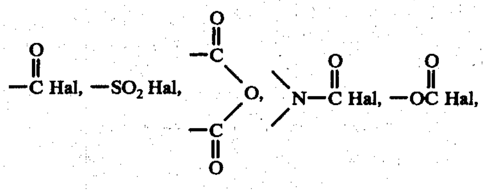

in which Hal represents a halogen atom, $—N{=}C{=}O$, salts of $>NH$ and $—NH_2$ (for example, inorganic or organic strong acid salts such as HCl or $H_2SO_4$ salts) and —OH, the nitro-containing aromatic copolymers can be prepared. Especially preferably, both $L_1$ and $L_2$ in formula (IX) are

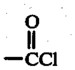

at the same time. Preferred species of $A_5$ substantially correspond with those of $A_2$ described hereinabove. When both $L_1$ and $L_2$ are

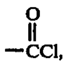

the difunctional copolymer component of formula (IX) reacts with the difunctional compound of formula (VIII) and is introduced as a copolymer component into the main chain of the nitro-containing polymer.

When $L_1$ and $L_2$ in formula (IX) are other than

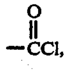

the difunctional copolymer component (IX) reacts with the difunctional compound (VIII) and/or the aromatic dihalogen compound (VII) and is introduced as a copolymer component into the main chain of the nitro-containing aromatic polymer. Furthermore, when for example, one of $L_1$ and $L_2$ is

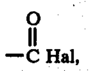

and the other is a salt of NH or $-NH_2$ or -OH, the difunctional copolymer component (IX) reacts with the difunctional compound (VIII) and/or the aromatic dihalogen compound (VII) while self-condensing, and introduced as a copolymer component into the main chain of the nitro-containing aromatic polymer.

The group $—A_5—$ in the difunctional copolymer component (IX) need not contain a nitro group, but may contain it as a pendant group.

By not using the above difunctional copolymer component (IX) at all, or using it in the reaction together with the aromatic dihalogen compound (VII) and the difunctional compound (VIII) in an amount not exceeding 70 mol% of the aromatic dihalogen compound, there can be obtained a nitro-containing copolymer composed of (1) 30 to 100 mol%, based on the entire recurring units, of a recurring unit of the following formula

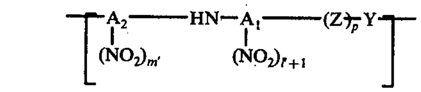

(VI)

wherein all the symbols have the same definitions as hereinabove given, and (2) 70 to 0 mol%, based on the entire recurring units, of a recurring unit of the following formula

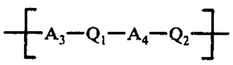

(III)

wherein all the symbols have the same definitions as hereinabove given.

Substantially linear nitro-containing polymers (VI) or copolymers have good solubility in solvents, and are advantageous for reducing at least a part, preferably the whole, of their nitro groups to amino groups. However, the above nitro-containing polymers (VI) or copolymers are not limited to linear polymers or copolymers, but may be those partially cross-linked, for example to an extent that they are gelled in solvent. By reducing such nitro-containing polymers or copolymers in the gelled state, their nitro groups can be converted to amino groups at least partially.

The specific method for preparing the above nitro-containing aromatic polymers (VI) or copolymers and the manufacturing conditions are described briefly below.

The aromatic dihalogen compound (VII) is reacted with the difunctional compound (VIII), with or without the difunctional copolymer component (IX), in such proportions that the desired mol ratio of the nitro-containing aromatic recurring unit of formula (VI) is obtained, in an inert organic solvent, for example, an organic aprotic polar solvent such as N-methyl pyrrolidone, dimethyl sulfoxide or tetramethylene sulfone, preferably in the presence of an acid acceptor such as sodium carbonate, lithium carbonate, calcium carbonate or triethylamine at a temperature of, say, 0° to 170° C. until the desired degree of polymerization is attained.

The resulting nitro-containing aromatic polymer (VI) or copolymer can be converted to the corresponding primary amino-containing aromatic polymer (IV) or copolymer by the above-described method for reducing a nitro group to an amino group.

(I-d) Monomers used for preparing the nitro-containing aromatic polymers having the recurring units of formula (VI) and copolymers thereof:

1. Examples of the aromatic dihalogen compounds of formula (VII) are as follows:

a. When p=O, and l'=O — 3:

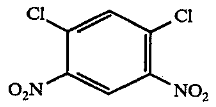
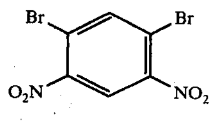

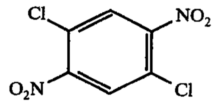
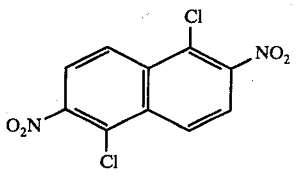

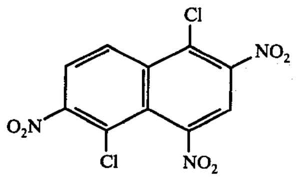
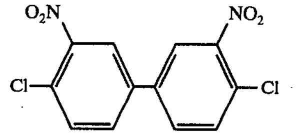

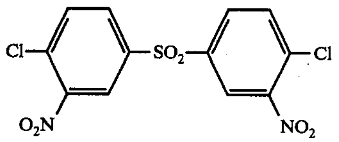

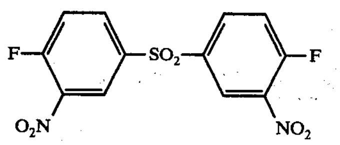
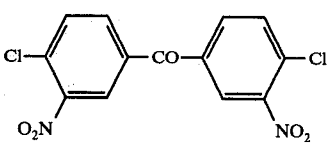

-continued
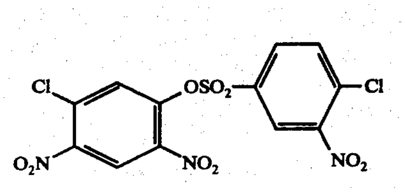
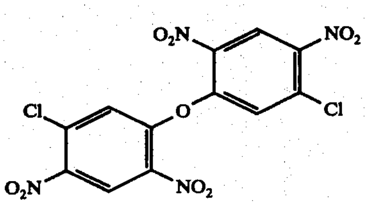
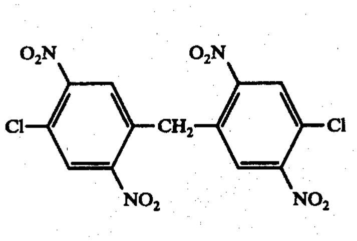
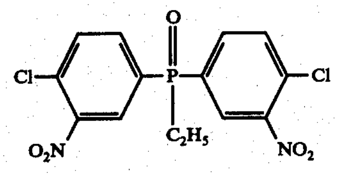
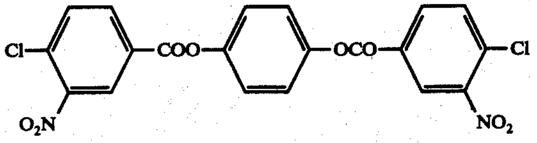
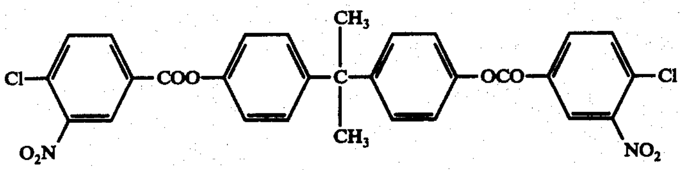
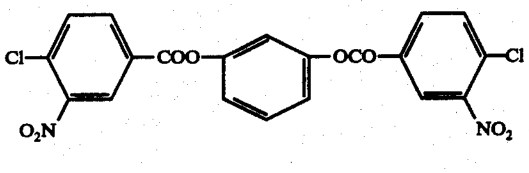
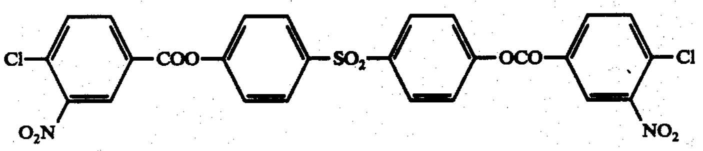
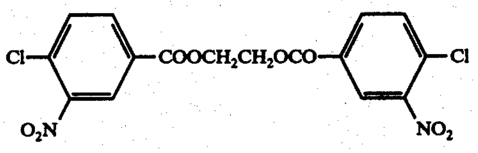
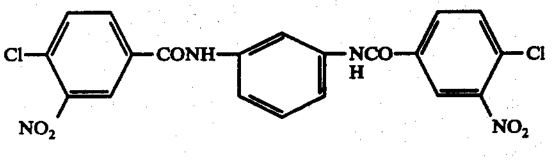
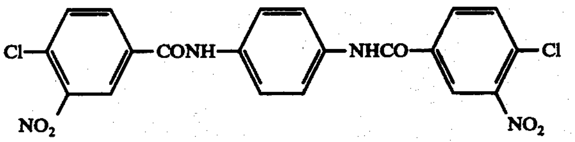
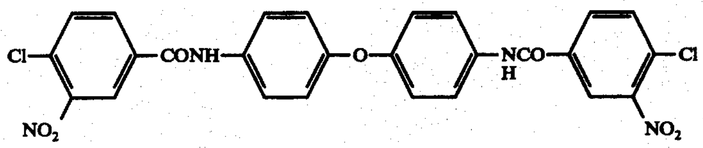

-continued
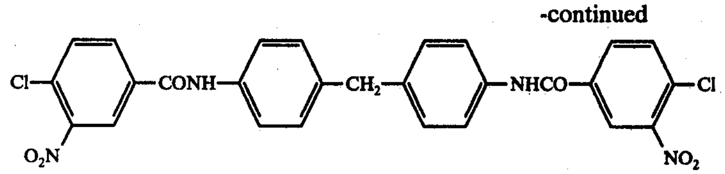
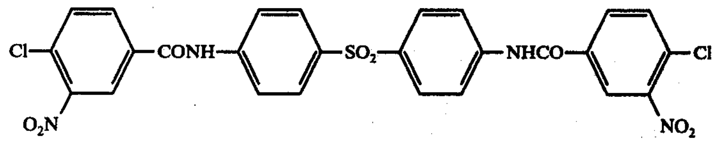
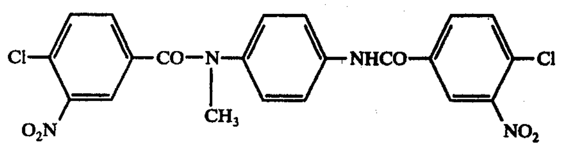
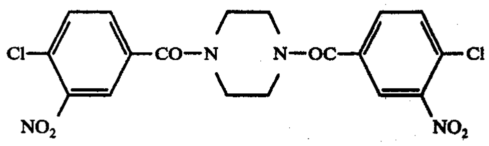
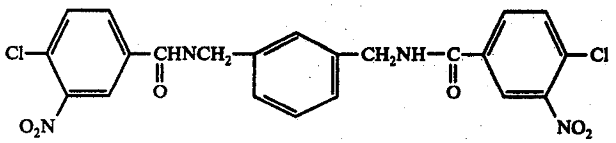
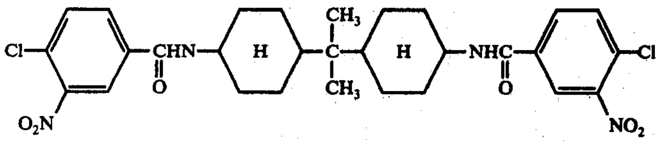
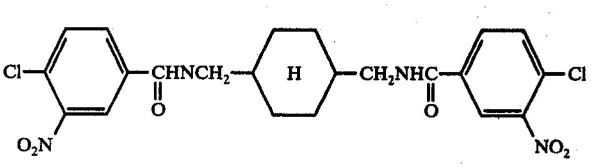
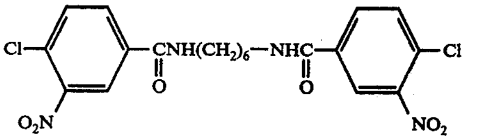
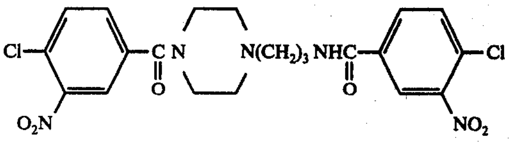
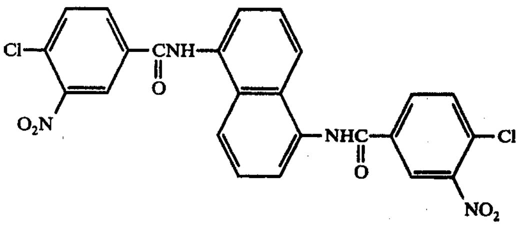

-continued
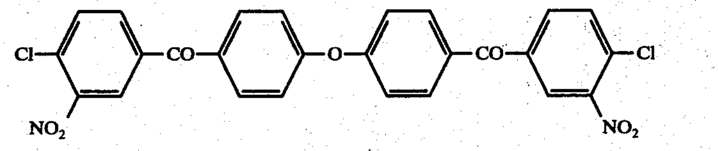
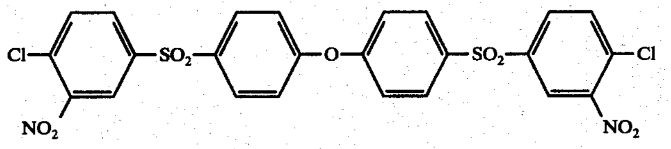
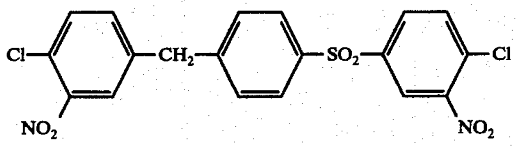
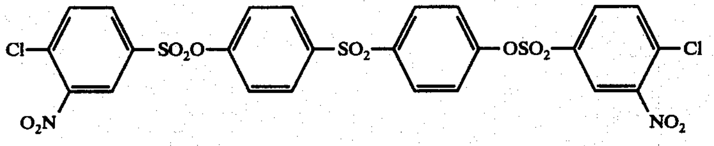
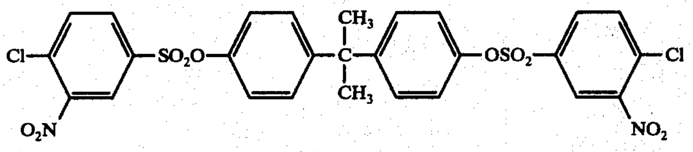
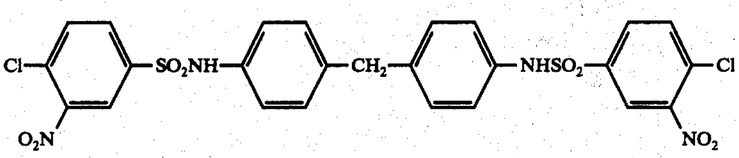
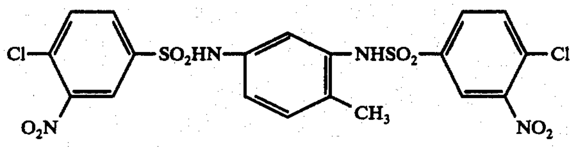
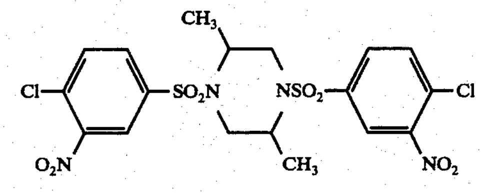
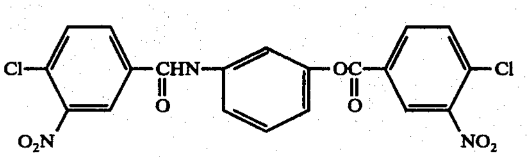
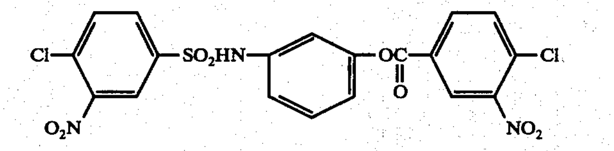

-continued
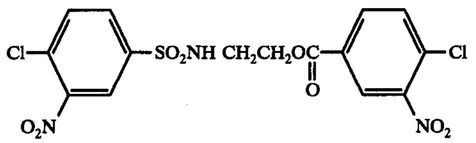
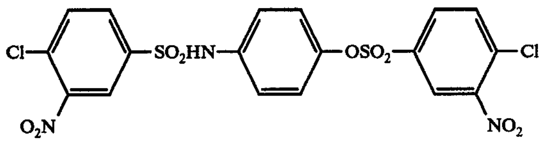
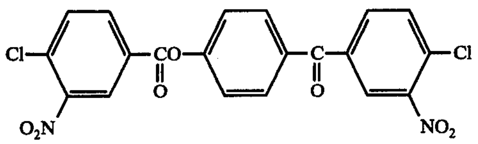
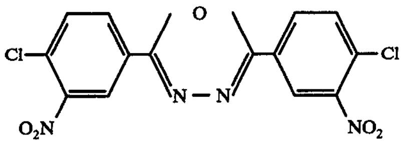
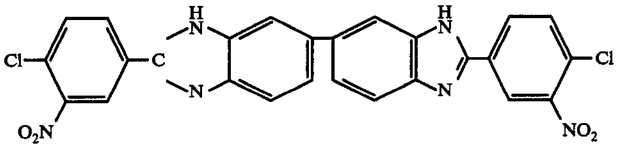
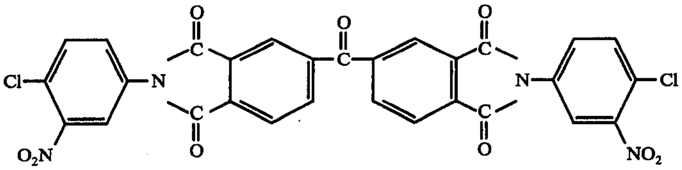
(a) When p=1 and Z is $-\overset{O}{\overset{\|}{C}}-$ or $-SO_2-$:—
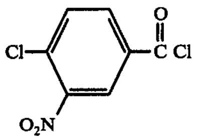
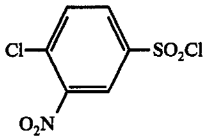
(2) Examples of the difunctional compound of formula (VIII) are as follows:
(c) When Y = $\overset{R_1}{\overset{|}{N}}-$:—
$H_2N\!\leftarrow\!CH_2\!\rightarrow_2 NH_2$ $H_2N\!\leftarrow\!CH_2\!\rightarrow_4 NH_2$
$H_2N\!\leftarrow\!CH_2\!\rightarrow_6 NH_2$ $H_2N\!\leftarrow\!CH_2\!\rightarrow_{12} NH_2$
$H_2N-CH_2-CH=CH-CH_2-NH_2$
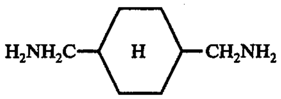

-continued
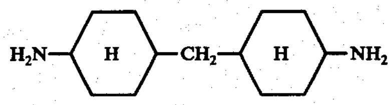
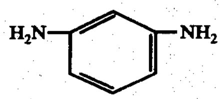
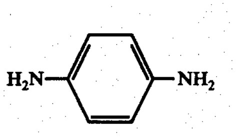
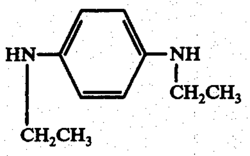
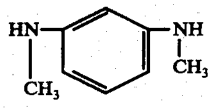
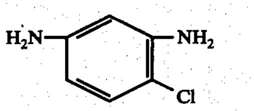
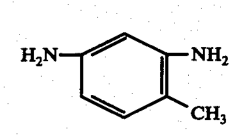
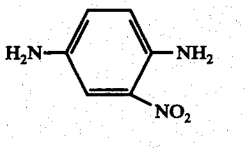
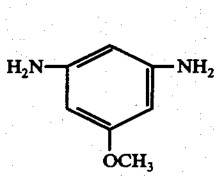
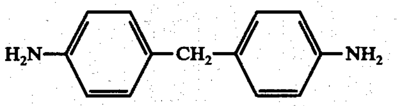
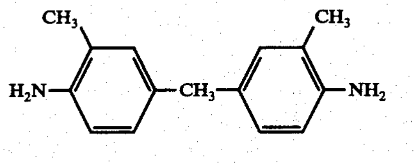
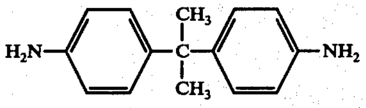
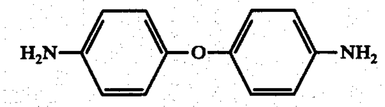
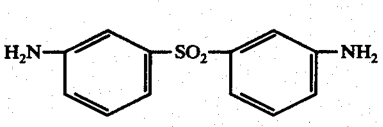
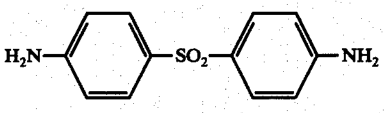
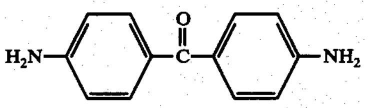
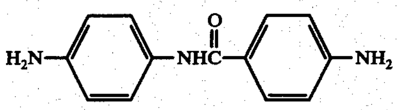
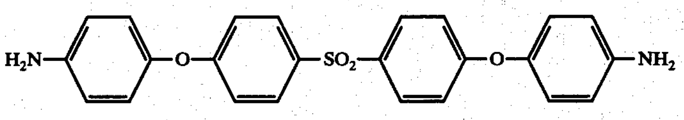
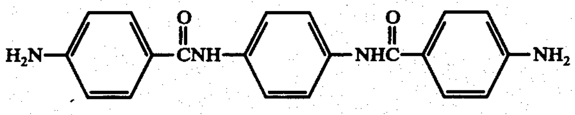
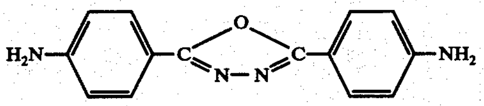

-continued

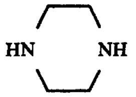

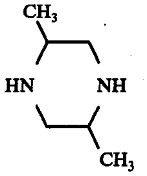

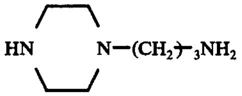

(d) When Y = —O—:—

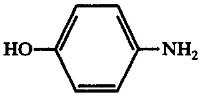

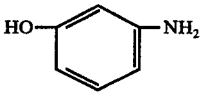

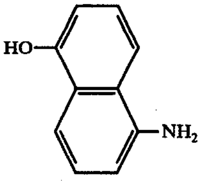

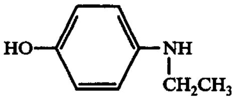

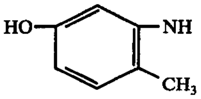

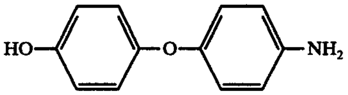

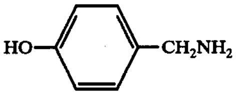

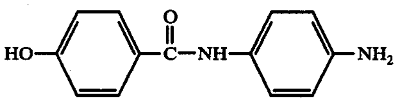

3. Examples of the difunctional copolymer component of formula (IX) are as follows:

i. Monohydroxymonocarboxylic acids or their functional derivatives such as:

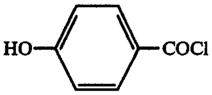

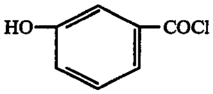

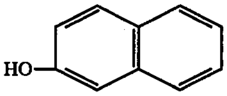

ii. Monohydroxymonosulfonic acid or their functional derivatives such as:

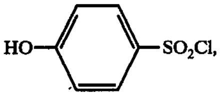

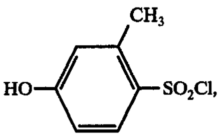

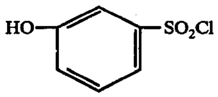

iii. Monohydroxydicarboxylic anhydrides or their functional derivatives such as:

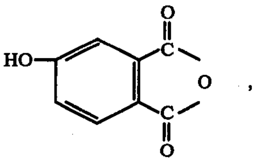

iv. Monoaminocarboxylic acids or their functional derivatives such as:

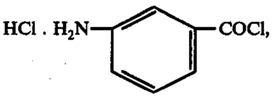

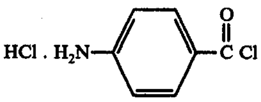

v. Monoaminomonosulfonic acids or their functional derivatives such as:

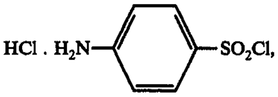

-continued

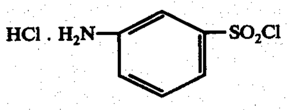

vi. Dicarboxylic anhydride monosulfonic acids or their functional derivatives such as:

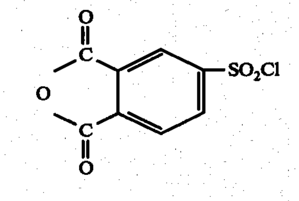

vii. Dicarboxylic acids or their functional derivatives such as:

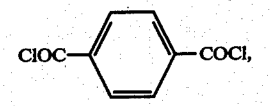

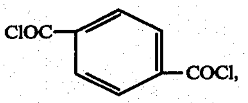

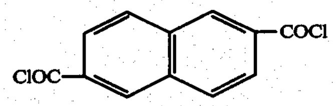
,

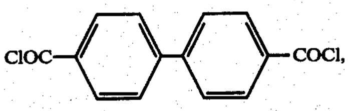

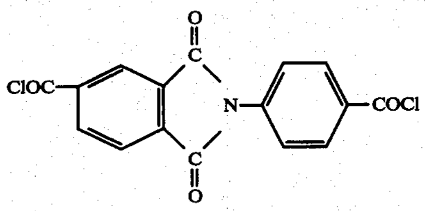

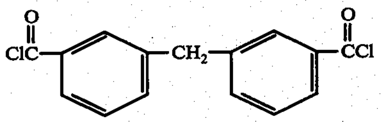

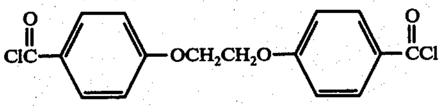

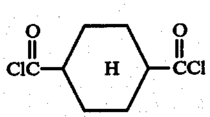

viii. Tricarboxylic monoanhydrides or their functional derivatives such as:

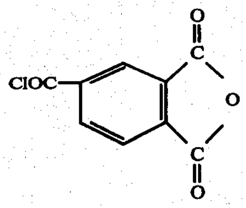

ix. Monocarboxymonosulfonic acids or their functional derivatives such as:

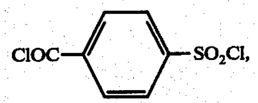

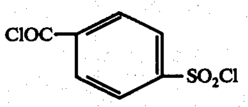

x. Tetracarboxylic dianhydrides or their functional derivatives such as:

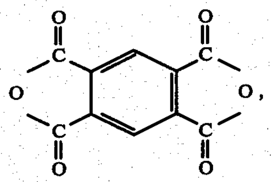

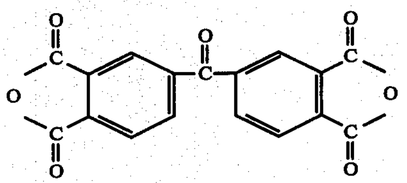

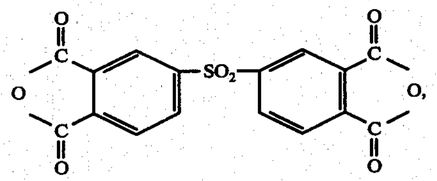

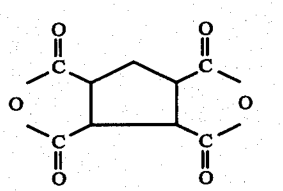

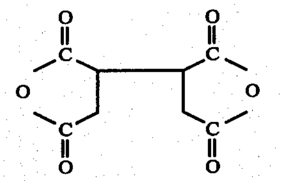

xi. Diisocyanates or their functional derivatives such as:

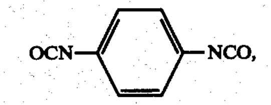

-continued

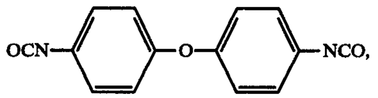,

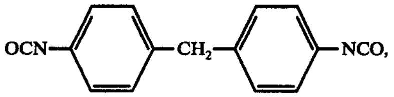,

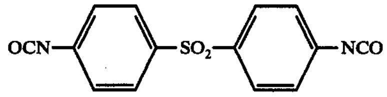

xii. Monoisocyanatemonocarboxylic acids or their functional derivatives such as:

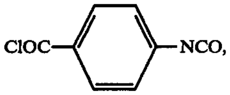, 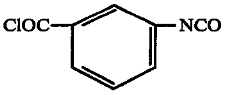

$ClOC(CH_2)_7NCO$ xiii. Bishaloformates such as:

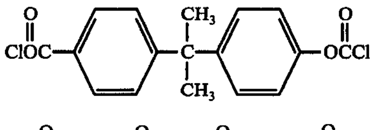

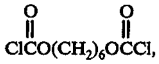, 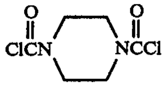

xiv. Dihydroxy compounds such as:

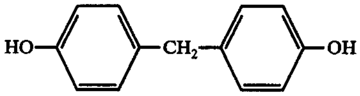

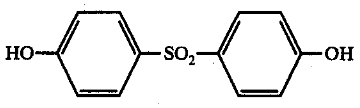

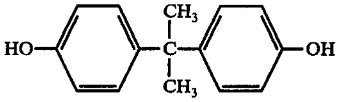

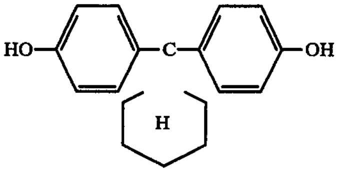

-continued

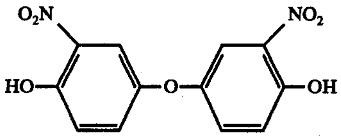

xv. Dihalogen compounds not containing a nitro group such as:

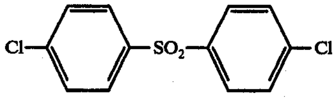

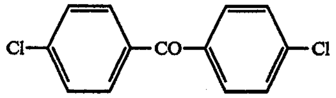

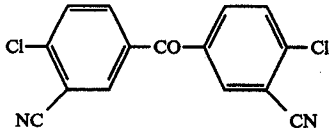

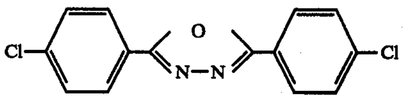

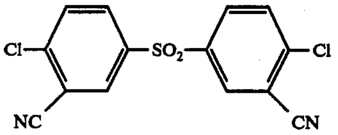

Of these difunctional copolymer components of formula (VIII), the dicarboxylic acids or their functional derivatives (vii), the tricarboxylic monoanhydrides or their functional derivatives (viii), the monocarboxymonosulfonic acids or their functional derivatives (ix), the tetracarboxylic dianhydrides or their functional derivatives (x), the diisocyanates of their functional derivatives (xi) and dihydroxy compounds (xiv) are preferred. Dicarboxylic acid halides in (vii) and the diisocyanates or their functional derivatives (xi) are especially preferred.

Some typical examples of the recurring unit of formula (IV) constituting the above aromatic polymers containing a primary amino group, and the third recurring unit of formula (III) are given below. These are only for illustrative purposes and do not in any way limit the invention.

Specific examples of the recurring unit of formula (IV)

When p=O:-

-continued
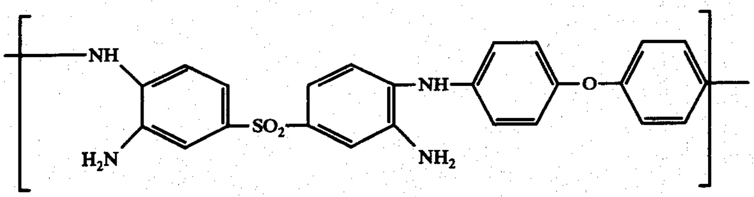
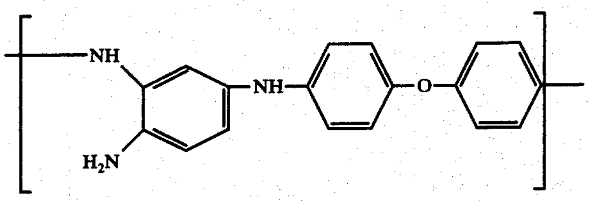
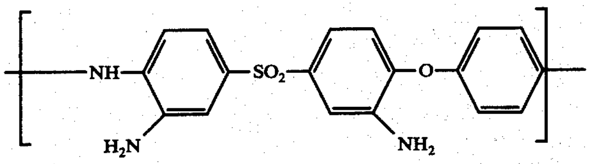
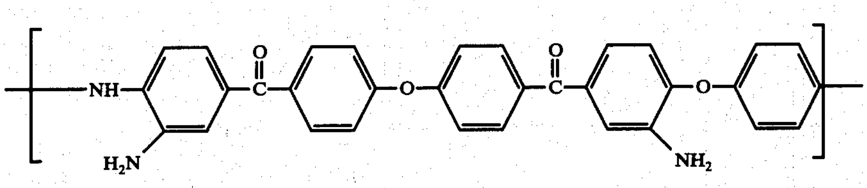
When p=1;-
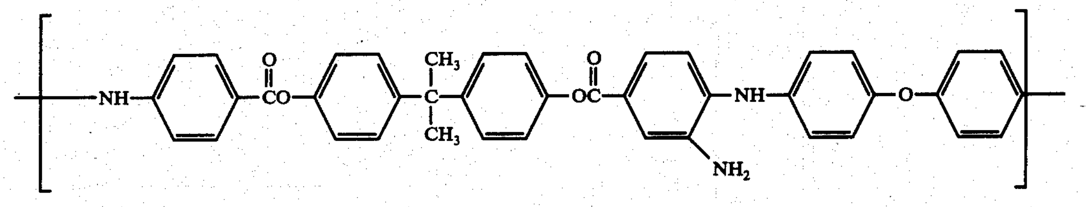
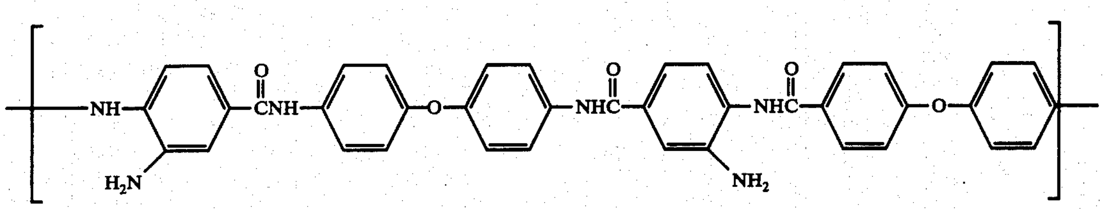
Specific examples of the recurring unit of formula (III)
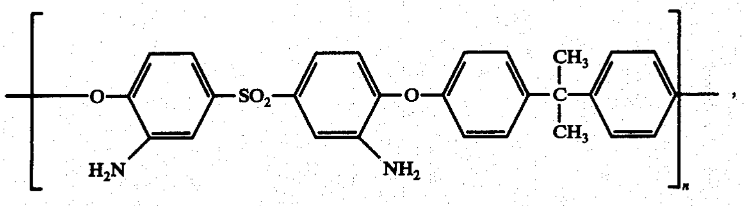

-continued

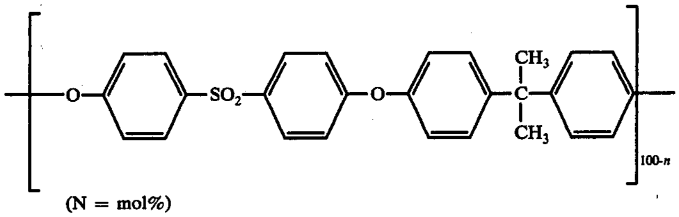

(N = mol%)

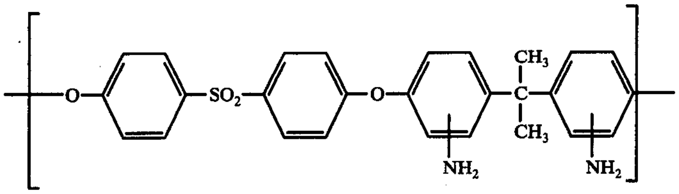

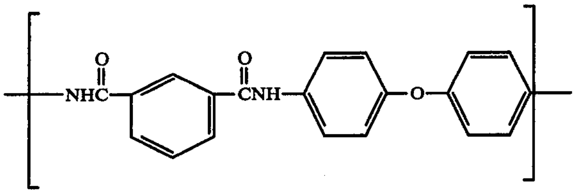

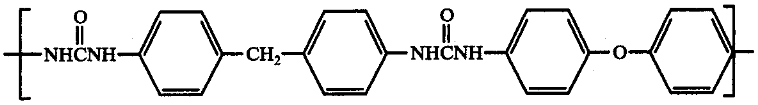

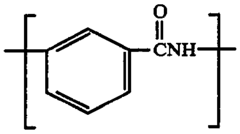

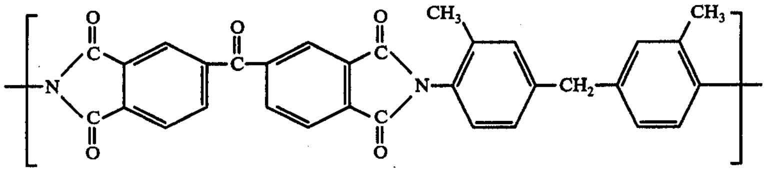

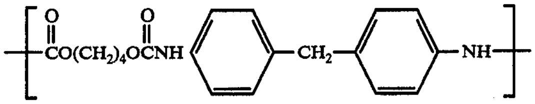

[II] Process for preparing polymers containing a nitrogen-containing ring group, and the characteristics of these polymers:

The characteristics of the polymers containing the recurring unit of formula (IV) in part of the main chain are ascribable to the fact that a pair of the primary amino group and secondary amino group located ortho to each other on the aromatic ring (that is, an N-monosubstituted-o-phenylenediamine-type group) constitutes a main chain-forming group. These polymers can therefore find applications in uses which take advantage of such characteristics as hydrophilicity, oxidation acceptability or chelate-forming ability by groups of this type. However, it has been found that when such a polymer is desired to be used in applications which take advantage of its hydrophilicity, the polymer is too susceptible to oxidation to be used stably. It is known on the other hand that in the case of N-monosubstituted-o-phenylene diamines such as 2-aminodiphenylamine which is a model substance having a bridging group conforming to the above-mentioned structural unit, a reaction is known in which the amino groups in the pair are bonded through 1 or two atoms to form various 5- or 6-membered heterocyclic rings fused with the aromatic ring [see, for example, Ring Index (published by the American Chemical Society), The Chemistry of Heterocyclic Compounds (published by Interscience Publishers, Inc.), and Heterocyclic Compounds (published by John Wiley & Sons, Inc.)].

When such a cyclizing reaction is applied to the polymers (IV), it has been found that the polymers can be stabilized, depending upon the type of the ring its hydrophilicity is further improved or its thermal stability is increased to such an extent that it can be used as a good thermally stable polymer, and sometimes, new functions can be imparted to the polymer by the characteristics of the resulting ring.

Accordingly, all known cyclization reactions for the N-monosubstituted-o-phenylene diamines can in principle be applied to the preparation of the polymers containing a nitrogen-containing cyclic group of this invention by noting that a reagent to be cyclized having the same structural unit is a polymer. The N-monosubstituted o-phenylene diamine-type group is expressed by the following formula

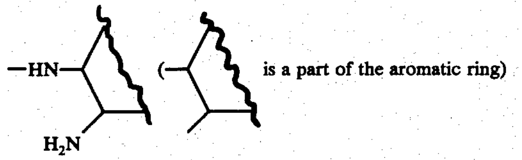

The atoms capable of forming a heterocyclic ring by bonding the two amino groups of the above N-monosubstituted o-phenylenediamine-type group include, for example, hetero atoms such as nitrogen, sulfur, phosphorus, silicon and boron in addition to carbon.

Reagents capable of forming such 5- or 6-membered heterocyclic rings are generally those which contain the above atoms and in which the same atoms or adjoining atoms can act as difunctional atoms as an electrophilic reagent. These reagents generally belong to the group of halides, aryl or alkyl esters, amides, and anhydrides, of acids containing the above elements as an electrophilic center. Specific examples of such reagents will be described later on.

Preferably, the reaction between the amino-containing polymer and the ring-forming agent is performed in the presence of a medium which is substantially inert to both of them and does not impair various reactions leading to the formation of rings in such a state that both are swollen to an extent such that they can at least react with each other, more preferably, both are in the form of solution.

Examples of preferred inert media used for this purpose are amide solvents such as N-methyl pyrrolidone, N-methyl caprolactam, dimethyl acetamide, dimethyl propionamide, hexamethyl phosphoramide or tetramethylurea, and sulfoxide and sulfone solvents such as dimethyl sulfoxide or tetramethylene sulfone. In some cases, an organic acidic solvent such as cresol, formic acid or methanesulfonic acid, and under some conditions, an inorganic acid such as polyphosphoric acid can also be used as such a medium. Sometimes, the ring-forming reagent itself acts as a solvent or swelling agent for the amino-containing polymers.

The reaction temperature differs according to the reactivity of the ring-forming reagent, but is generally −20° to 300° C., and usually 0° to 200° C.

Generally, in the case of amino groups directly attached to an aromatic ring, a primary amino group has higher reactivity with electrophilicities than an adjoining secondary amino group. Therefore, when the ring-forming reagent is caused to act on the aromatic ring, it first reacts with the primary amino group and then with the secondary amino group, thus leading to the formation of a ring.

For example, a typical example of the reaction is expressed by the following model in which $X_a$—$X_c$—$X_b$ is a typical type of reaction agent.

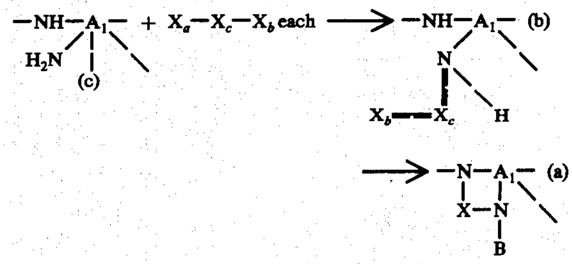

wherein $X_a$ and $X_b$ represent a halogen atom, an aryloxy group, an alkoxy group, etc., and the electrophilicity is higher on the $X_a$ bonded side.

The reactivities of the two functional groups of the above difunctional compound as a ring-forming agent are not necessarily required to be of equal degree, but sometimes, it is advantageous to use difunctional groups having different reactivities. This is because the reaction goes through the form (b) by the difference in reactivity between the primary amine and the secondary amine, but when the reactivity of the $X_b$ side is higher, an intermolecular reaction with the unreacted primary amino group in another molecule occurs to some extent while competing with the ring formation by an intramolecular reaction, and depending upon the reaction conditions, nitrogen-containing cyclic polymers partially having a cross-linked structure result in many cases. For some uses, such a cross-linked structure can be advantageously utilized, but is not desirable when the cyclized polymer is to be processed. In such a case, it is advantageous that an agent having low reactivity is used on the $X_b$ side to inhibit an intermolecular cross-linking reaction and to form a stable product in the form of (b) above, and then this product, either as such or after being separated, is intramolecularly cyclized by such means as heating thereby to convert it to a substantially linear polymer containing a nitrogen-containing cyclic group. It is also possible to mold the polymer in the form of (b) and then cyclize it later by a solid phase reaction. In this case, by controlling the cyclization reaction conditions, the reaction can be stopped at a stage where the polymer is partially cyclized to a desired cyclization ratio according to the desired use. The pendant group expressed by —NH—$X_c$—$X_b$ in the unit (b) in this case it is dealt with as a kind of the pendant group described above with regard to $W_1$.

When the polymer having the recurring unit of formula (IV) has pendant primary and/or secondary amino groups other than those conforming to the conditions shown by (c) above, these amino groups naturally react with the above ring-forming agent, and are converted, for example, to pendant groups of the formula

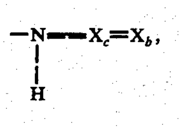

which are also regarded as a kind of the pendant groups described with regard to $W_1$.

It is possible to leave desired amounts of the pendant amino groups even after cyclization without reacting the ring-forming agent with all of the amino groups in (c). Thus, by utilizing the reactivity of the remaining amino groups, a compound which can react with the amino groups but does not participate in the cyclizing reaction, for example, sulfonyl chlorides, can be reacted with the cyclized polymer. At this time, by utilizing a reaction agent having two or more functional groups, such as polysulfonyl chlorides (e.g., m-benzenedisulfonyl chloride), the cyclized polymer can be cross-linked.

When the above cyclization reagent is one in which there is not much difference in reactivity between the $X_a$ side and the $X_b$ side, an intermolecular cross-linking reaction can be inhibited as much as possible preferably by a method which involves adding a solution of the amino-containing polymer dropwise to a solution of the cyclizing agent at as low a temperature as possible at which the reaction of the cyclizing agent with the primary amino group can take place. In other words, the cyclizing agent is used in excess as much as possible to inhibit the reaction between the $X_b$ side and the unreacted primary amino group. If it is desired to increase the content of a cross-linkage, reverse conditions are used.

As will be described hereinbelow, in the case of a benzadiazophosphole-P-oxide ring, benzodiazosilole ring, benzodiazoborole ring or benzimidazole ring, a reagent containing two or more ring-forming groups can be used at least partly to thereby form an intermolecular cross-linkage at the site of X in the above formula.

In this case, an alternative method can be used in which a soluble partially reacted product or partially cyclized product is formed by changing the reactivity of the ring-forming group in the reaction reagent, molded, and then converted to a cross-linked cyclized product by, for example, heating.

The confirmation of the formation of nitrogen-containing cyclic groups and the calculation of the proportions of the cyclic groups can generally be traced by nuclear magnetic resonance spectrum, infrared absorption spectrum, elemental analysis, and ultraviolet adsorption spectrum, etc. Comparison of the spectra of the products with those of low-molecular-weight model compounds having ascertained structures is especially effective.

The methods for preparing typical nitrogen-containing cyclic groups, the examples of the cyclizing reagents, and the reaction conditions are described in detail below.

[II-1] Heterocyclic groups in which two nitrogen atoms are bonded through 1 or 2 carbon atoms:

[II-1-1] Five-membered rings:

Examples of these heterocyclic rings are (1) a benzimidazole ring

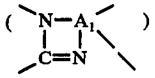 (a-3), (2) a benzimidazoline ring

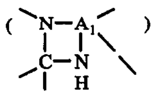, (3) a benzimidazolone ring

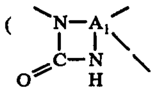 (a-1), and (4) a benzimidazolithione ring

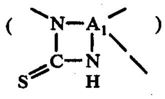 (a-2).

The benzoimidazoline ring is very unstable, and is converted to a benzimidazole ring in the presence of a weak oxidizing agent or simply by heating. Accordingly, the benzimidazole ring and benzimidazolone ring are especially important within this group. These two rings are very stable both thermally and chemically, and because of thier good solubility, are easy to process. Thus, polymers containing these rings have superior properties as thermally stable polymers and separation membranes such as reverse osmosis membranes. The above rings will be described below in greater detail.

1. Benzimidazole ring (a-3)

In principle, all reaction agents capable of forming N-substituted benzimidazoles by reaction with N-monosubstituted o-phenylenediamines can be used. Examples of functional groups that can act as such a benzimidazole ring-forming agent are carboxylic acid group or its functional derivative groups such as carboxylic acid halide groups, carboxylic acid ester groups (e.g., aryl esters or alkyl esters), carboxylic acid anhydride groups (preferably intramolecular acid anhydride groups which may either be homogeneous acid anhydrides or mixed acid anhydrides with other acids), carboxylic acid amide groups (e.g., active carboxylic acid amide such as carboxylic acid imidazolides), ortho-ester groups (e.g., alkyl ortho-esters or aryl ortho-ester groups or carboxyl group; nitrile group and its functional derivative groups such as imino chloride, imino ether, imino thioether, and nitrile groups, an aldehyde group; and dihalomethyl and trihalomethyl groups as precursors of aldehyde and carboxylic acid halide groups.

Of these, the carboxylic acid halide groups, carboxylic acid anhydride groups, active ester groups and active amide groups are preferred from the standpoint of reactivity. Each of the above functional groups can combine two amino groups to form a benzimidazole ring. Accordingly, when it is desired to obtain substantially linear soluble polybenzimidazoles, it is preferred to use a reaction agent containing either one of the above functional groups. When a cross-linked polymer is desired, it is recommendable to use a reaction agent which at least partly contains at least two of the above functional groups.

Specific examples of such a reaction agent are acetic acid, acetic anhydride, acetyl chloride, benzoic acid, benzoic anhydride, benzoyl chloride, benzoic-methanesulfonic mixed anhydride, o-sulfobenzoic anhydride, phenyl benzoate, benzoic acid imidazolide, isophthaloyl chloride, diphenyl isophthalate, diphenyl terephthalate, dimethyl sebacate, sebacamide, trimesic acid trichloride, monomethyl terephthalate monochloride, m-cyanobenzoyl chloride, trimesic acid chloride, ethyl orthoformate, hexaphenyl terephthalate ortho-formate, phenacetyl iminomethyl ether, N-phenyl benziminochloride, benzaldehyde, isophthaldehyde, α,α,α-trichlorotoluene, hexachloroxylene, m-nitrobenzoyl chloride, p-methoxybenzoyl chloride, and p-hydroxybenzoyl chloride. These cyclization agents may be used either alone, or two or more of them may be used simultaneously or successively.

The reaction conditions differ according to the type of the functional group of the benzimidazole-forming agent and its reactivity, but generally, the reaction conditions used in the known benzimidazole-forming reaction with N-monosubstituted o-phenylene diamines (for example, 2-aminodiphenylamine) can be followed. For example, there is a large difference in reactivity between the case of the functional group being a carboxyl group or an alkyl carboxylate group and the case of the functional group being a carboxylic acid halide, and the former generally requires a reaction temperature of 150° to 300° C., whereas the latter can give an imidazole at a temperature of 150° to 60° C. Accordingly, when there is used an at least difunctional benzimidazole-forming agent containing two or more benzimidazole-forming groups having a marked difference in reactivity, such as monomethyl terephthalate monochloride and m-cyanobenzoyl chloride, a method can be employed in which a linear polymer is obtained in a first stage as a result of the reaction of the acid halide portion alone and the polymer is molded, and reacted by, for example, heating to convert it to cross-linked polybenzimidazole as a result of the reaction of the unreacted amino group with that portion of the benzimidazole-forming agent which has a lower reactivity. When the group with a higher activity is reacted in an amount sufficient to form the benzimidazole, the group with a lower reactivity remains as a pendant group in the resulting polybenzimidazole.

Generally, an acidic substance has a catalytic activity in the reaction of a benzimidazole-forming group with the amino group pair. Preferably, therefore, the reaction is carried out in the presence of an acidic substance. In using the acidic substance, care must be taken because of the catalytic activity of the acidic substance differs according to the type of the functional group, and if the amino group strongly reacts with the acidic substance to form a salt, the nucleophilic reactivity of the amino group is lost to impair the formation of a benzimidazole ring.

Examples of the acidic substance are protonic acids such as hydrohalic acids, sulfuric acid, phosphoric acid, polyphosphoric acid or sulfonic acid, and Lewis acids such as aluminum chloride.

When the functional group Y is an acid halide group or a di- or tri-halomethyl group, the corresponding hydrogen halide results as a by-product. Preferably, therefore, the reaction is carried out in the co-presence of an acid acceptor in order that the by-product hydrogen halide may not retard the reaction of this invention as a result of forming a salt with the unreacted amino groups. Since hydrogen halides have good catalytic activity for converting the acylated intermediates to benzimidazoles by dehydrocyclization, it is preferred to retain such catalytic activity of the hydrogen halides by using a weakly basic acid acceptor such as N-methyl pyrrolidone, dimethyl formamide or pyridine. Of these, amide-type solvents such as N-methyl pyrrolidone or dimethyl formamide are preferred because they are also good solvents for the starting and resulting polymers and can thus act both as a solvent and an acid acceptor.

When the imidazole-forming group is an acid anhydride group, the acid cleaved at the time of acylation functions catalytically for cyclization, and therefore, this imidazole-forming group is also preferred.

When a nitrile is used, the presence of an acid, especially hyrogen halides, is essential. In the case of the imino ethers, the catalytic activity of the acid is also marked. When aldehydes are used, it is preferred to carry out the reaction in the presence of oxygen or a weak oxidizing agent.

The conditions for benzimidazole-forming reaction differ according to the reactivity of the functional group, and can be determined optionally by considering the above conditions.

When there is used a benzimidazole-forming agent having a functional group with higher reactivity in the first-stage acylation reaction, such as carboxylic acid halide groups, carboxylic acid anhydride groups, active carboxylic acid ester groups or active carbonamide groups, a two-stage method can also be employed in which an intermediate such as an acylated product is first formed at low temperatures, and then the intermediate is cyclized at higher temperatures to form the desired polybenzimidazole. In particular, there can be employed a method in which the acylated product is molded, and then cyclized by heating to convert it to polybenzimidazole.

Linear polybenzimidazoles thus obtained are generally soluble in solvents such as N-methyl pyrrolidone, dimethyl sulfoxide or formic acid, and can be shaped into fibers and films. By the method described above, cross-linked polybenzimidazole shaped articles can also be obtained.

The polybenzimidazoles obtained by the present invention have high melting point and very good thermal stability, and can be used in a wide range of applications as thermally stable resins. Furthermore, the polybenzimidazoles have superior hydrophilicity, and by utilizing this unique hydrophilicity, they can be used for preparing separating membranes for reverse osmosis, for example.

Furthermore, these polymers can be subjected to known reactions of benzimidazole rings, for example, the quaternization of the nitrogen atom at the 3-position.

When the starting polymer contains a primary amino group and/or a secondary amino group other than those of the N-monosubstituted o-phenylenediamine type, these amino groups, in many instances, react with the benzimidazole-forming agent and are in the acylated state. As previously stated, these acylated amino groups are embraced within the definition of the groups $W_1$ and $W_2$.

Furthermore, as previously stated, a functional group such as a hydroxyl, alkoxy, carboxylate ester, cyano or sulfonic acid group can be introduced into the organic residue bonded to the carbon atom at the 2-position of the benzimidazole ring, and the characteristics of these functional groups can thus be utilized in the end of the polybenzimidazoles.

2. Benzimidazoline ring

It is known that a benzimidazoline ring can be formed by reacting an N-monosubstituted o-phenylenediamine-type compound with a reaction agent containing an aldehyde group and/or a ketone group via a Schiff base with a primary amino group as an intermediate. This reaction can also be applied to the present invention.

However, as stated above, this ring is very unstable and easily convertible to a benzimidazole ring. In particular, a benzimidazoline ring of the type

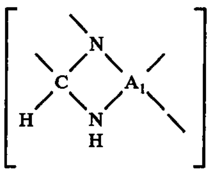

derived from an aldehyde-containing reaction agent is very unstable, and cannot be isolated generally in this form but is obtained in the form converted to benzimidazole. Hence, this has been discussed above under the headline "benzimidazole ring". Benzimidazoline rings derived from ketone-containing reagents are stable to some extent, and can be isolated. They can be converted to benzimidazole rings by heating, for example. Examples of the ketone-containing reagents are acetophenone, m-diacetyl benzene, acetone, ethyl acetoacetate, methyl ethyl ketone, and cyclohexanone.

Preferably, the reaction is carried out in the presence of a solvent of the type described hereinabove. The resulting heterocyclic polymers are very significant as precursors of polybenzimidazoles.

3. Benzimidazolone ring

In principle, all reaction agents which afford benzimidazolones by reaction with N-monosubstituted o-phenylene diamines can be used. Such benzimidazolone-forming agents are, for example, carbonic acid derivatives, isocyanic acid derivatives and cyanic acid salts. Specific examples of such reagents are halocarbonyl compounds such as phosgene, ethyl chloroformate, tetramethylene bis-chloroformate, phenyl chloroformate or cresyl chloroformate; carbonic acid esters or ortho-esters such as diphenyl carbonate, dicresyl carbonate, bis(nitrophenyl) carbonate, dipyridyl carbonate, diethyl carbonate, ethylene carbonate or tetraphenyl ortho-formate; halocarbamates such as N,N'-dimethyl chlorocarbamate, or N-chloroformyl piperidine; ureas such as carbonyldiimidazolideurea; isocyanate such as phenylisocyanate, tolylenediisocyanate or anisyl isocyanate; urethanes such as o-ethyl-N,N'-dimethyl carbamate or N-phenyl-o-phenylurethane; and cyanic acid salts such as ammonium cyanate. In particular, the haloformates, active carbonic acid esters, active ureas, isocyanates, and active urethanes are suitable. Of these, the haloformates are especially preferred.

The reaction conditions differ according to the reactivity of the benzimidazolone-forming agent. Generally, the reaction conditions for the known benzimidazolone-forming reaction with N-monosubstituted o-phenylene diamines are followed. Suitable solvents used for the reaction are the same as those described above, and the amide-type, sulfoxide-type and sulfone-type solvents are especially preferred.

When the imidazolone-forming agent is one in which there is a great difference in reactivity between the $X_1$ side and the $X_2$ side, for example, haloformates, halocarbamates or isocyanates, an intermediate polymer having a bond of the structure (b) can be obtained by reaction with the primary amino group at a temperature of generally not more than 100° C., preferably not more than 50° C. The intermediate polymer can be converted to polybenzimidazolone by heating to a temperature of at least 50° C., preferably 100° to 300° C.

Accordingly, the intermediate polymer can be shaped into shaped articles such as films or fibers, and then converted into the shaped articles of polybenzimidazolone by heating, for example.

The ratio of cyclization to benzimidazolone can be controlled as desired by the selection of the cyclization conditions.

The pendant urethane group and urea group remaining in the uncyclized portion are likewise dealt with as pendant groups represented by $W_1$. Similarly, when the starting polymer contains a primary amino group and/or a secondary amino group not embraced within the bond unit (a), these amino groups are generally converted to urethane or urea groups by reaction with the benzimidazolone-forming agent. Generally, these groups undergo an intermolecular or proportionation reaction by heating, and thus can be converted to an intermolecular cross-linkage.

When a reaction agent containing at least two functional groups capable of forming a benzimidazolone ring per molecule, such as diisocyanates or alkylene bis-haloformates, is used, a cross-linkage is formed in the intermediate stage brought about by the reaction with the primary amine to afford a cross-linked polymer, but with the progress of cyclization, this cross-linkage is sometimes cut off as the cyclization proceeds.

When a reaction agent is used which may form hydrogen halides as by-products during the benzoimidazoline-forming reaction, the reaction is preferably carried out in the presence of an acid acceptor since the by-product hydrogen halides sometimes retard the reactivity of the amino groups as a result of forming a salt with the amino group.

The polybenzimidazolones obtained by this invention have high melting points and good thermal stability, and therefore can be used as thermally stable resins. Furthermore, by utilizing their unique hydrophilicity, they can be utilized for making separating membranes for reverse osmosis having superior properties. The polymers can also be used as functional polymers capable of various reactions, because they somewhat retain reactivity as a urea linkage. For example, by reacting these polymers with phosphorus oxychloride, the benzimidazoline ring is converted to a 2-chlorobenzimidazole ring. Since the chloro has reactivity, the ring can be converted, for example, to a 2-aminobenzimidazole ring or 2-alkoxybenzimidazole ring.

4. 2-Thiobenzimidazolone ring

This heterocyclic ring is an S-analog of the benzimidazolone ring described above, and can therefore be prepared under similar conditions by using an S-analog of the above-mentioned benzimidazolone-forming agent. Examples of generally used thiobenzimidazolone-forming agents are thio-phosgene, thiourea, potassium ethylxanthate, ethyl ethylxanthoformate, and a combination of carbon disulfide and alkali.

The stability of the thiobenzimidazolone ring cannot excel that of the benzimidazolone ring, but since the reactivity of S is high, such polymers can be used in applications in which this function is utilized.

For example, in addition to utility as separation membranes utilizing the hydrophilicity of the weakly acidic thiobenzimidazolone ring, these polymers can be used for capturing heavy metals by taking advantage of their property of forming stable complexes with heavy metallic ions such as copper, cadmium, bismuth, lead, mercury, silver, gold or palladium.

Furthermore, by utilizing the reactivity of S, the thiobenzimidazolone ring can be converted to a 2-alkylthiobenzimidazole ring by S-alkylation. Or it can be converted to a disulfide-type bond by oxidation with $I_2$, for example.

[II-1-2] 6-Membered rings

Examples of rings belonging to this group are (1) quinoxalidinedione

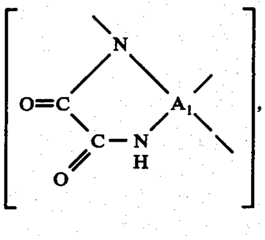, (2) quinoxaline-2-one

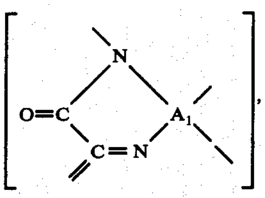, and (3) quinoxalidin-3-one

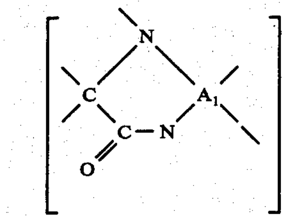

In view of the ease or ring formation and stability, the quinoxalidinedicne ring is most important. These rings will be described below.

1. Quinoxalidinedione ring (b-6)

In principle, all reaction agents capable of forming a quinoxalidinedione ring by reaction with N-monosubstituted o-phenylenediamines. Generally, such quinoxalidinedione-forming agents are active derivatives of oxalic acid such as oxalyl chloride, oxalyl monochloride monophenyl ester, or diphenyl oxalate. In the formation of this ring, an intermolecular cross-linking tends to occur because intramolecular cyclization occurs with more difficulty than in the case of a 5-membered benzimidazolone ring which has a similar structure and is formed by similar reagents. Accordingly, when a cyclizing agent in which both sides have the same reactivity, such as oxalyl chloride, is used, the formation of a soluble cyclic polymer must be carried out by a method in which a solution of the starting polymer is added dropwise to a solution of the cyclization agent at a low temperature of, say 20° to 0° C.

Polyquinoxalidinediones have superior properties as thermally stable resins and materials for separating membranes.

[II-2] Heterocyclic rings in which two nitrogen atoms are bonded via one or two atoms other than carbon:

[II-2-1] When the bridging member is a nitrogen atom:

An example of the heterocyclic ring of this group is a benzotriazole ring

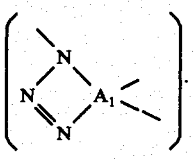.

This ring is formed by nitrosating the primary amino group of the starting polymer, followed by going through a diazonium salt.

The nitrosating agent includes various known species such as nitrosyl chloride, nitrosylsulfuric acid or nitrous acid, but the nitrous acid is most general and easiest to use. As is very commonly practised, hydrochloric acid is added to sodium nitrite to liberate nitrous acid, and this method can be applied to this invention in the presence of a solvent of the type described above.

Since in the formation of this ring, the intermediate diazonium salt is unstable and is susceptible to a coupling reaction, an intermolecular crosslinking reaction tends to occur.

The benzotriazole ring is introduced into polymer in order to control the hydrophilicity of the polymer conjointly with other rings, or utilize its specific light absorbing property.

[II-2-2] When the bridging member is a sulfur atom:

Examples of rings belonging to this group are:

1. a benzothiadiazolidine ring

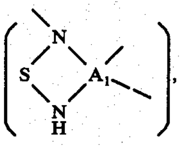, 2. a benzodithiadiazine ring

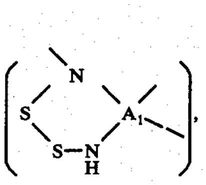, 3. a benzothiadiazolidine-S-oxide and

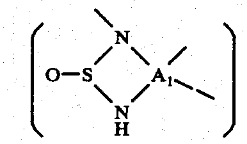

4. a benzothiadiazolidine-S-dioxide ring

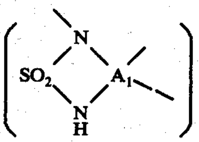

Since these rings are not stable as compared with the case of those rings in which the nitrogen atoms are bonded through a carbon atom, an intermolecular crosslinking reaction tends to occur. Furthermore,

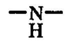

in the above first two rings are susceptible to attack by another cyclizing agent, and this is liable to cause cross-linkage. The first two rings are susceptible to oxidation with oxidizing agents, and can be used in applications which take advantage of this characteristic. In other words, the polymer can be used as a kind of polymeric reducing agent. The latter two rings are weakly acidic, and can be used in applications which take advantage of this characteristic, such as raw materials for separating membranes.

Examples of reaction agents that form these rings are the functional derivatives of hyposulfurous acid, sulfurous acid or sulfuric acid, such as sulfur dichloride (sulfenyl chloride), sulfur chloride ($S_2Cl_2$), thionyl chloride, sulfur dioxide, and sulfuryl chloride. The use of solvents and acid acceptors in the reaction is the same as described above.

[II-2-3] When the bridging member is a phosphorus atom:

Examples of rings belonging to this group are:

1. a benzodiazophosphole-P-oxide ring

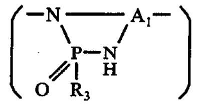

2. a benzodiazophosphole ring

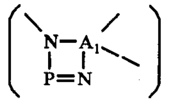

In the formation of these rings, too, a cross-linkage tends to occur because the ring structure is not so sterically stable as in the case of the nitrogen atoms being bonded through a carbon atom.

The phosphorus-containing nitrogen compounds have superior fire-retarding activity, and can be used in applications which take advantage of this characteristics.

Examples of reaction agents which form such rings containing phosphorus and nitrogen are the derivatives of phosphonic acid or phosphorous acid, such as phenylphosphonyl dichloride, diphenylether-4,4-bis(phosphonyl dichloride), diphenyl phenylphosphonate, phosphorus trichloride, triphenyl phosphite, and p-toluyl diphenylphosphite.

The reaction conditions in regard to the solvent and the acid acceptor are the same as described above, and the temperature is adjusted suitably according to the type of the reaction agent used as in the case of low-molecular-weight substances.

[II-2-4] When the bridging member is a silicon atom:

A ring in which the two nitrogen atoms are bonded through a silicon atom is called benzodiazosilole, or 2-silabenzimidazoline

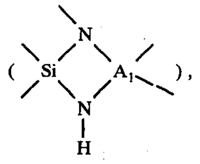

and the hydrogen atom remaining attached to the nitrogen atom at the 3-position can be further substituted by a silyl group. This ring is very susceptible to hydrolysis, and can be used as a silylating agent. Examples of reaction agents for forming this ring are halosilanes such as dimethyl dichlorosilane, methyl dichlorosilane or methyl trichlorosilane.

[II-2-5] When the bridging member is a boron atom:

An example of this heterocyclic ring is benzodiazoborole or benzoborimidazoline

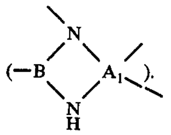

This ring is known to take an aromatic conjugated electron arrangement same as the benzimidazole ring. Accordingly, polybenzoborimidazoline can be used in applications which take advantage of its good thermal stability.

Examples of benzodiazoborole ring-forming agents are the functional derivatives of boronic acid or boric acid such as diphenyl benzeneboronate, di-n-butyl benzeneboronate, benzeneboronyl dichloride, benzeneboronic acid, triphenyl borate, or tributyl boronate.

According to the ultimate usage, two or more of the above heterocyclic rings can be used in combination in suitable proportions.

The synthesis of nitro-containing aromatic polymer, its reduction to the amino-containing aromatic polymer, the synthesis of the intermediate polymer having the unit (b) by the reaction of cyclizing agents and the cyclizing reaction can be continuously performed in an inert solvent such as N-methyl pyrrolidone without separating the polymers during a series of these operations.

There can be cited another process for preparing the polymers of this invention containing a nitrogen-containing cyclic group which comprises subjecting a monomer having a difunctional or higher group containing such a nitrogen-containing cyclic group as described above (for example, diamines, diols, dicarboxylic acids, or diisocyanates) to known polymer-forming reactions.

[III] Characteristics and application of the aromatic polymers containing a nitrogen-containing cyclic group:

All linear aromatic polymers containing a nitrogen-containing cyclic group in accordance with this invention are soluble in polar solvents although the type of the solvent differs according to the type of the cyclic group. Various shaped articles such as coatings, films, fibers and composite laminate structures with other material can be prepared from solutions of the polymers in solvents. General examples of such polar solvents are aprotic polar solvents such as N-methyl pyrrolidine, N-methyl caprolactam, N,N-dimethyl acetamide, dimethyl formamide, N,N-dimethyl propionamide, hexamethyl phosphoramide, tetramethylurea, tetramethylenesulfone, or dimethylsulfoxide. Depending upon the content of the cyclic group in the entire recurring units, these polymers are sometimes soluble in such polar solvents as acetone, methyl ethyl ketone, methyl isobutyl ketone, acetophenone, nitrobenzene, ethyl acetate, acetonitrile, nitromethane, nitropropane, chloroform, water, ethanol, cresol, or chlorophenol, or their mixtures.

Furthermore, depending upon the type of the polymer, it can be molded in the molten or softened state by such means as press-forming.

Shaped articles of the cross-linked polymers can be prepared by the following methods are described hereinabove.

i. Method which involves performing the reaction of the polymer with the cyclizing agent and the shaping of the polymer simultaneously by utilizing an intermolecular cross-linking reaction which is a side-reaction of the ring-forming reaction.

ii. In the case of polybenzimidazole, a method which comprises performing the reaction and shaping simultaneously using reagents containing at least two ring-forming groups.

iii. Method which comprises leaving a part of the pendant amino groups witout reacting the ring-forming agent with all of the pendant amino groups, and by utilizing the reactivity of the remaining pendant amino groups, reacting a polyfunctional compound (this may sometimes be the ring-forming agent itself with the remaining pendant amino groups during or after the shaping of the resulting polymer thereby to cross-link the shaped articles.

iv. Method which comprises cross-linking the polymer during or after its shaping, utilizing the reactivity of functional groups corresponding to $W_1$ and $W_2$ such as amino groups present in addition to the unit of formula (a).

When the substantially linear aromatic polymer containing a nitrogen-containing cyclic group is used directly as a base polymer for the various shaped articles described above, the polymer should have a degree of polymerization at least sufficient to form into films. When the polymer is used as a final shaped article in the form at least partially cross-linked, polymers of varying degrees of polymerization ranging from oligomers to film-forming polymers can be used. When the aromatic polymer containing a nitrogen-containing cyclic group in accordance with this invention is substantially linear and soluble, the polymer can have a wide range of inherent viscosity from 0.05 to 2.0 or even more, as measured on a 0.5 g/100 ml. solution of the polymer in N-methyl pyrrolidone or 95% by weight conc. sulfuric acid. Preferably, the inherent viscosity is at least 0.1, especially at least 0.2. Those having an inherent viscosity of about 0.4 to 1.5 are suitable for film formation, for example, because of their superior processability.

The details of the characteristics of the polymers of this invention and their applications that can be conceivable from them have already been described in the sections in paragraph [II]. In general, these polymers find utility as thermally stable polymers, or separating membranes suitable for reverse osmosis or ultrafiltration.

[III-1] Application as thermally stable polymers:

Examples of nitrogen-containing cyclic groups suitable for thermally stable polymers are benzimidazolone, benzimidazolthione, benzimidazole, quinoxalinedione, benzotriazole, and benzodiazoborole rings. Of these, the benzimidazolone and benzimidazole rings are preferred.

Preferably, the groups that constitute the main chain of the polymer should have the greatest possible content of aromatic. Especially preferred structures consist only of a thermally stable bridging group such as an aromatic, sulfone, ketone, amide, ester or heterocyclic group. Furthermore, it is desirable that cyclizable portions of such groups should finally be cyclized as much as possible.

When the polymers of this invention are substantially linear and solvent-soluble, they can be fabricated into shaped articles by known conventional dry- or wet-fabricating methods. Some types of the polymers can be shaped by thermo-forming methods.

Another method for preparing the shaped articles of the polymers of this invention comprises shaping the starting polymer having the unit (b) utilizing the fact that this polymer generally has superior solubility and is easy to process, and cyclizing the shaped article by the methods described hereinabove. This method is used preferably when the polymers of this invention are cross-linked.

Thus, the polymers of this invention have superior processability and thermal stability, and exhibit high utilitarian value as thermally stable polymers. Hence, these polymers can be used with good results in a wide range of applications such as electric insulation or machine component parts in the form of coatings, films, tapes, fibers, and other shaped articles.

[III-2] Application as permselective membranes:

In order to use the polymers as permselective membranes for reverse osmosis and ultrafiltration by which water is separated from the solute by pressure driving, they must have a moderate degree of hydrophilicity and contain a rigid main chain. Examples of nitrogen-containing cyclic groups suitable for this purpose are benzimidazolone, benzimidazolole, benzimidazolthione, quinoxalinedione, benzothiazolidine-S-mono- or dioxide, benzodiazophosphole-P-oxide, and benzodiazoborole rings. Of these, the benzimidazolone ring and benzimidazole ring are especially preferred.

The groups which constitute the main chain are preferably rigid, and have a large content of an aromatic group, alicyclic group or heterocyclic group. The amount of water permeated can be increased by choosing suitable hydrophilic groups (for example, a sulfonamide group) as $W_1$. The amount of water permeated can also be increased sometimes by including another hydrophilic pendant group such as a carboxyl or sulfonic acid group.

In principle, the structural units of the polymer preferably have a high content of the above cyclic structure, but depending upon the purpose for which the polymer is used, polymers containing a copolymer component can also be used. Preferred copolymer component units are polycarbonamide and polysulfonamide.

The polymers used as separating membranes are required to have the ability to form self-supporting films, and those having an inherent viscosity of at least 0.4, preferably at least 0.6, are generally preferred.

The permselective membranes in accordance with this invention can be obtained by forming from solutions of the polymers in organic solvents. Such organic solvents are inert to compounds and can substantially dissolve them. Examples of suitable solvents are amide solvents such as N-methyl pyrrolidone, N-methyl caprolactam, N,N-dimethyl acetamide, hexamethyl phosphoramide or tetramethylurea, sulfoxide solvents such as dimethyl sulfoxide, and phenolic solvents such as phenol, cresol or chlorophenol. Other solvents can also be used depending upon the type of the polymer. These solvents can be used either alone or in admixture of two or more of these.

In the preparation of polymer solutions using such organic solvents, suitable diluents can be used in order to control solubility, drying property, coagulating property, etc.

When in the preparation of the polymers described above, the polymers are obtained as uniform solutions, they can be used directly as film-forming dopes.

The permselective membranes in accordance with this invention are molded into various forms such as flat plates, tubes or hollow filaments according to the form in which they are used. From the standpoint of the efficiency of permeation, the membranes should preferably be as thin as possible, but on the other hand, require sufficient mechanical strength.

In order to meet these apparently inconsistent requirements attempts were previously made to prepare composite membranes comprising porous supports and ultrafine membranes formed thereon, and anisotropic membranes developed by Loeb et al. which comprise a dense upper skin layer and a thick porous layer.

When the polymers of this invention are used to prepare composite membranes, there can be employed a method in which a porous flat plate or tubular substrate and a ultrathin membrane prepared from the polymer of this invention are used as an integral unit. Usually, such ultrathin membranes have a thickness of 0.05 to 10 microns. Preparation of the ultrathin membranes, adhesion of them to a porous substrate, and the method of integrating them can be performed in accordance with the conventional techniques.

For example, there can be employed a method which comprises casting a film-forming dope onto a belt or a flat plate as a support to the desired thickness, removing the solvent by such means as drying, separating the film from the support, and if desired, integrating the resulting ultrathin film with a porous substrate by, for example, using an adhesive. In order to integrate the film with the porous substrate, another method can be used in which the dope is directly applied to the substrate by such means as roll coating, spray coating, or immersion. In order to prepare such ultrathin membranes, it is advantageous to use dopes which contains the polymer in a concentration of at least 0.5% by weight, more preferably 1 to 10% by weight. The drying temperature differs according to the type of the solvent, but usually, temperatures of 50° to 250° C. are used preferably.

Anisotropic membranes composed of the polymers of this invention can be formed, for example, by the known methods disclosed in U.S. Pat. Nos. 3,133,132, 3,133,137 and 3,567,632. For example, in the wet film-forming process, only one surface of the film is brought into contact with a coagulating liquid to cause the coagulation to start at that surface. In the cause of the dry-film-forming process, a procedure may be employed which comprises evaporating the solvent from one surface of the film, immersing in a leaching solution the partially solidified membrane at which a part of the solvent remains thereby to extract and remove the remaining solvent.

At this time, the permselectivity of the membrane can be greatly improved by adding to the film-forming dope a substance having a molecular weight of not more than 500 which is an inorganic salt, organic salt or other organic compounds and differs from the organic solvent used in respect of average size and the rate of volatilization, and removing the substance at the time of extraction. Examples of such effective additives are inorganic acids such as lithium chloride, lithium bromide, calcium chloride, lithium nitrate or calcium thiocyanate, and organic compounds such as formamide. The proportion of the additive varies according to the type of the polymer, the type of the additive and the solvent used, but generally, the preferred proportion is 5 to 200% by weight based on the polymer.

The partially solidified membrane can be obtained by casting the film-forming dope to the desired thickness on a flat plate or tubular support, and coagulating it partially at one of its surface. The suitable film-forming temperature in the case of partial coagulation by the dry method differs according to the type of the solvent, the thickness of the cast dope, the drying time, the velocity of air, etc., but generally it is 50° to 200° C., preferably 80° to 150° C. Preferably, 200 to 25% by weight, based on the polymer, of the solvent and the additive remain in the partially solidified membranes.

The resulting partially solidified membrane is immersed in a leaching liquid to remove most of the solvent and the additive remaining in it, and thereby to afford the desired permselective membrane.

The leaching liquid is required to have compatiblity with the organic solvent and the additive and no ability to dissolve the polymer and be inert chemically to the polymer. Specific examples are water, methanol, ethanol, or mixtures of these. Water is most suitable.

Generally, the leaching temperature is $-20°$ to 50° C. When the leaching operation is carried out at a very high temperature, the rate of leaching becomes fast, but heterogeneous portions such as non-transparent portions occur in the membrane to impair the properties of the membranes markedly.

Preferably, the leaching time is generally one sufficient to leach out most of the remaining matters in the partially coagulated membrane, such as the solvent and the added salts. The membrane after being so leached is stored preferably in water in the hydrous state.

The resulting anisotropic permselective membranes generally have a thickness of 10 to 500 microns, preferably 40 to 200 microns.

Hollow fibers for use in permselective membranes are prepared by extruding the dope through a spinneret of a hollow structure in accordance with known wet or dry methods or a combination of these methods. Generally, the hollow fibers obtained have an outside diameter of 20 to 150 microns, a wall thickness of 5 to 40 microns, and a void ratio of 0.1 to 0.6. The void ratio is defined as the ratio of the cross-sectional area of the internal bore of the fiber to the total cross-sectional area within the outer perimeter of the fiber.

The permselectivity of the membranes prepared from the polymers of this invention can be easily adjusted by various methods, for example, by controlling the drying time, the drying temperature, the type and amount of the additive, the type of the leaching liquid, or the hot water treating temperature. With some types of the additives, the permselectivity can be controlled continuously according to the amount of the additives and/or the temperature at which hot water treatment is carried out. Examples of such preferred additives are lithium nitrate and calcium thiocyanate. When the membrane requires a high rate of rejection at high pressures, for example, as in the case of a membrane for desolination of the sea water, the membrane is prepared from a film-forming dope containing much additives, and after thoroughly removing the additives and the solvent through the steps of drying and leaching, treated with hot water. This can lead to the formation of membranes having anti-compaction and high rejecting properties. During or after the film formation, a cross-linkage can be caused by the method described above in order to increase the anti-compaction of the membrane.

Thus, permselective membranes for reverse osmosis and ultrafiltration can be obtained which have a wide range of permeating properties with a sodium chloride rejection of 99.9% to 5% or less.

The permselective membranes of this invention, because of the unique structure of the polymer, generally have superior acid fastness, resistance to oxidation and thermal stability in addition to their good permselectivity, and can be used under severe conditions not feasible for the conventional membranes. In particular, the permselective membranes of this invention can be suitably used for concentrating process waters generated in the chemical and other industries.

While the utility of the novel polymers of this invention has been described with particular reference to thermally stable polymers and permselective membranes, it is by no means limited to these usages.

As stated hereinabove, the polymers of this invention can contain various functional and reactive nitrogen-containing cyclic groups or both cyclic groups and N-containing pendant groups in the desired concentrations. Accordingly, according to the number and type of such pendant groups, the polymers of this invention can have various functions such as hydrophilicity, oxidative-reductive ability, color-forming ability, chelate-forming ability, ion-dissociability, and other reactivities, and they are available as linear polymers or cross-linked polymers having the desired density of crosslinking. Hence, these polymers can be used in various ultimate usages according to these functions and/or reactivities in the form of a composition, shaped article or composite structure conforming to these usages.

The following Examples and Referential Examples illustrate the present invention.

Part A and Part B below are Referential Examples which illustrate the nitro-containing aromatic polymers used for the preparation of the aromatic polymers of this invention containing a nitrogen-containing cyclic group, the method for preparing such nitro-containing aromatic polymers, the amino-containing aromatic polymers, and the method for producing the amino-containing aromatic polymers. As previously stated, the aromatic polymers containing a nitrogen-containing cyclic group in accordance with this invention are not limited to those prepared from the polymers produced in these Referential Examples.

Part C, on the other hand, illustrate the aromatic polymers of this invention containing a nitrogen-containing cyclic group, the method for their preparation, and the characteristics of these polymers.

Unless otherwise specified, the inherent viscosity ($\eta_{inh}$) of the polymer is measured at 30° C. on an N-methyl pyrrolidone solution of the polymer in a concentration of 0.5 g/100 ml.

Part A

(Preparation of Nitro-Containing Aromatic Polymers)

Referential Example A-1

In a 300 ml. three-necked flask equipped with a nitrogen introducing tube, a cooler and a stirrer, 10.0 g (0.05 mol) of 4,4'-diaminodiphenyl ether and 10.6 g (0.1 mol) of sodium carbonate were dissolved in 120 ml. of dimethyl sulfoxide. The sodium carbonate remained insoluble in the solution. With stirring, 18.85 g (0.05 mol) of 3,3'-dinitro-4,4'-dichlorodiphenylsulfone was poured into the solution. The solution became reddish brown. The temperature was raised to 120° C., and the reaction was continued for 20 hours. A reddish brown viscous solution was obtained.

The solution was poured into water, and the precipitate was thoroughly washed and dried to afford a reddish orange powder. This polymer had an inerent viscosity ($\eta_{inh}$) of 1.00, and was soluble in amide-type solvents such as N-methyl pyrrolidone, N,N-dimethyl acetamide, or dimethyl formamide, dimethyl sulfoxide, tetramethylene sulfone, nitrobenzene, tetramethyleneurea, and pyridine.

A film prepared from an N-methyl pyrrolidone solution of the polymer was tough, and its infrared absorption spectrum showed an absorption ascribable to the imine at 3350 $cm^{-1}$, and an absorption ascribable to the nitro group at 1560 $cm^{-1}$.

The elemental analysis values for this polymer were as follows:

Found: C. 56.14%; H, 3.0%; N, 10.95%; S, 6.72%.
Calculated: C, 57.13%; H, 3.17%; N, 11.11%; S, 6.35%.

From the results of the infrared absorption spectrum and the elemental analysis values, the polymer was found to be polyimine having the following recuring unit (a-1)

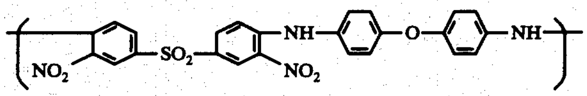

A thermogravimetrical analysis of the polymer showed that there was scarcely any weight decrease, nor was it softened, in atmospheric air up to a temperature of 300° C. at a temperature raising rate of 5° C/min.

A 15.0% by weight N-methyl pyrrolidone solution of this polymer was cast on a glass plate, and dried at 150° C. for 20 minutes and at 220° C. for 30 minutes to form a film having a thickness of 50 microns. A rectangular piece with a width of 1 cm was cut off from this film. It was found to have a tensile strength of 10 $Kg/mm^2$ and an elongation of 10% by means of an Instron Tensile Tester.

Referential Example A-2

The various raw materials shown in Table 1 were polymerized in the same way as in Referential Example 1 to form polymers having recurring units (a-2) to (a-8)

Where there is a reference to ($H_2SO_4$) in the column of ($\eta_{inh}$) in Table 1 [polymer (a-2)], the inherent viscosity was measured in conc. sulfuric acid because the polymer (a-2) was insoluble in amide-type solvents.

Table 1
Raw Materials
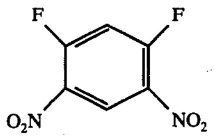
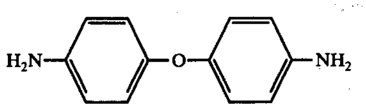
Polymer
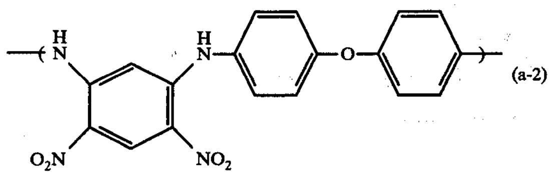 (a-2)
ηinh 0.23 ($H_2SO_4$)
Raw Materials
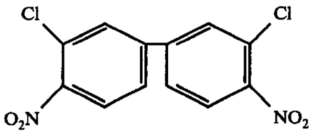
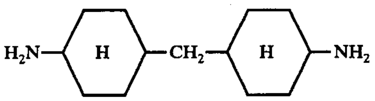 (cis/trans mixture)
Polymer
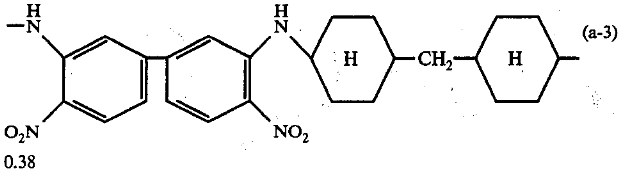 (a-3)
ηinh 0.38
Raw Materials
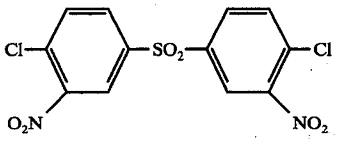 (0.1 mol)
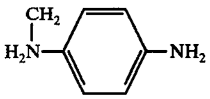
(0.02 mol)
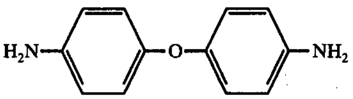
(0.08 mol)
Polymer
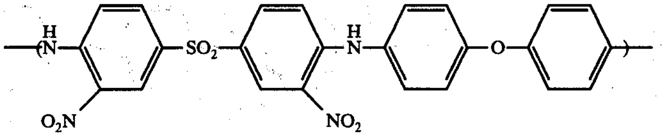 0.8
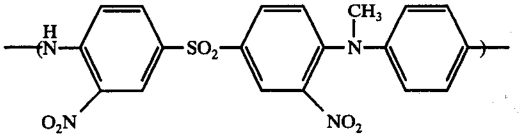 0.2 (a-4)
ηinh 0.42
Raw Materials
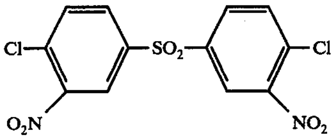 (0.1 mol)

Table 1-continued
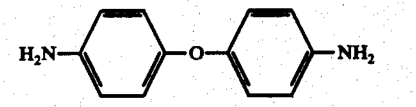 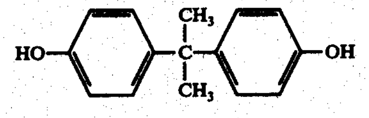
0.03 0.07
Polymer
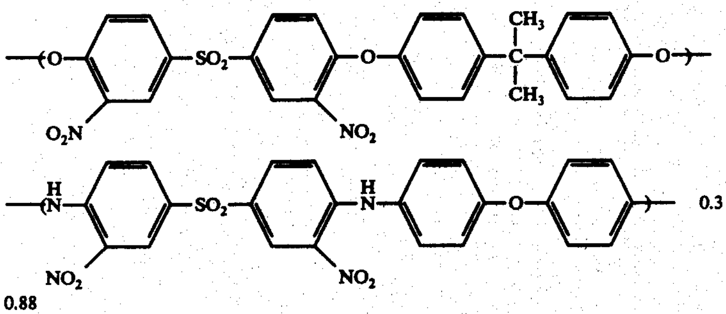
0.7
0.3 (a-5)
ηinh 0.88
Raw Material
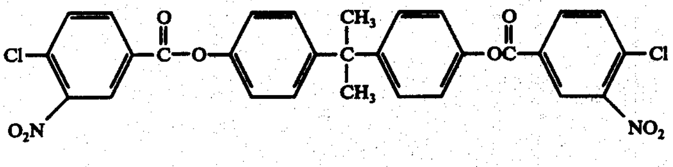
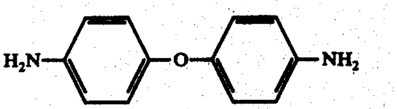
Polymer (a-6)
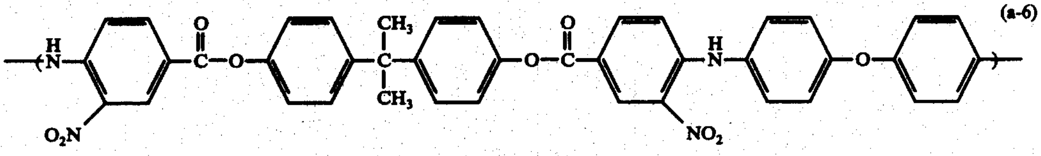
ηinh 0.65
Raw Material
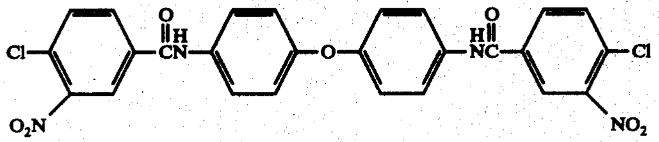
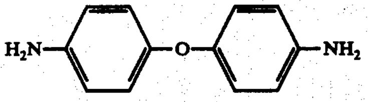
Polymer
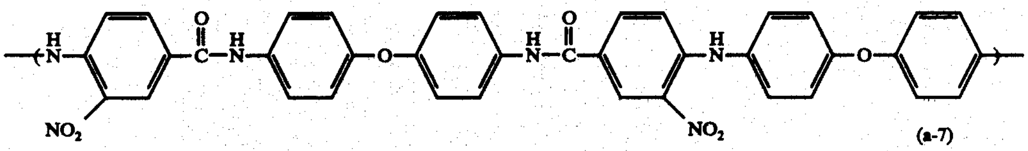
(a-7)
ηinh 0.36
Raw Materials
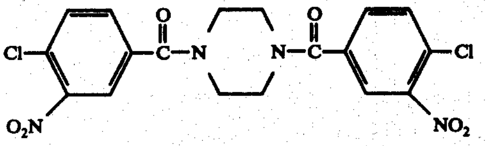
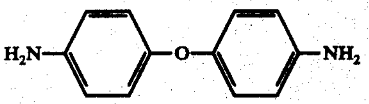

Table 1-continued

| | |
|---|---|
| Polymer | 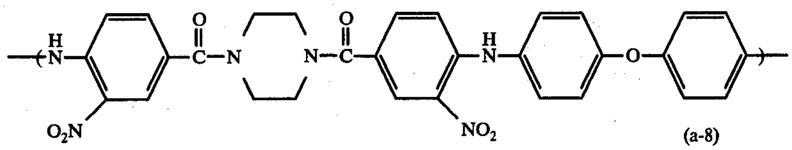 (a-8) |
| ηinh | 0.45 |

Referential Example A-3

In a three-necked flask equipped with a nitrogen introducing tube, a distilling device and a stirrer, 10.9 g (0.1 mol) of p-aminophenol, 120 ml. of dimethyl sulfoxide and 100 ml. of chlorobenzene were mixed, and 0.1 mol of sodium hydroxide was added as a 50% aqueous solution to the resulting solution. With stirring, water was removed by azeotropic distillation in an atmosphere of nitrogen. The temperature was further raised to 155° to 160° C. to distill off chlorobenzene. There was obtained an anhydrous dimethyl sulfoxide solution of a sodium salt of p-aminophenol. The distilling device was replaced by a cooler.

To the resulting solution were added 21.2 g (0.2 mol) of sodium carbonate and 37.70 g (0.1 mol) of 3,3'-dinitro-4,4'-dichlorodiphenylsulfone. The temperature was gradually raised, and the reaction was performed at 120° to 140° C. for 10 hours to afford a light yellow viscous solution.

The solution was poured into water. The precipitate was thoroughly washed, and dried to afford a polymer as a light yellow powder. The resulting polymer had an inherent viscosity of 0.49, and was soluble in amide-type solvents such as N-methyl pyrrolidone or dimethyl formamide. A tough film could be prepared from an N-methyl pyrrolidone solution of the polymer. The elemental analysis values of the polymer were as follows:

Found: C, 51.96; H, 2.98%; N, 10.01%; S, 7.54%. Calculated: C, 52,30; H, 2.69%; N, 10.17%; S, 7.76%.

From the results of the infrared absorption spectrum and the elemental analysis values, the polymer obtained was found to be polyether imine having the following recurring unit

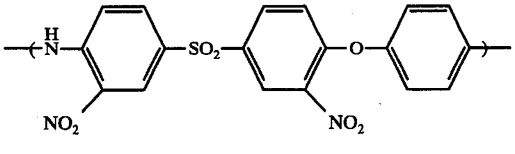

(a-9).

According to a thermogravimetric analysis, this polymer hardly showed any decrease in weight up to a temperature of 350° C. at a temperature raising rate of 5° C./min. in an atmosphere of nitrogen.

Referential Example A-4

Example 3 was repeated except that 53.73 g (0.1 mol) of 4,4'-(p,p'-dichloro-m,m'-dinitrobenzoyl) diphenyl ether was used instead of the 3,3'-dinitro-4,4'-dichlorodiphenylsulfone. The resulting polymer had an inherent viscosity of 0.45. From the infrared absorption spectrum and elemental analysis, the polymer was identified as one having the following structural formula:

(a-10)

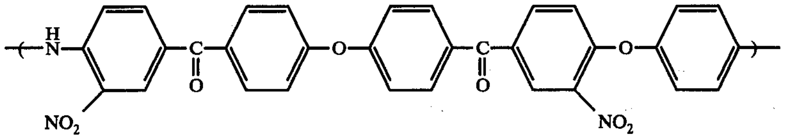

Referential Example A-5

In a 100 ml. three-necked flask equipped with a nitrogen introducing tube, a cooler, and a stirrer, 2.00 g (0.01 mol) of 4,4'-diaminodiphenyl ether and 1.57 g (0.02 mol) of lithium carbonate were dissolved in 25 ml. of N-methyl pyrrolidone. The lithium carbonate remained undissolved in the solution. While cooling the reaction system with an ice bath, 2.20 g (0.01 mol) of 3-nitro-4-chlorobenzoyl chloride was poured into the solution. The reaction solution turned green. Stirring was continued for about 1 hour on an ice bath, and then the temperature was raised to 100° C. The reaction was performed for another 10 hours at this temperature, when the reaction mixture turned deep red to form a viscous solution.

The solution was poured into a large quantity of water. The precipitate was washed fully, and dried to afford a polymer as a red powder having an inherent viscosity of 0.51. The polymer was soluble in amide-type solvents such as N,N-dimethyl acetamide, and dimethyl sulfoxide.

The infrared absorption spectrum of the polymer showed characteristic absorptions at 1660 $cm^{-1}$ and 1530 $cm^{-1}$ ascribable to the amide group.

The elemental analysis values of the polymer were as follows:

Found: C, 65.43%; H, 3.97%; N, 11.90%. Calculated: C, 65.69%; H, 3.78%; N, 12.10%.

From the results of the elemental analysis and the infrared absorption spectrum, the resulting polymer was identified as a polymer having the following recurring unit (a-11)

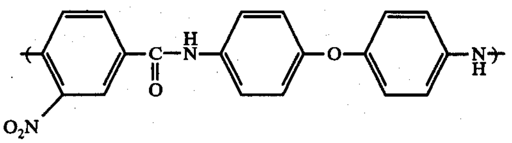

Referential Example A-6

The various raw materials shown in Table 2 were polymerized in the same way as in Referential Example A-5 to form polymers having recurring units (a-12) and (a-13).

Table 2

| | |
|---|---|
| Raw Materials | 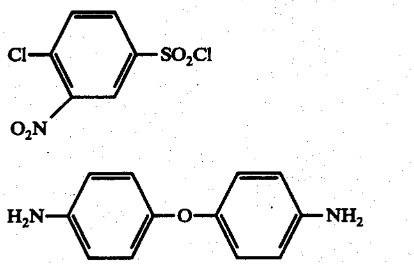 |
| Polymer | 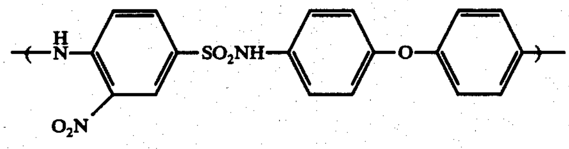 (a-12) |
| ηinh | 0.41 |
| Raw Materials | 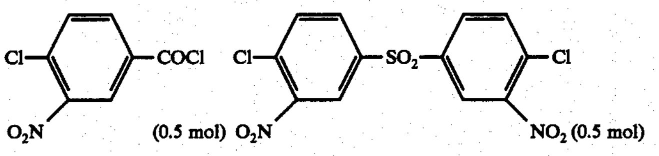 |
| Polymer | 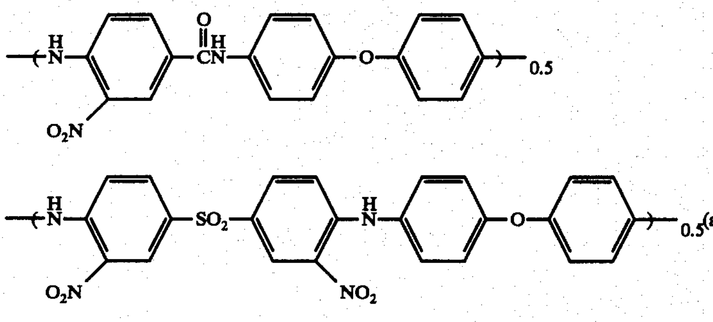 (a-13) |
| ηinh | 0.52 |

Referential Example A-7

In a three-necked flask equipped with a nitrogen introducing tube, a cooler and a stirrer, 2.00 g (0.01 mol) of 4,4'-diaminodiphenyl ether and 1.57 g (0.02 mol) of lithium carbonate were dissolved in 25 ml. of N-methyl pyrrolidone. At this time, the lithium carbonate did not dissolve completely. While cooling the reaction system with an ice bath, 0.40 g (0.002 mol) of isophthaloyl chloride and 3.02 g (0.008 mol) of 4,4'-dichloro-3,3'-dinitrodiphenyl sulfone were added. After stirring for about 1 hour on an ice bath, the reaction temperature was raised to 100° C., and the reaction was continued for another 10 hours at this temperature to afford a red viscous solution. The solution was poured into a large quantity of water to form a polymer as a red solid having an inherent viscosity of 0.61. The polymer was soluble in amide-type solvents, dimethyl sulfoxide and tetramethylene urea. The infrared absorption spectrum of the polymer showed absorptions ascribable to the amide group at 1650 $cm^{-1}$ and 1530 $cm^{-1}$. From the infrared absorption spectrum and elemental analysis values, the polymer was identified as a polymer having the following recurring unit

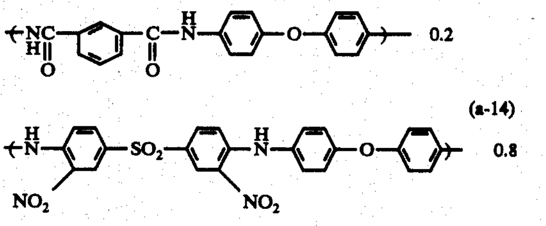

(a-14)

Referential Example A-8

Referential Example 8 was repeated except that 1.25 g (0.005 mol) of 4,4'-diphenylmethane diisocyanate was used instead of isophthaloyl chloride. The inherent viscosity of the polymer was 0.88.

From the infrared absorption spectrum and elemental analysis values of this polymer, it was identified as a polymer having the following recurring unit

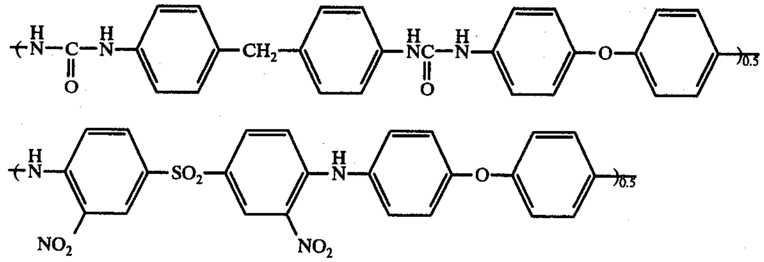

(a-15).

Referential Example A-9

In a three-necked flask equipped with a nitrogen introducing tube, a calcium chloride tube, and a stirrer, 2.00 g (0.01 mol) of 4,4'-diaminodiphenyl either was dissolved in 25 ml. of N-methyl pyrrolidone. The solution was fully cooled on an ice bath. To the solution was added 0.35 g (0.002 mol) of m-aminobenzoyl chloride hydrochloride, and the mixture was stirred further for about 1 hour. 1.96 g (0.025 mol) of lithium carbonate was added to the mixture, and after stirring for 10 minutes, 3.77 g (0.01 mol) of 4,4'-dichloro-3,3'-dinitrodiphenylsulfone was added. The temperature was raised to 100° C., and the polymerization reaction was continued at this temperature for 10 hours to afford a red viscous solution. When the solution was poured into a large quantity of water, a polymer was obtained as a red powder. The polymer had an inherent viscosity of 0.53. The infrared absorption spectrum of the polymer showed absorptions ascribable to the amide group at 1650 $cm^{-1}$ and 1530 $cm^{-1}$. From the results of the elemental analysis and infrared absorption spectrum, this polymer was identified as a polymer having the following recurring unit

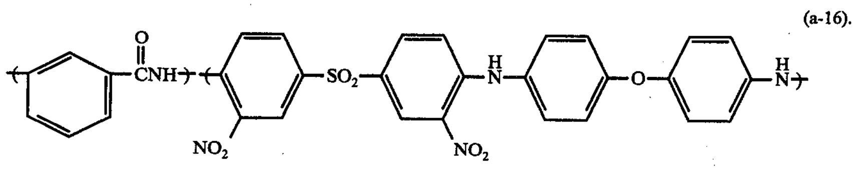

(a-16).

Referential Example A-10

In a three-necked flask equipped with a nitrogen introducing tube, a distilling device and a stirrer, 11.32 g (0.05 mol) of 4,4'-diamino-3,3'-dimethyldiphenylmethane was dissolved in 130 ml. of N-methyl pyrrolidone. To the solution 3.22 g (0.01 mol) of benzophenonetetracarboxylic anhydride and 30 ml. of xylene were added. The mixture was further heated at 180° to 200° C. to distill off the xylene and to remove water by azeotropic distillation. After a theoretical amount of water distilled out, the distilling device was replaced by a cooler equipped with a calcium chloride tube. The reaction system was cooled to 60° C., and with stirring, 7.84 g (0.1 mol) of lithium carbonate and 15.09 g (0.04 mol) of 4,4'-dichloro-3,3'-dinitrodiphenylsulfone were added, and the mixture was heated. Stirring was continued for 10 hours at 100° C. to afford a red viscous solution.

The solution was poured into a large quantity of water to afford a polymer as a red powder having an inherent viscosity of 0.52. The infrared absorption spectrum of this polymer showed characteristic absorptions ascribable to the imide group at 1780 $cm^{-1}$ and 1720 $cm^{-1}$ and an absorption ascribable to the imino group at 3350 $cm^{-1}$. From the results of the elemental analysis values and infrared absorption spectrum, this polymer was identified as a polymer having the following recurring unit

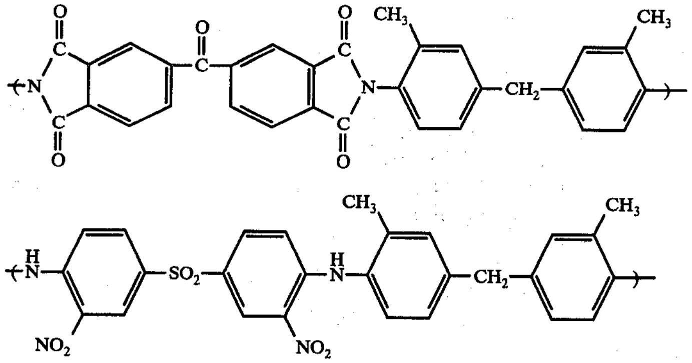

(2-17).

Referential Example A-11

In a three-necked flask equipped with a nitrogen introducing tube, a cooler and a stirrer, 0.90 g (0.01 mol) of 1,4-butanediol and a catalytic amount of triethylene diamine and tin (II) octenate were dissolved in 50 ml. of N-methyl pyrrolidone under ice cooling. Then, 5.02 g (0.02 mol) of diphenylmethane-4,4'-diisocyanate was added. After stirring for about 1 hour, 4.01 g (0.02 mol) of 4,4'-diaminodiphenyl ether was added. Stirring was continued for another one hour. Then, 3.77 g (0.01 mol) of 4,4'-dichloro-3,3'-dinitrodiphenylsulfone and 1.57 g (0.02 mol) of lithium carbonate were added to the reaction system. The ice bath was replaced by an oil bath, and the mixture was stirred at 120° C. for 10 hours with stirring. After the reaction, the reaction mixture was added to a large quantity of water to afford a polymer having an inherent viscosity of 0.38. The infrared absorption spectrum of this polymer showed absorptions ascribable to the urethane and urea groups in the vicinity of 1730 $cm^{-1}$ to 1700 $cm^{-1}$.

From the results of the infrared absorption spectrum and the elemental analysis, this polymer was identified as a polymer having the following recurring unit (a-18)

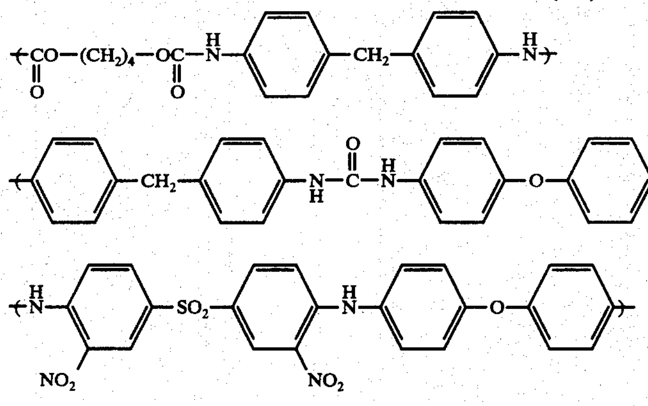

After this reducing procedure, the polymer was washed thoroughly with a large quantity of water, and dried at room temperature under reduced pressure.

The resulting white yellow polymer was soluble in amide-type solvents, dimethyl sulfoxide and a mixture of water and acetone. The inherent viscosity of the polymer was 0.81.

The elemental analysis values of the resulting polymer were as follows:

Found: C, 63.23%; H, 4.05%, N, 12.85%, S, 6.74%.

The calculated values for polyamino imine resulting from the reduction of the nitro group of the original polymer were as follows:

Calculated: C, 64.86%. H, 4.50%, N, 12.61%, S, 7.21. These calculated values substantially corresponded with the values as found.

A thin film prepared from an N,N-dimethyl acetamide solution of this polymer was analyzed for infrared absorption spectrum. It was found that an absorption considered to be ascribable to the nitro group bonded to the aromatic nucleus in the vicinity of 1560 $cm^{-1}$ disappeared completely, and absorptions ascribable to the amino group were observed in the vicinity of 3350 $cm^{-1}$ and 3450 $cm^{-1}$.

Part B (Preparation of Amino-Containing Aromatic Polymers)

Referential Example B-1

10.0 g of the reddish brown flaky polymer (a-1) obtained by the method of Referential Example A-1 was poured into a mixture of 300 ml. of methanol and 500 ml. of water. With stirring, the temperature was maintained at 75° to 80° C., and 150 g of anhydrous sodium hydrosulfite was poured into the mixture over the course of about 30 minutes. The mixture was stirred for another 2 hours at this temperature. The flaky polymer present in the heterogeneous state in the solution gradually turned from reddish brown to white yellow.

From the results of the elemental analysis values and the infrared absorption spectrum, the polymer was identified as polyaminoimine having the following recurring unit (b-1)

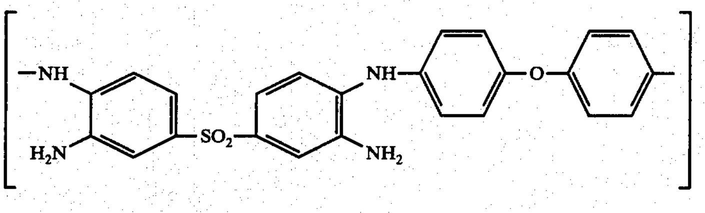

A thin film was prepared from this polymer, and heated on a hot plate to a temperature of 300° C. The shape of the film scarcely changed, and it showed good thermal stability. However, the colorless transparent film gradually began to turn purple at about 120° C., and became insoluble (gel) in organic solvents. Furthermore, this film had high water absorption of 13% at 100% RH.

The polymer was thermogravimetrically analyzed in an atmosphere of nitrogen by heating at a rate of 5° C./min. It was found that at 100° C., adsorbed water separated, and there was hardly any decrease in weight up to 400° C.

Referential Example B-2

A mixture consisting of 2.52 g of the polymer (a-1), 40 ml. of N-methyl pyrrolidone and 0.3 g of palladium oxide (PdO) was charged into a 100 ml. autoclave, and then hydrogen was introduced into the autoclave to a pressure of 40 $Kg/cm^2$. While stirring the solution, the polymer was reacted at 95° to 100° C. for about 80 hours. The catalyst was removed by means of a glass filter, and the reaction product was poured into a large quantity of water. A polymer having an inherent viscosity of 0.68 was obtained as white purple flakes. The polymer was soluble in amide-type solvents and dimethyl sulfoxide. A film prepared from an N-methyl pyrrolidone solution of the polymer showed an infrared absorption spectrum corresponding exactly with that of the polyaminoimine (b-1) obtained in Example 1.

Referential Example B-3

5.04 g of the polymer (a-1) was dissolved in 100 ml. of N-methyl pyrrolidone. With stirring, 3.0 g of water and 21.0 g of anhydrous sodium hydrosulfite were added. While forming a suspension, the temperature was raised to 60° C. Two hours later, the reaction mixture was poured into a large quantity of water to recover a light red polymer.

The ultraviolet absorption spectrum of an N-methyl pyrrolidione solution each of the nitro-containing polymer (a-1), the polymer (b-1) obtained in Example 1, and the polymer obtained in this Example was measured. The polymer (a-1) had an absorption maximum at 415 nm and a molecular extinction coefficient o. $1.18 \times 10^4$ 1/mole.cm. On the other hand, the polymer (b-1) did not have an absorption maximum at a longer wavelength than 400 nm.

The content of the nitro group in the polymer obtained in this Example was measured from the absorbance at 415 nm and 500 nm in its ultraviolet spectrum, and found to be about 60%. Accordingly, this polymer was identified as having the following structural unit

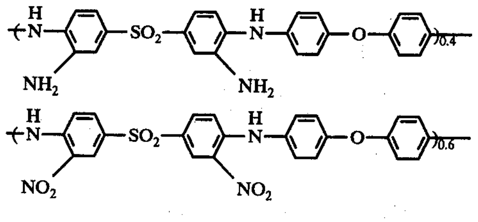
(b-1')

A thin film prepared from an N-methyl pyrrolidone solution of this polymer had an infrared absorption spectrum which showed that there was an absorption ascribable to the amino group in the vicinity of 1600 $cm^{-1}$ to 1640 $cm^{-1}$, and an absorption in the vicinity of 1560 $cm^{-1}$ considered to be ascribable to the nitro group was weaker than that in the polymer (a-1).

The polymer (b-1') was again dissolved in 100 ml. of N-methyl pyrrolidone, and 3.0 g of water and 21.0 g of anhydrous sodium hydrosulfite were added. The mixture was stirred for 3 hours at 60° C., and the reaction mixture was added to a large quantity of water to afford a grayish white polymer.

In the ultraviolet absorption spectrum of an N-methyl pyrrolidione solution of this polymer, no absorption maximum was observed at 415 nm. Furthermore, in the infrared absorption spectrum of a film prepared from an N-methyl pyrrolidone solution of the polymer, the absorption at 1560 $cm^{-1}$ completely disappeared, and the absorption spectrum chart corresponded exactly with that of the polymer obtained in Example 1.

Referential Example B-4

The nitro-containing polymers having the recurring units (a-2) to (a-18) obtained in Referential Examples A-1 to A-11 were reduced by any of the methods used in Referential Examples B-1 to B-3 to form amino-containing polymers (b-2) to (b-18) shown in Table 3.

In the Table, the reducing method X is the method used in Referential Example B-1; the reducing method Y, the method used in Referential Example B-2; and the reducing method Z, the method of Referential Example B-3 by which the reduction was carried out completely.

Table 3

| Polymer No. | Structure of polymer | $\eta_{inh}$ | Reducing method |
|---|---|---|---|
| b-2 | 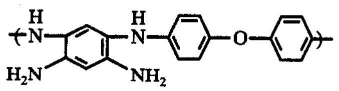 | 0.20 | X |
| b-3 | 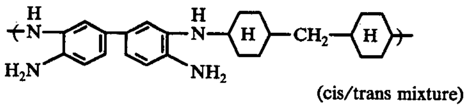 (cis/trans mixture) | 0.35 | Y |
| b-4 | 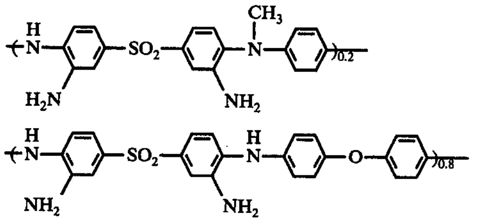 | 0.36 | X |

Table 3-continued
| Polymer No. | Structure of polymer | $\eta_{inh}$ | Reducing method |
|---|---|---|---|
| b-5 | 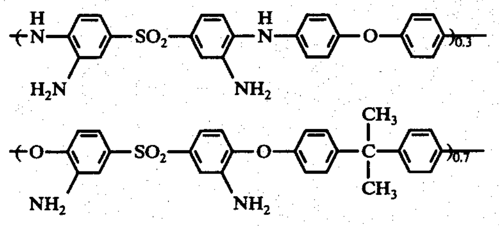 | 0.58 | Z |
| b-6 | 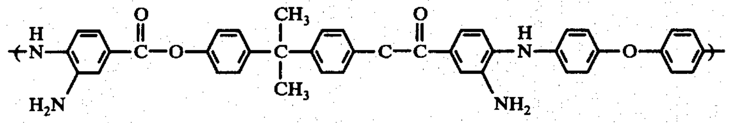 | 0.55 | Y |
| b-7 | 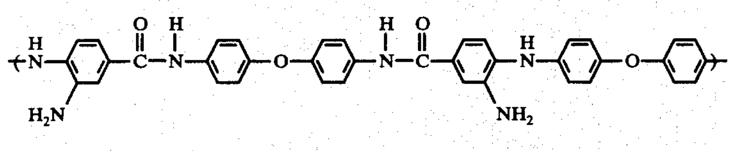 | 0.35 | Y |
| b-8 | 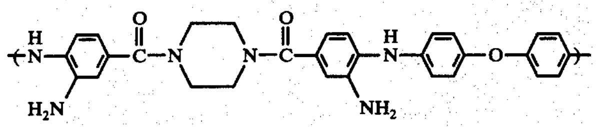 | 0.40 | X |
| b-9 | 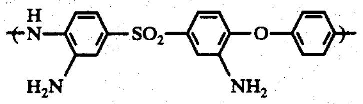 | 0.42 | X |
| b-10 | 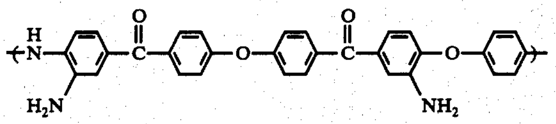 | 0.39 | Y |
| b-11 | 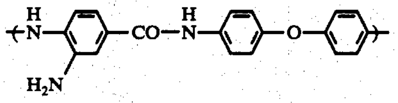 | 0.43 | Z |
| b-12 | 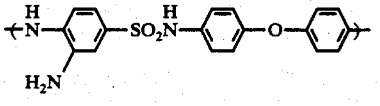 | 0.35 | Z |
| b-13 | 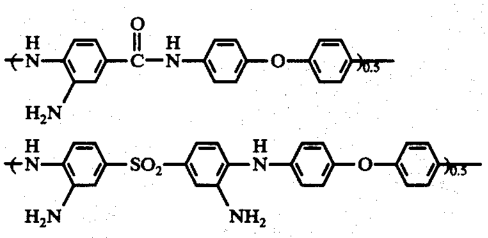 | 0.45 | Z |
| b-14 | 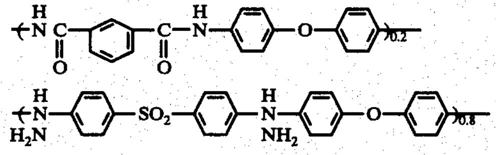 | 0.58 | X |
| b-15 | 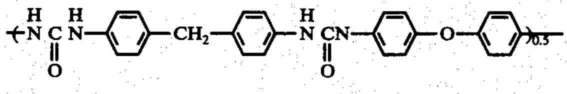 | 0.81 | X |

Table 3-continued

| Polymer No. | Structure of polymer | $\eta_{inh}$ | Reducing method |
|---|---|---|---|
| | 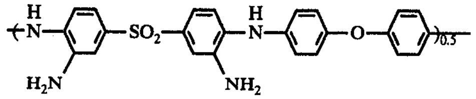 | | |
| b-16 | 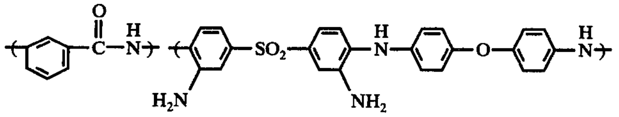 | 0.43 | Z |
| b-17 | 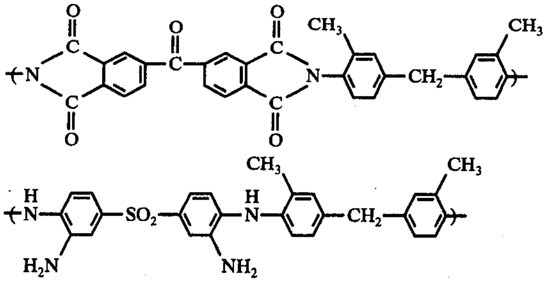 | 0.45 | X |
| b-18 | 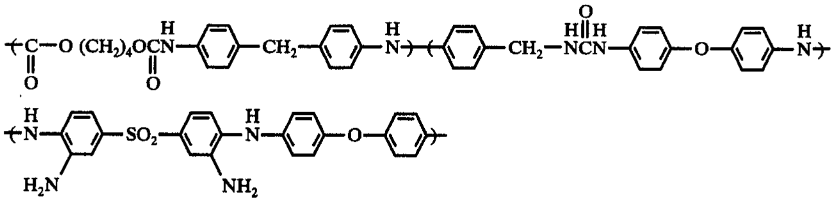 | 0.30 | X |

Part C (present invention)

Aromatic polymers containing a nitrogen-containing cyclic group, methods for their preparation, and the various properties of these polymers The water flux (l/m$^2$/day) is a value per micron of a homogeneous membrane unless otherwise specified.

EXAMPLE 1

In a three-necked flask equipped with a stirrer, a nitrogen-introducing tube and a calcium chloride tube, 4.42 g of the polymer (b-1) was dissolved in 50 ml. of N-methyl pyrrolidone. To the solution was added 0.95 g of sodium carbonate, and with vagorous stirring, 2.19 g of ethyl chlorocarbonate was added portionwise. The solution was stirred for about 1 hour at room temperature, and heated over an oil bath at 160° C. for 3 hours. After the reaction, the reaction mixture was poured into a large excess of water, filtered, and dried to afford a light yellow polymer. The polymer had an inherent viscosity of 0.85. The polymer had the following elemental analysis values.

Found: C, 60.17%, H, 3.85%, N, 10.25%, S, 6.35%. Calculated: C, 62.89%, H, 3.25%, N, 11.29%, S, 6.46%.

The resulting polymer was soluble in aprotic polar solvents such as N,N'-dimethyl formamide, N,N-dimethyl acetamide, diemthyl sulfoxide or N-methyl pyrrolidone an such solvents as formic acid, sulfuric acid or pyridine, and swellable with acetic acid, hydrochloric acid and methyl ethyl ketone. Tough films could be prepared by casting from their solutions in these aprotic polar solvents, followed by drying.

The infrared absorption spectrum of a film prepared by casting from its N-methyl pyrrolidone solution showed an absorption inherent to a benzimidazolone group in the vicinity of 1730 cm$^{-1}$, 1620 cm$^{-1}$, 1505 cm$^{-1}$ and 1190 cm$^{-1}$.

In the NMR spectrum of this polymer in dimethylsulfoxide-$d_6$, an absorption adcribable to the ethyl group of the urethane group and an absorption of unreacted -$NH_2$ were not observed. From this fact, this polymer was identified as a polymer having a benzimidazolone group expressed by the following formula

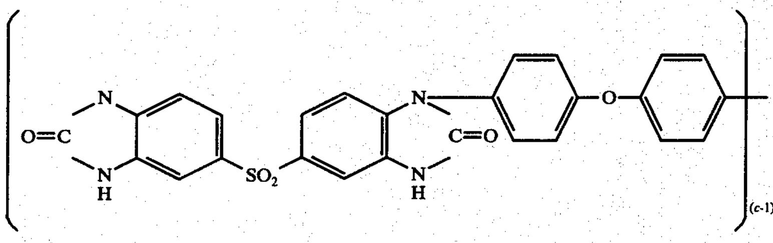
(c-1)

A thermogravimetric analysis of this polymer at a temperature elevating rate of 5° C./min. showed that it neither showed a weight decrease nor softening at a temperature of up to 450° C. in air.

A 10% N-methylpyrrolidone solution of the polymer was cast on a glass plate, and dried at 150° C. for 20 minutes, and then at 220° C. for 30 minutes to form a film having a thickness of 50microns.

This film had a tensil strength of 8.3 $kg/mm^2$ and an elongation of 8.0% as measured by means of an Instron Tensile Tester. The water absorption of the film as determined from the difference between the dry weight of the film dried under the same conditions as above and the water-absorbed weight of the film after immersion in hot water at 40° C. for 9 hours was 12.2%.

1.0 g of the resulting polymer (c-1) was dissolved in 9.0 g of N-methyl pyrrolidone at 60° C. to form a film-forming dope. The dope was cast on a well-polished glass plate using a doctor blade with a clearance of 120 microns, and dried at 130° C. for 30 minutes and at 150° C. for 1 hour. Then, the film was peeled off from the glass plate in water.

A part (larger than a membrane area required for a reverse osmosis test to be described hereinbelow) of the resulting film was placed in a pressurizable vessel together with a filter paper and a perforated plate to set them in the order of the film, the filter paper, and the perforated plate. A 0.5% by weight aqueous solution of crystal violet have a molecular weight of 570 and assuming a deep blue color was poured into the space on the film side, and the vessel was placed under a pressure of 1.5 $kg/cm^2$ for about 5 minutes. Then, the pressure was returned to normal atmospheric pressure, and the deep blue aqueous solution was removed from the vessel. The dye adhering to the surface of the film was washed with water, and the film and the filter paper were withdrawn from the vessel. The absence of pinholes in the film was ascertained from the observation that there was no spot of deep blue on the filter paper.

The resulting film having a thickness of 5.3 microns was mounted in a reverse osmosis test cell, and tested for its performance. The reverse osmosis test was conducted by using an experimental cell with an effective membrane area of 11 $cm^2$, and mounting the film, a porous base material (Millipore Filter VMWP 04700, a product of Millipore Company) and sintered metal (with a pore size of 3 microns) in this order in the cell. The operating conditions were: a 1.0% aqueous solution of sodium chloride; a pressure of 100 kg/cm; a temperature of 30° C.; the rate of circulation of water being 100 l/hour. It was found that the water flux was 81.1 $l/m^2$/day. The salt rejection determined by the measurement of electric conductivity was 99.86%. After continuous operation for a week, hardly any change was observed in the properties of the membrane.

Comparative Example 0.5 part of cellulose acetate having a degree of polymerization of 170 and a degree of acetylation of 40 was dissolved in acetone, and dried at room temperature for 5 minutes and at 70° C. for 1 hour to form a film having a thickness of 3.3 microns.

The reverse osmosis test was conducted using this film in the same way as in Example 1. The water flux was 87.1 $l/m^2$/day, and the salt rejection was 99.7%.

A film-forming dope consisting of 10 parts of the benzimidazolone-containing polymer obtained in Example 1, 3 parts of lithium chloride and 90 parts of N-methyl pyrrolidone was prepared. The dope was cast on a glass plate by means of a doctor blade with a clearance of 350 microns, and dried at 130° C. for 14 minutes. Then, the glass plate was immersed in a large quantity of ion-exchange water for 48 hours to remove the residual matter in the membrane and thus to obtain an anisotropic membrane. The membrane was subjected to a reverse osmosis test under the same conditions as in Example 1. After 10 minutes from the start of the operation, the membrane showed a water flux of 1,032 $l/m^2$/day, and 24 hours later, showed a water flux of 730 $l/m^2$/day and a salt rejection 99.1%.

EXAMPLE 2

In a three-necked flask equipped with a stirrer, a nitrogen introducing tube and a calcium chloride liquid cooling tube, 4.42 g of the polymer (b-1) was dissolved in 50 ml. of N-methyl pyrrolidone. At room temperature, 0.55 g of lithium carbonate was added, and then 0.76 g of ethyl chlorocarbonate was added portionwise. The solution was stirred at room temperature for 1 hour, and poured into a large excess of water to afford a light brown powder.

The NMR spectrum at 100 NHz of the resulting polymer was measured using dimethyl sulfoxide-$d_6$ as a solvent. The following were observed.

$CH_3$ (1.2 ppm, triplet), —$CH_2$— (4.2 ppm, quartet), —$NH_2$ (5.2 ppm, broad singlet), phenyl proton (7–7.2 ppm, multiplet), —NH— of the main chain (8.0 ppm, singlet), and —NHCOO— (8.9 ppm, singlet). The ratio of the total phenyl proton to the methyl proton was 6.8 (calculated, 6.67), and the ratio of the —$NH_2$ proton to the methyl proton was 1.3 (calculated, 1.24). From this, it was confirmed that the resulting polymer was a derivative (b-1) having about 35% of an ethyl urethane group in the side chain.

The resulting polymer was dissolved in 60 ml. of N-methyl pyrrolidone, and the solution was heated over an oil bath at 160° C. for 3 hours. After the reaction, the solution was added to a large excess of water to recover the polymer as a powder.

In the NMR spectrum of the resulting polymer in dimethyl sulfoxide-$d_6$, absorptions of $CH_3$—, —$CH_2$—, and —NHCOO— were not observed at all, and the ratio of the total phenyl proton to $-NH_2$ was found to be 5.5, which substantially corresponded with the calculated value of 5.38.

Accordingly, it was confirmed that the resulting polymer was a copolymer (b-1) containing about 35% of benzimidazolene.

This polymer was soluble in the solvents exemplified in Example 1, and had an inherent viscosity of 0.82.

A homogeneous membrane of the polymer having a thickness of 6 microns obtained in the same way as in Example 1 was subjected to the same reverse osmosis test. The membrane showed a water flux of 30 $l/m^2/day$, and a salt rejection of 98.5%.

EXAMPLE 3

4.42 g of the polymer (b-1) was dissolved in 50 ml. of N-methyl pyrrolidone, and 0.95 g of sodium carbonate was added. With vigorous stirring, 2.19 g of ethyl chlorocarbonate was added to the solution portion-wise. The solution was stirred at room temperature for 1 hour, and added to a large excess of water to afford 5.86 g of a light yellow polymer.

In the NMR spectrum of this polymer in dimethyl sulfoxide-$d_6$, the protons shown in Example 2 were observed. The $-NH_2$ absorption was not observed even when $D_2O$ or DCl was added. The proton ratios found corresponded with the calculated values. It was confirmed that this polymer was polyimine containing $-NHCOOC_2H_5$ in its side chain.

5.0 g of the polymer was dissolved in 100 ml. of N-methyl pyrrolidone, and with stirring, the solution was heated over an oil bath. The solution was stirred at 150° C. for about 0.5 hour, and then added to a large excess of water. In the NMR spectrum of the resulting polymer, it was observed that the absorptions of —NH-COO— proton ascribable to the urethane group, $-CH_2-$ and $-CH_3$ ascribable to the ethyl group became weak. The ratio of the total phenyl proton to the $-CH_3$ proton was about 4.7, corresponded substantially with the calculated value of 4.66 in the case of 50% cyclization.

From this fact, it was confirmed that this polymer was a copolymer with an ethylurethane derivative containing about 50% of benzimidazolone.

The polymer obtained had an inherent viscosity of 0.83, and was soluble in the solvents exemplified in Example 1. A homogeneous membrane having a thickness of 5.8 microns was prepared from this polymer in the same way as in Example 1, and subjected to the same reverse osmosis test. The membrane showed a water flux of 72 $l/m^2/day$ and a salt rejection of 99.1%.

EXAMPLE 4

Polymer (b-1') containing about 60% of nitro groups and 40% of amino groups was prepared in N-methyl pyrrolidone in the same way as in Referential Example B-3. 0.43 g of sodium carbonate was added to an N-methyl pyrrolidone solution of this polymer (b-1'), and with stirring 4.5 g of ethyl chlorocarbonate was added. The solution was continued at room temperature for about 1 hour. The temperature was raised to 160° C., and the solution was stirred for an additional 3 hours, followed by being poured into a large excess of water to afford a light red polymer having an inherent viscosity of 0.75. The polymer was found to be soluble in the various solvents exemplified in Example 1.

From the ultraviolet spectrum of the resulting polymer in N-methyl pyrrolidone, it was confirmed that the nitro content of the polymer was the same as that of the starting polymer (b-1'). In the infrared absorption spectrum of a film of this polymer, the amino absorption in the vicinity of 1600 $cm^{-1}$ to 1640 $cm^{-1}$ disappeared, and a new absorption ascribable to benzimidazolone was observed in the vicinity of 1730 $cm^{-1}$.

From this fact, it was confirmed that this polymer was a copolymer containing 60% of nitro groups and 40% of a benzimidazolone group.

EXAMPLE 5

3.00 g of the polymer (b-1) was dissolved in 30 ml. of N-methyl pyrrolidone, and with vigorous stirring, 2.69 g of phenyl chlorocarbonate was added at room temperature. They were reacted at room temperature for 4 hours, and then the solution was further heated for 7 hours at 170° C. The infrared absorption spectrum of a film obtained by casting from the resulting reaction solution coincided completely with that of the polymer obtained in Example 1. The reaction solution was added to a large amount of water to afford a polymer having an inherent viscosity of 0.83. The solubility of this polymer was the same as that of the polymer obtained in Example 1.

A homogeneous membrane obtained from the polymer had the same properties as in the case of Example 1.

EXAMPLE 6

2.60 g of the polymer (b-1) was dissolved in 20 ml. of N-methyl pyrrolidone, and 1.20 g of phenyl isocyanate was added. The mixture was stirred at room temperature for about 2 hours. In the infrared absorption spectrum of a film cast from the resulting reaction solution, an absorption ascribable to the urea linkage was observed at 1660 $cm^{-1}$ and 1540 $cm^{-1}$. The reaction solution was heated to 110° C., and reacted for 6 hours at this temperature. After the reaction, the reaction mixture was added to a large amount of water, and the resulting polymer was recovered. The polymer had an inherent viscosity of 0.92. In the infrared absorption of a film prepared by casting from an N-methyl pyrrolidone solution of the resulting polymer, the absorption at 1640 $cm^{-1}$ and 1540 $cm^{-1}$ disappeared, and a new strong absorption appeared at 1720 $cm^{-1}$, when it was compared with the spectrum of the urea derivative. It was also ascertained that the absorption at 1450 $cm^{-1}$ disappeared as a result of heating. This infrared absorption spectrum quite corresponded with that of the polymer obtained in Example 1. The NMR spectrum of the polymer in dimethyl sulfoxide-$d_6$ also corresponded completely with that of the polymer obtained in Example 1. From this, the formation of an imidazolone compound could be confirmed. Tough films can be obtained by casting a solution of this polymer in such as solvent as N-methyl pyrrolidone, dimethyl sulfoxide, N,N-dimethyl acetamide or N,N-dimethyl formamide.

EXAMPLE 7

2.00 g of the polymer (b-1) was dissolved in 20 ml. of N-methyl pyrrolidone, and the solution was heated to 140° C. Then, 2.08 g of diphenyl carbonate was added to this solution. The solution was heated to 160° C. and stirred for 6 hours. After the reaction, the reaction mixture was added to a large amount of methanol to recover the resulting polymer. The polymer had an inherent viscosity of 0.80, and the infrared absorption spectrum of a film prepared by casting from an N-methyl pyrrolidone solution of this polymer corresponded with that of the polymer obtained in Example 6.

EXAMPLE 8

2.00 g of the polymer (b-1) was dissolved in 20 ml. of N-methyl pyrrolidone, and the solution was heated to 110° C. Then, 2.13 g of diphenyl urethane was added to the reaction solution. With stirring, it was heated to 160° C., and reacted at this temperature for 6 hours. The infrared absorption spectrum of a film prepared by casting from the resultant reaction solution corresponded substantially with that of the polymer obtained in Example 1. After the reaction, the reaction mixture was added to a large amount of methanol to recover the polymer. The polymer had an inherent viscosity of 0.81, and had the same solubility as the polymer obtained in Example 1.

EXAMPLE 9

4.46 g of the polymer (b-5) was dissolved in 50 ml. of N-methyl pyrrolidone, and 1.56 g of anhydrous lithium-carbonate was added, followed by further addition of 2.17 g of ethyl chlorocarbonate. The solution was stirred at room temperature for 1 hour, and then further stirred at 160° C. for 6 hours. After the reaction, the reaction mixture was added to a large amount of water to afford a light brown polymer. In the infrared absorption spectrum of this polymer, an absorption of imidazolone was observed in the vicinity of 1730 $cm^{-1}$. A characteristic absorption of urethane was observed in the vicinity of 1650 $cm^{-1}$ and 1410 $cm^{-1}$. On the other hand, in the NMR spectrum of this polymer in dimethyl sulfoxide-$d_6$, the ratio of the total phenyl proton to —NHCOO— proton and the ratio of the total phenyl proton to the —$CH_2$— proton of the ethyl group as found substantially corresponded with the calculated values. Accordingly, it was confirmed that this polymer was a copolymer with polyether sulfone containing a polymer unit containing about 30% of benzimidazolone, and 70% of urethane in the side chain. This polymer had an inherent viscosity of 0.60, and a tough film was prepared from an N-methyl pyrrolidone solution of the polymer. A homogeneous membrane having a thickness of 5.8 microns prepared from this polymer showed a water flux of 15 l/$m^2$/day and a salt rejection of 98.5%.

EXAMPLE 10

5.13 g of the polymer (b-10) was dissolved in 50 ml. of N-methyl pyrrolidone, and 2.12 g of sodium carbonate was added. Then, 3.14 g of phenyl chlorocarbonate was further added at room temperature. The solution was stirred at room temperature for 1 hour, and then heated over an oil bath at 160° C. for 4 hours. After the reaction, the reaction mixture was added to a large amount of water to afford a light yellow powder. This polymer had an inherent viscosity of 0.42, and a flexible tough film was prepared from an N-methyl pyrrolidone solution of this polymer. In the infrared absorption spectrum of this film, an absorption ascribable to imidazolone was found in the vicinity of 1730 $cm^{-1}$ and 1390 $cm^{-1}$, and an absorption ascribable to the urethane group was found in the vicinity of 1640 $cm^{-1}$ and 1420 $cm^{-1}$. In the NMR spectrum of this polymer, an absorption of proton ascribable to —NHCOO— of the urethane was observed at 8.92 ppm (singlet), and the integral intensity ratio of this proton to the total phenyl proton (7.0 ppm to 7.6 ppm) corresponded substantially with the calculated values.

From these facts, it was confirmed that this polymer was a copolymer containing a benzimidazolone-containing polymer unit and a phenyl urethane group in a ratio of 1:1.

EXAMPLE 11

1.96 g of the polymer (b-1) was dissolved in 20 ml. of N-methyl pyrrolidone, and 1.37 g of benzoyl chloride was added to this solution at room temperature with stirring, and the reaction was continued for about 2 hours. The infrared absorption spectrum of a film prepared by casting from the resulting reaction solution showed a characteristic amide absorption at 1660 $cm^{-1}$ and 1530 $cm^{-1}$.

The temperature of the solution was further elevated to 140° C., and the solution was stirred for 6 hours at this temperature. In the infrared absorption spectrum of a film prepared by casting from the resulting reaction solution, the characteristic amide absorption disappeared, and a new absorption inherent to a benzimidazole group was observed at 1380 $cm^{-1}$, 900 $cm^{-1}$ and 760 $cm^{-1}$.

The resulting reaction solution was added to a large amount of water to afford polyether sulfone containing phenylbenzimidazole quantitatively. The polymer had an inherent viscosity of 0.77, and was soluble in aprotic polar solvents such as dimethyl acetamide or dimethyl sulfoxide.

A thermogravimetric analysis of this polymer in air at a temperature elevating rate of 5° C/min. showed that there was hardly any decrease in weight up to a temperature of 500° C.

A thin film with a thickness of 8.7 microns was prepared in the same way as in Example 1, and subjected to the same reverse osmosis test. The film showed a water flux of 20.5 l/$m^2$/day and a salt rejection of 99.81%.

In the same away as in Example 1, an anisotropic membrane of the polymer was prepared, and subjected to the same reverse osmosis test. In 10 minutes after the initiation of the operation, the membrane showed a water flux of 238 l/$m^2$/day, and 24 hours layer, the membrane showed a water flux of 195 l/$m^2$/day and a salt rejection of 98.9%.

EXAMPLE 12

2.00 g of the polymer (b-1) was dissolved in 20 ml. of N-methyl pyrrolidone, and with vigorous stirring at room temperature, 0.81 g of acetyl chloride was added. The solution was stirred at room temperature for about 1 hour, and heated to 130° C. With stirring, the solution was reacted at this temperature for about 8 hours. After the reaction, the reaction solution was cast to form a film. The infrared absorption spectrum of this film showed a reduction in a characteristic amide absorption, and a new characteristic benzimidazole absorption. The polymer had an inherent viscosity of 0.85. In the NMR spectrum of this polymer in dimethyl sulfoxide-$d_6$, a methyl absorption was observed at 2.45 ppm, and an absorption ascribable to —NH— of the amide, at 8.28 ppm. The integral intensity ratio of the proton of the amide group to the total phenyl proton was 1/13.8, and this shows that about 50% of the polymer was cyclized, From these facts, it was confirmed that the polymer was copolyether imine containing about 50% of a methyl benzimidazole unti and 50% of —$NHCOCH_3$.

A thermogravimetric analysis of this polymer showed that at a temperature raising rate of 5° C/min. in atmospheric air, there was hardly any decrease in weight, nor was it softened, up to a temperature of 350° C.

A 6.1 micron-thick film was prepared in the same way as in Example 1, and the reverse osmosis test was conducted. The film showed a water flux of 16.2 $l/m^2$/day, and a salt rejection of 99.1%.

EXAMPLE 13

2.76 g of the polymer (b-2) was dissolved in 30 ml. of N-methyl pyrrolidone. With stirring, 4.60 g of 2,4-dinitrophenyl acetate was added. While setting the reaction temperature at 60° C., the mixture was stirred for 5 hours, and then for 5 hours at 140° C. The reaction mixture obtained was poured into a large amount of methanol to recover the polymer. In the infrared absorption spectrum of this polymer, absorptions based on the amide group were still observed at 1660 $cm^{-1}$ and 1530 $cm^{-1}$, but weakened. The polymer had an inherent viscosity of 0.29. In the NMR spectrum of this polymer, an absorption of —NHCO— of the amide group was observed, and the intensity ratio of it to the total phenyl proton corresponded to the calculated value obtained on the assumption that about 50% of the amide group remained. The polymer was soluble in aprotic polar solvents such as N-methyl pyrrolidone, N,N-dimethyl acetamide, tetramethyleneurea, or dimethyl sulfoxide.

EXAMPLE 14

2.14 g of the polymer (b-4) was dissolved in 30 ml. of N-methyl pyrrolidone, and with vigorous stirring, 2.82 g of benzoyl chloride was added. At room temperature, the solution was stirred for 1 hour, and reacted at 140° C. for 6 hours. After the reaction, the reaction solution was poured into a large amount of water containing sodium carbonate to afford a yellow polymer. The resulting polymer had an inherent viscosity of 0.42, and was soluble in aprotic polar solents such as N-methyl pyrrolidone or dimethyl sulfoxide. The infrared absorption spectrum of the final product, as compared with that of a film prepared from the reaction solution obtained after stirring for 1 hour at room temperature showed a weakened absorption ascribable to the amide at 1670 $cm^{-1}$ and 1530 $cm^{-1}$, and a strong benzimidazole absorption at 1380 $cm^{-1}$, 990 $cm^{-1}$ and 760 $cm^{-1}$.

In the NMR spectrum of this polymer in dimethyl sulfoxide-$d_6$, an —NHCO— proton of the amide group and a methyl proton of

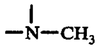

were observed. The ratio of the total phenyl proton to the amide proton corresponded substantially with the calculated value obtained on the assumption that the polymer was one containing about 80% of a benzimidazole ring.

EXAMPLE 15

2.33 g of the polymer (b-1) was dissolved in 25 ml. of N-methyl pyrrolidone, and 1.10 g of benzaldehyde was added at room temperature. The solution was reacted for about 2 hours at room temperature. Then, 20 mg of formic acid was added, and dry air was introduced. With vigorous foaming, the solution was reacted at 130° C. for 5 hours. The infrared absorption spectrum of a film prepared by casting from the reaction solution was found to correspond completely with that of the polymer obtained in Example 11. The polymer had an inherent viscosity of 0.83, and its solubility was quite the same as that of the polymer obtained in Example 11.

EXAMPLE 16

2.00 g of the polymer (b-1) was dissolved in 20 ml. of N-methyl pyrrolidone, and 1.95 g of α,α,α-trichlorotoluene was added at room temperature. The solution was stirred vigorously at room temperature for about 1 hour, and then heated at 140° C. for about 4 hours at 140° C. The infrared absoprtion spectrum of a film prepared by casting from the resulting reaction solution corresponded substantially with that of the polymer obtained in Example 11. The reaction solution was poured into a large amount of water. The recovered polymer had an inherent viscosity of 0.83 and the same solubility as that of the polymer obtained in Example 11.

EXAMPLE 17

2.00 g of the polymer (b-1) was dissolved in 20 ml. of N-methyl pyrrolidone, and then 1.48 g of ethyl orthoformate and 50 mg of p-toluenesulfonic acid were added. The mixture was heated at 140° C. for 5 hours with stirring.

The infrared absorption spectrum of a film prepared by casting from the resulting reaction solution showed a characteristic benzimidazole absorption at 1630 $cm^{-1}$, 1380 $cm^{-1}$, 990 $cm^{-1}$, and 760 $cm^{-1}$. The reaction solution was poured into a large amount of water to recover the polymer. The polymer had an inherent viscosity of 0.93. and was soluble in aprotic polar solvents such as dimethyl sulfoxide or dimethyl acetamide, formic acid, or trifluoroacetic acid.

EXAMPLE 18

2.00 g of the polymer (b-1) was dissolved in 20 ml. of N-methyl pyrrolidone, and 1.00 g of benzonitrile was added, followed by introduction of dry hydrogen chloride gas. The resulting reaction solution was heated at 130° C. for about 5 hours with stirring. The infrared absorption spectrum of a film prepared by casting from the resulting reaction solution corresponded substantially with that of the polymer obtained in Example 11.

The reaction solution was added to a large amount of water to recover the polymer. The polymer had an inherent viscosity of 0.94, and was soluble in the organic solvents exempflied in Example 11.

EXAMPLE 19

1.82 g of the polymer (b-3) was dissolved in 20 ml. of N-methyl yrrolidone, and 1.06 g of benzaldehyde was added at room temperature. The mixture was reacted at room temperature for about 2 hours, and 25 mg of formic acid was added. With vigorous bubbling of dry air, the mixture was reacted at 130° C. for 5 hours. The infrared absorption spectrum of a film prepared by casting from the reaction solution showed a benzimidazole characteristic absorption at 1620 $cm^{-1}$, 990 $cm^{-1}$ and 760 $cm^{-1}$. This polymer had an inherent viscosity of 0.41, and was soluble in aprotic polar solvents such as N-methyl pyrrolidone or dimethyl sulfoxide. Tough films could be prepaed by casting from a solution of the polymer in such an aprotic polar solvent.

EXAMPLE 20

A flask thoroughly dried and purged with nitrogen and equipped with a stirrer was charged with 10 ml. of N-methyl pyrrolidone and 1.77 g of oxalyl chloride, and with vigorous stirring, a solution of 3.27 g of the polymer (b-1) in 40 ml. of N-methyl pyrrolidone was added portionwise in a stream of nitrogen while cooling the mixture on an ice bath. After stirring the mixture for 2 hours over the ice bath, a small amount of the resulting insoluble portion was separated by filtration. The filtrate was added to a large amount of water containing sodium carbonate to recover the polymer.

The infrared absorption spectrum of the resulting polymer showed an absorption ascribable to the oxamide group in the vicinity of 1750 $cm^{-1}$ and 1660 $cm^{-1}$. The resulting polymer had an inherent viscosity of 0.52, and was identified as a polymer containing a quinoxalinedione ring.

2.21 g of the polymer (b-1) was dissolved in 20 ml. of N-methyl pyrrolidone, and 1.27 g of oxalyl chloride was added with ice cooling. Upon addition of the oxalyl chloride, the reaction mixture was gelled, and a soluble polymer was not obtained.

EXAMPLE 21

A three-necked flask equipped with a stirrer and a nitrogen introducing tube was charged with 20 ml. of N-methyl pyrrolidone and 2.29 g of thionyl chloride. With vigorous stirring under ice cooling, a solution of 4.40 g of the polymer (b-1) in 20 ml. of N-methyl pyrrolidone was added portionwise. The mixture was stirred for 2 hours over an ice bath. After the reaction, a small amount of the insoluble portion was separated by filtration, and added to a large amount of water to recover the polymer. The infrared absorption spectrum of the polymer showed an absorption ascribable to the sulfonamide group at 1130 $cm^{-1}$. The polymer had an inherent viscosity of 0.47.

EXAMPLE 22

1.20 g of phenylphosphonyl dichloride was dissolved in 30 ml. of N-methyl pyrrolidone. With cooling on an ice bath, a solution of 4.42 g of the polymer (b-1) in 100 ml. of N-methyl pyrrolidone was added to the solution portionwise over a period of 1 hour. After the addition, the solution was stirred for 2 hours over an ice bath. The reaction solution was added to a large amount of water to recover the polymer.

In the NMR spectrum of this polymer, the absorption ascribable to —NH— of the main chain of the polymer (b-1) (7.3 ppm, singlet) was weakened, and a phenyl absorption increased. From the integral ratio of these two, this polymer was considered to contain about 30% of a benzodiazophosphole ring. The polymer had an inherent viscosity of 0.63.

On the other hand, 2.1 g of the polymer (b-1) was dissolved in 20 ml. of N-methyl pyrrolidone, and with vigorous stirring under ice cooling, 1.95 g of phenylphosphonyl dichloride was added. The reaction mixture was gelled.

EXAMPLE 23

1.76 g of the polymer (b-1) was suspended in 35 ml. of hydrochloric acid, and with ice cooling, a solution of 1.69 g of sodium nitrite in 4 ml. of water was added to the suspension portionwise. The mixture was stirred at 0° C. for 30 minutes, and further at 50° C. for 1 hour. The reaction proceeded in the heterogeneous state. After the reaction, the polymer was washed with a large amount of water to afford a light brown powder. This polymer was no longer soluble in aprotic polar solvents such as N-methyl pyrrolidone. In the infrared absorption spectrum of this polymer measured by the KBr disc method, the absorption ascribable to —NH— in the vicinity of 3350 $cm^{-1}$, which was observed in the polymer (b-1) or the polymer (a-1), disappeared. From that fact, it was confirmed that the polymer was a polymer containing a triazole ring.

EXAMPLE 24

2.21 g of the polymer (b-1) was dissolved in 20 ml. of N-methyl pyrrolidone. The solution was added portionwise to a solution of 1.29 g of dimethyl silyl dichloride in 20 ml. of N-methyl pyrrolidone with ice cooling. The solution was stirred for 2 hours over an ice bath, and added to a large amount of dry methanol. It was then filtered in an atmosphere of nitrogen to recover the polymer. The polymer was not completely dissolved in an aprotic polar solvent such as N-methyl pyrrolidone, but partially gelled. The infrared absorption spectrum of this polymer by the KBr disc method showed an absorption ascribable to the methyl group. From this fact, it was confirmed that the polymer was a polymer containing a benzodiazosilole ring.

EXAMPLE 25

2.21 g of the polymer (b-1) was dissolved in 25 ml. of N-methyl pyrrolidone, and the solution was stirred over an ice bath. 2.70 g of sulfur chloride was added to this solution. Upon addition of sulfur chloride, the reaction mixture was gelled. The reaction mixture was stirred for 2 hours ofer an ice bath in the heterogeneous state, and the polymer was powdered in water. The infrared absorption spectrum (KBr disc method) of this polymer hardly showed an absorption ascribable to —NH—, and the polymer was identified as a cross-linked polymer containing a benzodithiadiazine.

EXAMPLE 26

2.21 g of the polymer (b-1) was dissolved in 20 ml. of N-methyl pyrrolidone. At room temperature, 2.90 g of triphenyl borate was added to the solution. The temperature was gradually elevated in an atmosphere of nitrogen, and over an oil bath at 220° C., the N-methyl pyrrolidone was evaporated off over the course of about 2 hours. 20 ml. of N-methyl pyrrolidone was further added, and an operation of evaporating it off over the course of about 2 hours was repeated. With the passage of time, the reaction mixture turned black purple. When the reaction mixture was further heated in an atmosphere of nitrogen, the evaporation of phenol was observed. The reaction mixture became solid. The reaction mixture was heated for 6 hours at 220° C., and after cooling methanol was added. The polymer was powdered by a blender and dried. The resulting polymer was soluble only partly in N-methyl pyrrolidone. The infrared absorption spectrum of this polymer determined by the KBr disc method showed a weakened amino absorption in the vicinity of $-3350$ $cm^{-1}$, unlike the infrared absorption spectrum of the polymer (b-1), and absorptions similar to those of a model reaction product of such a derivative (for example, J. Polym, Sci., 62, 59 (1962)). From this, it was confirmed that the polymer has a diazoborole ring.

EXAMPLE 27

1.10 g of the polymer (b-1) was dissolved in 15 ml. of N-methyl pyrrolidone, and 0.80 g of triphenyl phosphite was added to the solution at room temperature. The mixture was heated over an oil bath in an atmosphere of nitrogen. N-methyl pyrrolidone was evaporated off at 220° C. over the course of about 1 hour, and 10 ml. of N-methyl pyrrolidone was further added, and an operation of evaporating it off slowly was repeated. This operation was repeated twice to evaporate off 40 ml. in total of N-methyl pyrrolidone. The reaction mixture was further heated at 220° C. for 5 hours. With the progress of time, the evaporation of phenol was observed. After the reaction, a large amount of methanol was added, and the polymer was powdered to form a black purple powder. This powdery polymer was substantially insoluble in aprotic polar solvents such as N-methyl pyrrolidone. In the infrared absorption spectrum of this polymer by the KBr disc method, an absorption ascribable to amino as observed with the polymer (b-1) was scarcely found. It was confirmed from this that this polymer contained a diazophosphole ring.

EXAMPLE 28

2.21 g of the polymer (b-1was dissolved in 25 ml. of N-methyl pyrrolidone, and 1.51 g of phenyl isothiocyanate was added. The mixture was stirred at room temperature for 2 hours. In the infrared absorption spectrum of a film prepared by casting from the resulting reaction solution, an absorption characteristic of the polymer (b-10 at about 1580 $cm^{-1}$ to 1620 $cm^{31\ 1}$ almost disappeared, and a new absorption was recognized at about 1250 $cm^{-1}$. The reaction solution was heated to 160° C., and stirred for 6 hours. After the reaction, the solution was added to a large amount of water to recover the polymer. The resulting polymer had an inherent viscosity of 0.39. The polymer showed a similar absorption to the infrared absorption spectrum (Sadtler Standard I. R. Chart No. 42787) of a low-molecular-weight model compound (for example, 5-methyl-2-benzimidazolinethione.)

EXAMPLE 29

2.21 g of the polymer (b-1) was dissolved in 40 ml. of N-methyl pyrrolidone, and 0.54 g of ethyl chlorocarbonate and 0.55 g of sodium carbonate was added to the solution. The mixture was stirred at room temperature for 1 hour. A part of this solution was taken out, and added to water to recover a small amount of the polymer. In the NMR spectrum of this polymer, —NHCOO— proton, $—CH_2—$ and $—CH_3$ proton was observed. The $—CH_3$ proton/total phenyl proton ratio corresponded substantially with the calculated value obtained on the assumption that the polymer contained 50% of an ethyl group. The reaction solution was heated to 160° C., and stirred at this temperature for 3 hours. A part of the solution was taken out, and treated in the same way as above. In the NMR spectrum of the polymer, no ethyl absorption was observed. The infrared absorption spectrum of this polymer showed an absorption inherent to an imidazolone group at about 1730 $cm^{-1}$. Accordingly, it was confirmed that this polymer was a polymer containing 50% of benzimidazolone and an amino group as a pendant group. To the reaction solution were added 2.92 g of triphenyl trimesate and 50 mg of tetrabutoxy titanate. The solution was cast on a glass plate, and heated at 130° C. for 15 minutes and at 200° C. for 1 hour to obtain a tough light grayish film. The infrared absorption spectrum of this film showed an amide absorption at 1650 $cm^{-1}$. The polymer was insoluble in amide solvents and sulfuric acid, and was found to be cross-linked.

EXAMPLE 30

4.24 g of the polymer (b-6) was dissolved in 40 ml. of N-methyl pyrrolidone, and with stirring in an atmosphere of nitrogen, 1.06 g of anhydrous sodium carbonate and 1.09 g of ethyl chlorocarbonate were added to the solution. The mixture was stirred at room temperature for 1 hour, and a part of the solution was added to a large excess of water. The mixture was then filtered, and dried. In the NMR spectrum of the polymer in dimethyl sulfoxide-$d_6$, an absorption of methyl (singlet) ascribable to the bisphenol A skeleton and $—CH_2$ (quartet) and $—CH_3$ (triplet) were observed on the higher magnetic field side than the phenyl group.

The reaction solution was heated, and stirred at 160° C. for 4 hours, It was then added to a large amount of water, filtered, and dried to afford a yellow polymer. In the infrared absorption spectrum of this polymer, an absorption ascribable to the ester at 1750 $cm^{-1}$ and an absorption ascribable to imidazolone at about 1720 $cm^{-1}$ were observed. In the NMR spectrum of the polymer in dimethyl sulfoxide-$d_6$, the absorption ascribable to the ethyl group as observed in the above intermediate was no longer detected, nor was there a broad absorption ascribable to $—NH_2$. From these facts, the polymer was identified as one containing a benzimidazolone ring. The polymer had an inherent viscosity of 0.58, and was soluble in the various solvents exemplified in Example 1. Tough films could be prepared by casting from a solution of the polymer in such a solvent.

EXAMPLE 31

2.60 g of the polymer (b-8) was dissolved in 30 ml. of N-methyl pyrrolidone, and over an ice bath, 0.96 g of sodium carbonate and 1.42 g of benzoyl chloride were added to the solution. The solution was stirred for 1 hour over an ice bath, and then at room temperature for 1 hour. The solution was further stirred over an oil bath at 140° C. for 5 hours.

The infrared absorption spectra of films obtained from the solution resulting after reacting for 1 hour at room temperature, and of the reaction solution after heat-treatment were compared. It was found that as a result of the heat-treatment, the amide I absorption band of the amide group at about 1670 $cm^{-1}$ was weakened, and the amide II absorption band at 1530 $cm^{-1}$ disappeared completely. Further, a characteristic absorption band of benzimidazole appeared newly at 1380 $cm^{-1}$ and 990 $cm^{-1}$. The polymer had an inherent viscosity of 0.45.

EXAMPLE 32

1.77 g of the polymer (b-9) was dissolved in 20 ml. of N-methyl pyrrolidone, 0.71 g of benzoyl chloride was added to the solution, and 1.42 g of benzoyl chloride was added with stirring over an ice bath. The mixture was reacted for 1 hour over an ice bath, and stirred over an oil bath at 160° C. for 6 hours. After the reaction, 80 mg of lithium carbonate was added, and the mixture was stirred for about 30 minutes. Then, the mixture was added to a large amount of water to form a polymer.

The ratio of —CONH— proton to the total phenyl proton in the NMR spectrum of the resulting polymer in dimethyl sulfoxide-$d_6$ was about 1/19.8, which corresponded completely with the calculated value of 1/20 obtained when it was assumed that the formation of benzimidazole ring proceeded completely. Accordingly, it was confirmed that this polymer is one containing a benzimidazole ring in the main chain and a benzamide group in the side chain. This polymer had an inherent viscosity of 0.48.

A homogeneous membrane having a thickness of 5.5 microns was prepared by the method shown in Example 1, and subjected to the same reverse osmosis test. The membrane showed a water flux of 23.2 $l/m^2$/day and a salt rejection of 99.2%.

EXAMPLe 33

3.17 g of the polymer (b-11) was dissolved in 20 ml. of N-methyl pyrrolidone, and 1.00 g of sodium carbonate was added to this solution with stirring under ice cooling. Then, 0.80 g of acetyl chloride was added, and the mixture was stirred for 1 hour over an ice bath and further at 180° C. for 6 hours. After the reaction, the reaction mixture was added to a large amount of water to recover the polymer.

In the NMR spectrum of this polymer in dimethyl sulfoxide-$d_6$, an absorption ascribable to an acetamide group was also observed in addition to an absorption ascribable to —COHN— of the benzamide group in the main chain. From the absorption intensity ratio between the -NH proton of the benzamide group and the NH proton of the acetamide group, the polymer was identified as one containing about 50% of methyl benzimidazole. The polymer had an inherent viscosity of 0.46, and tough film could be prepared from its N-methyl pyrrolidone solution.

EXAMPLE 34

3.79 g of the polymer (b-13) as dissolved in 40 ml. of N-methyl pyrrolidone. With stirring over an ice bath, 4.70 g of lithium carbonate and 3.60 g of ethyl chlorocarbonate were added to this solution. The mixture was stirred on an ice bath for about 1 hour, and for 4 hours at 160° C. The reaction mixture was added to a large amount of water after the reaction to precipitate and recover the polymer. The polymer had an inherent viscosity of 0.49.

In the NMR spectrum of the polymer in dimethyl sulfoxide-$d_6$, an absorption of ethyl was observed, and the absorption intensity ratio between —CONH— of the main chain and the methylene proton of ethyl was about 1:2. A characteristic absorption of imidazolone in the infrared absorption spectrum of this polymer was observed at about 1720 $cm^{-1}$. From these facts, it was confirmed that this polymer is a benzimidazolone polymer containing an ethylurethane group in the side chain.

A homogeneous membrane having a thickness of 5.9 microns was prepared in the same way as in Example 1, and subjected to the same reverse osmosis test. The membrane showed a water flux of 46.7 $l/m^2$/day and a salt rejection of 99.2%.

EXAMPLE 35

3.85 g of the polymer (b-14) was dissolved in 50 ml. of N-methyl pyrrolidone. 1.70 g of benzaldehyde was added to the solution, and the mixture was stirred at room temperature for 1 hour. In the infrared absorption spectrum of a film obtained from the resulting solution, absorptions ascribable to phenyl and a Schiff base were observed in the vicinity of 1610 $cm^{-1}$, and the absorption ascribable to —$NH_2$ in the vicinity of 3350 $cm^{-1}$ and 1580 $cm^{-1}$ to 1630 $cm^{-1}$, present characteristically in the polymer (b-14), almost disappeared.

20 mg of p-toluenesulfonic acid was added to the reaction solution, and while passing dry air vigorously, the mixture was heated at 150° C. for 5 hours. The infrared absorption spectrum of a film prepared by casting from the resulting reaction solution was very similar to the infrared absorption spectrum of the polymer in Example 15 with the exception of an absorption ascribable to the amide group of the main chain. Accordingly, it was presumed that this polymer was a copolymer in which the pendant amino group was completely changed to phenylbenzimidazole.

The polymer was thermogravimetrically analyzed in air while raising the temperature at a rate of 5° C./min. It was found that the polymer scarcely showed any weight decrease up to a temperature of 430° C., and the polymer had good thermal stability.

EXAMPLE 36

2.78 g of the polymer (b-17) was dissolved in 40 ml. of N-methyl pyrrolidone. With stirring over an ice bath, 0.28 g of lithium carbonate and 0.56 g of benzoyl chloride. Over an ice bath, the solution was stirred for 1 hour, and then at 160° C. for 6 hours. After the reaction, the reaction solution was added to a large amount of water to recover the polymer. The polymer had an inherent viscosity of 0.48, and in the NMR spectrum of this polymer in dimethyl sulfoxide-$d_6$, an absorption ascribable to —CONH— amide group was not observed. On the other hand, in its infrared absorption spectrum, a characteristic absorption of the benzimidazole group appeared at 990 $cm^{-1}$ in addition to the characteristic imide absorption band. It was confirmed that the absorption ascribable to —NH— or —$NH_2$ in the vicinity of 3350 $cm^{-1}$ completely disappeared.

A thermogravimetric analysis of this polymer in air at a temperature elevating rate of 5° C./min. showed that there was hardly any decrease in weight up to a temperature of 460° C., and the polymer showed good thermal stability.

EXAMPLE 37

3.78 g of the polymer (b-15) was dissolved in 50 ml. of N-methyl pyrrolidone. 1.06 g of sodium carbonate was added to the solution, and with stirring at room temperature, 1.08 g of ethyl chlorocarbonate was added. The mixture was stirred at room temperature for about 1 hour, and over an oil bath at 160° C. for 3 hours. After the reaction, the reaction solution was added to a large amount of water to recover the polymer. The polymer obtained had an inherent viscosity of 0.81.

In the infrared absorption spectrum of this polymer, a characteristic absorption of —$NH_2$ was not observed. In its NMR spectrum in dimethyl sulfoxide-$d_6$, absorption of methyl and methylene in the ethylurethane group were not observed, nor was there an absorption ascribable to —$NH_2$. From these facts, it was confirmed that this polymer was polyurea containing 50% of a polybenzimidazolone ring.

What we claim is:

1. A nitrogen-containing aromatic polymer comprising at least 30 mol%, based on the entire recurring units, of at least one recurring unit of the following formula

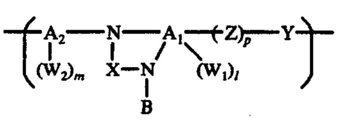
(I)

wherein $A_1$ is an aromatic group having a valence of (3 + 1), and the two nitrogen atoms, Z and $W_1$ are all bonded to the nuclear carbon atoms of the aromatic group $A_1$; $A_2$ is an organic group having a valence of (2 + *m*); Z is $-SO_2-$ or —CO—; *p* is O or 1, and when *p* is O, $-A_1-$ is directly bonded to Y; Y is —O— or

in which $R_1$ is a hydrogen atom or a monovalent hydrocarbon residue, and the two nitrogen atoms bonded to $A_1$ are bonded to the nuclear carbon atoms at the ortho-position of the aromatic group $A_1$; B is a hydrogen atom or a bond with X in which case N-X forms a double bond; said atomic grouping (a)

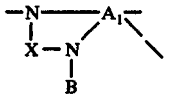
(a)

wherein the dotted line represents the presence or absence of a bond forms a 5- or 5-membered ring through one or two carbon atoms selected from the group consisting of:

| | | |
|---|---|---|
| (a-1) | 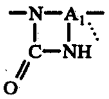 | (benzimidazolone ring) |
| (a-2) | 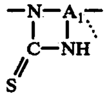 | (benzimidazolthione ring) |
| (a-3) | 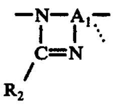 | (benzimidazole ring) |
| ($R_2$ is a hydrogen atom or an organic group having a valence of 1 to 4) | | |
| (a-4) | 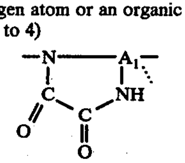 | (quinoxalidinedione ring); |

*l* and *m* are identical of different and each represent an integer of 0 to 3; when *p* is O, Y is

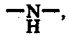

and one of $W_1$ groups is bonded to the nuclear carbon atom at the ortho-position of the aromatic group $A_1$ together with Y, the $W_1$, Y and $A_1$ can form a 5-membered or 6-membered ring same as

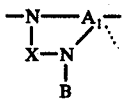

in which all symbols are the same as defined above and the dotted line represents the presence or absence of a bond; and when $W_1$ does not form the 5- or 6-membered ring, $W_1$ and $W_2$ are identical or different and represent at least one group selected from a primary amino group and mono- or di-substituted nitrogen-containing group derived from the primary amino group.

2. The nitrogen-containing aromatic polymer of claim 1 which comprises at least 80 mol%, based on the entire recurring units, of the recurring unit of formula (I).

3. The nitrogen-containing aromatic polymer of claim 1 which is a copolymer which comprises:

1. at least 30 mol%, based on the entire recurring units, of the recurring unit of formula (I), and
2. up to 70 mol%, based on the entire recurring units, of at least one recurring unit selected from the group consisting of 2-A. an unsubstituted or substituted amino-containing recurring unit of formula (II)

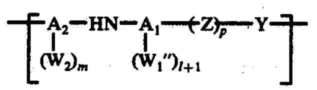
(II)

wherein $A_1$, $A_2$, A, Y, p, *l* and *m* are the same as defined in formula (I); $W''_1$ and $W_2$ are identical or different and each represent at least one group selected from the group consisting of a primary amino group and mono- or di-substituted nitrogen containing groups derived from the primary amino group, and 2-B. a third recurring unit of the formula $$-[A_3-Q_1-A_4-Q_2]- \quad (III)$$

wherein $A_3$ and $A_4$ are identical or different, and each represent an organic group having a valence of 2 to 4; and $Q_1$ and $Q_2$ are identical or different and represent a group selected from the class consisting of (c-1) 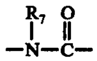

(c-2) 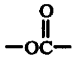

(c-3) 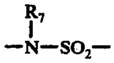

(c-4) $-OSO_2-$ (c-5) 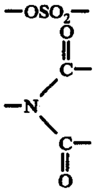

(c-6) 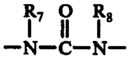

-continued (c-7)

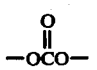

and (c-8)

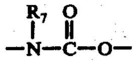

in which $R_7$ and $R_8$ are identical or different and each represent a hydrogen atom, a monovalent or divalent hydrocarbon residue or a mere bond, with the proviso that when these groups represent a divalent hydrocarbon residue or a bond, they can be bonded to $A_3$ or $A_4$, or $R_7$ and $R_8$ may be bonded to each other.

4. The nitrogen-containing aromatic polymer of claim 1 which comprises (1) 30 to 100 mol%, based on the entire recurring units, of at least one recurring unit selected from the group consisting of a recurring unit containing a nitrogen-containing ring group expressed by the following formula

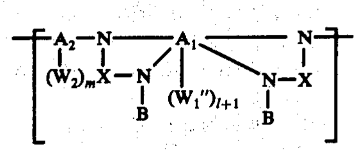

(I-A)

wherein $A_1$, $A_2$, $W_1$, *m*, $W_2$, *l*, X and B are the same as defined in formula (I), with the proviso that $-1 \geqq O$, and (I-B) a recurring unit containing a nitrogen-containing ring group expressed by the following formula

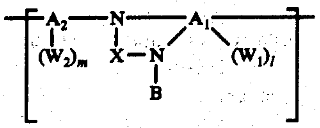

(I-B)

wherein $A_1$, $A_2$, $W_1$, $W_2$, *m*, *l*, Y, X and B are the same as defined in formula (I) and (I-A) above, and (2) 0 to 70 mol%, based on the entire recurring units, of at least one recurring unit selected from the group consisting of an unsubstituted or substituted amino-containing recurring unit of the following formula

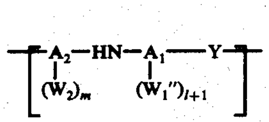

(II-A)

wherein $A_1$, $A_2$, Y, $W''_1$, 1, $W_2$ and *m* are the same as defined in formula (II) above, and a third recurring unit of the following formula

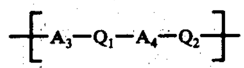

(III)

wherein $A_3$, $A_4$, $Q_1$ and $Q_2$ are the same as defined hereinabove.

5. The nitrogen-containing aromatic polymer of claim 4 wherein

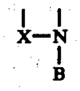

in formula (I) or (I-A) is at least one member selected from the group consisting of (a-1)

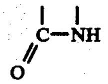

(a-2)

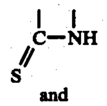

and (a-3)

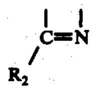

wherein these formulae may be reversed transversely, and $R_2$ is a hydrogen atom or an organic group having a valence of 1 to 4.

6. The nitrogen-containing aromatic polymer of claim 4 wherein $W_1$ and $W_2$ in the formulae (I) and (I-A) are each at least one member selected from the group consisting of (1) a primary amino group, (2) a carbonamide group, (3) a sulfonamide group, (4) a urea group, (5) a urethane group, and (6) an imide group.

7. The nitrogen-containing aromatic polymer of claim 4 wherein said formula (I) or formula (I-A) is expressed by the following formula (I-c)

(I-c)

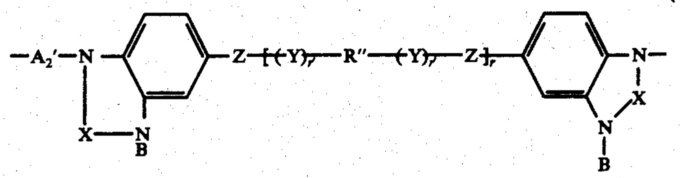

wherein X, B, Z and Y are the same as defined hereinabove, $A'_2$ is an organic group containing 2 to 30 carbon atoms, and R'' represents an organic group containing 2 to 30 carbon atoms or two divalent alkylene groups, with the proviso that when R'' represents two divalent alkylene groups, *r* and *r'* are 1 or 0 and Y is —N.

8. The nitrogen-containing aromatic polymer of claim 3 wherein in the formula (III), $A_3$ and $A_4$ are an organic group containing 2 to 30 carbon atoms, and $Q_1$ and $Q_2$ repesent either one of (c-1) to (c-5).

9. A permselective membrane essentially of the nitrogen-containing polymer of claim 1.

10. The nitrogen-containing aromatic polymer of claim 1 comprising at least 30 mol%, based on the entire recurring units, of at least one recurring unit of the formula (I) in which the formula

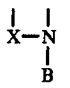

in the recurring unit of formula (I) is

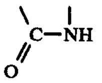

$A_1$ is an aromtic group of valence (3 + 1) having 6 to 50 carbon atoms and optionally including an inert substituent selected from the group consisting of nitro, alkoxy and halogen in addition to the group or groups $W_1$;

$A_2$ is an aromatic, aliphatic or alicyclic organic group, or mixture thereof containing 2 to 50 carbon atoms and optionally including an inert substituent selected from the group consisting of nitro, alkoxy and halogen in addition to the group or groups $W_2$;

$W_1$ and $W_2$ are the same or different and are each selected from the group consisting of:

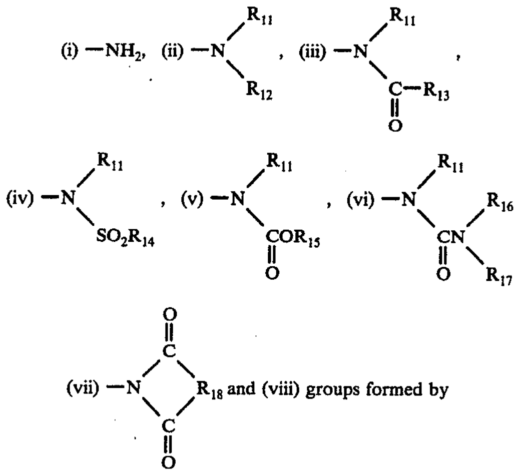

and (viii) groups formed by the reaction between the primary amino group and a benzimidazolone-forming agent wherein $R_{11}$, $R_{13}$, $R_{16}$ and $R_{17}$ are the same or different and each represent a hydrogen atom or an organic group containing 1 to 20 carbon atoms; $R_{12}$ and $R_{15}$ are organic groups containing 1 to 20 carbon atoms; $R_{14}$ is an organic group containing 1 to 20 carbon atoms or an hydroxyl group; $R_{18}$ is a divalent organic group containing 1 to 20 carbon atoms; and $R_{11}$ can be bonded directly or through a hetero atom to each of $R_{12}$, $R_{13}$, $R_{14}$, $R_{15}$, and $R_{16}$, and $R_{16}$ can be bonded directly or through a hetero atom to $R_{17}$; and $R_1$ is hydrogen or an alkyl group containing 1 to 3 carbon atoms.

11. The nitrogen-containing aromatic polymer of claim 10 wherein the aromatic group $A_1$ has 6 to 45 carbon atoms; the group $A_2$ has 2 to 30 carbon atoms; $W_1$ and $W_2$ are selected from the groups (i), (iii), (iv), (v), (vi) and (vii) wherein $R_{11}$ and $R_{16}$ are each a hydrogen atom; $R_{13}$, $R_{14}$, $R_{15}$ and $R_{17}$ are the same or different and each represents an alkyl or alkylene group containing 1 to 8 carbon atoms or a monovalent aromatic group composed mainly of benzene and containing 6 to 15 carbon atoms; and $R_{18}$ is an alkylene or alkenylene group containing 2 to 6 carbon atoms or an aromatic group composed mainly of benzene with 6 to 15 carbon atoms.

12. The nitrogen-containing aromatic polymer of claim 11 wherein the aromatic group $A_1$ is at least one tetravalent aromatic group of the following formula;

(A1-1)

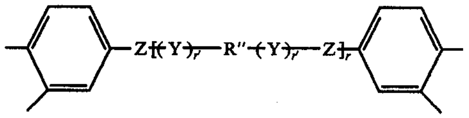

wherein R" is an aromatic group containing 6 to 15 carbon atoms or a piperazine residue; Z is —CO— or —$SO_2$—, Y is —O— or —NH—; *r* and $r_1$ are 1 or 0; $A_2$ is an organic group of 6 to 16 carbon atoms and *m* is 0.

13. The nitrogen-containing aromtic polymer of claim 11 wherein the aromtic group $A_1$ is a member selected from the group consisting of benzene, naphthalene, anthracene, biphenyl, terphenyl and polynuclear aromatic ring groups resulting from the bonding of at least two wholly aromatic ring groups, which may be the same or different, to each other through at least one bridging group, said bridging group being a member selected from the group consisting of

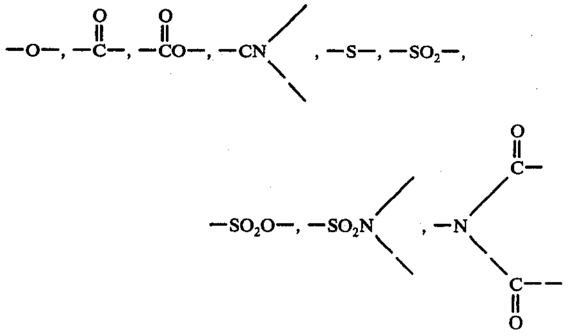

and alkylene containing 1 to 6 carbon atoms, wherein the dotted line in the above formula represents the presence of a bond or a hydrogen atom; and $A_2$ is at least one member selected from the group consisting of

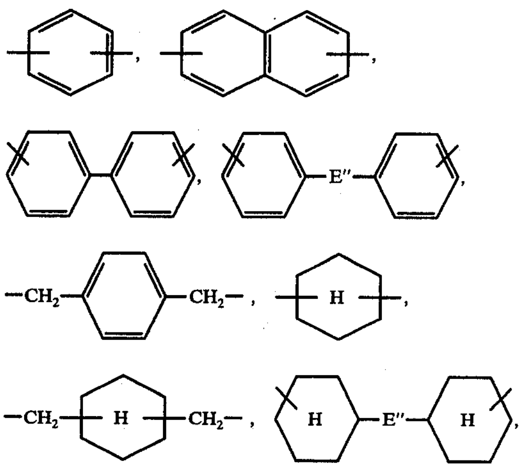

-continued and alkylene groups and alkylene groups containing 2 to 15 carbon atoms, and E'' is at least one bridging group selected from the group consisting of

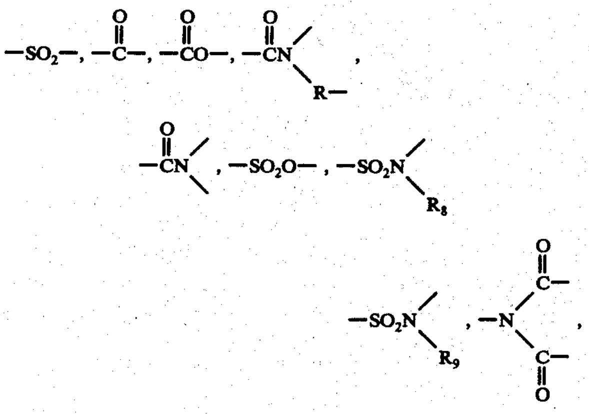

—O—, —S— and alkylene groups containing 1 to 10 carbon atoms, wherein $R_{10}$ is H or alkyl containing 1 to 6 carbon atoms.

14. A nitrogen-containing aromatic polymer which comprises 30 to 100 mol%, based on the entire recurring units, of the recurring unit of the following formula (C-1)

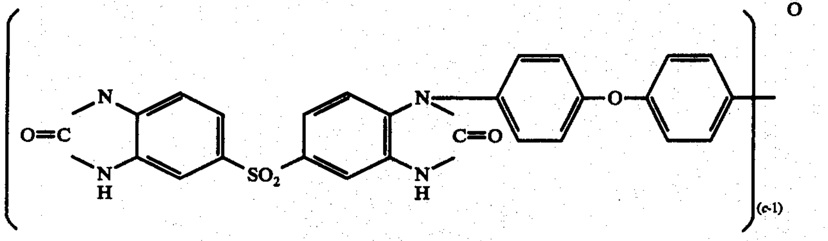

15. The nitrogen-containing aromatic polymer of claim 14 which comprises a copolymer of 1. at least 30 mol%, based on the entire recurring units of the recurring unit of the formula (C-1)

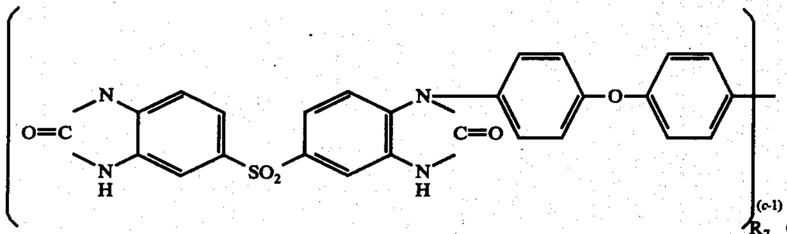

2. up to 70 mol%, based on the entire recurring units, of at least one recurring unit selected from the group consisting of 2-A. a recurring unit of the following formula (B-1) wherein *s* and *t* are same or different, each one of them repersents 0 or 1, and when *s* and/or *t* are 0,

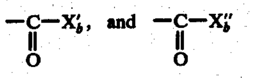

represent hydrogen atom; and $X_b'$ and $X_b''$ are same or different, and each of them represents a reactive group capable of reacting with the secondary amino group (—NH—) bonded to the benzene ring to split of $HX_b$ and/or $HX_b''$, a third recurring unit of the formula $$\left[ A_3-Q_1-A_4-Q_2 \right] \quad \text{(III)}$$

wherein $A_3$ and $A_4$ are identical or different, and each represent an organic group having a valence of 2 to 4; and $Q_1$ and $Q_2$ are identical or different and represent a group selected from the class consisting of (c-1) 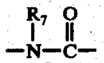

(c-2) 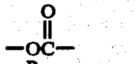

(c-3) 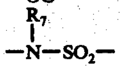

(c-4) $-OSO_2-$ (c-5) 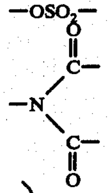

(c-6) 

(c-7) 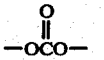

and (c-8) 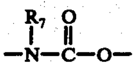

in which $R_7$ $R_8$ are identical or different and each represent a hydrogen atom, a monovalent hydrocarbon residue or a mere bond, with the proviso that when these groups represent a divalent hydrocarbon residue or a bond, they can be bonded to $A_3$ or $A_4$, or $R_7$ and $R_8$ may be bonded to each other.

16. A process for preparing a nitrogen-containing aromtic polymer in which 30 to 100 mol% of the recurring units, based on the entire recurring units have the following formula (C-1)

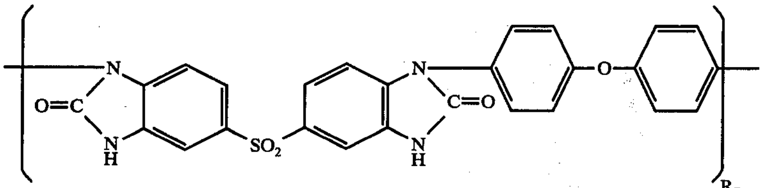

which comprises reacting a substantially linear aromatic polymer comprising 30 to 100 mol%, based on the entire recurring units, of the recurring unit of the following formula (B-1)

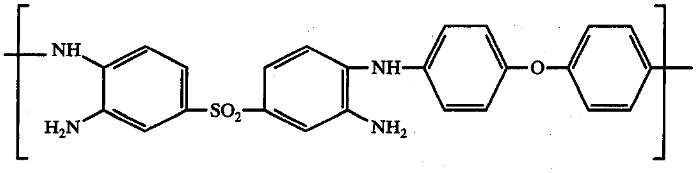

with a benzimidazolone-forming agent capable of introducing

group between the secondary amino group and the primary amino group which are attached to the ortho-position of the benzene ring of the above repeating unit of formula (B-1).

17. The process for preparing a nitrogen-containing copolymer according to claim 16 wherein a substantially linear aromatic polymer comprising 1. at least 30 mol%, based on the entire recurring units, of the recurring unit of the following formula (B-1)

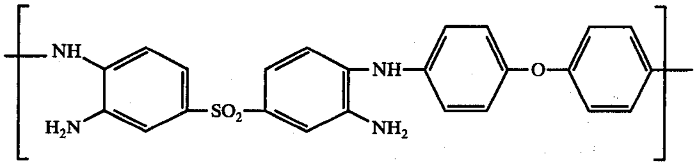

and, 2. up to 70 mol%, based on the entire recurring units, of the recurring unit of the following formula (III)

$$-[A_3-Q_1-A_4-Q_2]- \quad \text{(III)}$$

wherein $A_3$ and $A_4$ are identical or different, and each represent an organic group having a valence of 2 to 4; and $Q_1$ and $Q_2$ are identical or different and represent a group selected from the class consisting of (c-1)

(c-2)

(c-3)

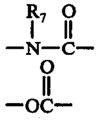

(c-4)

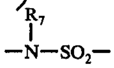

(c-5) $-OSO_2-$

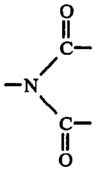

(c-6)

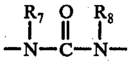

(c-7)

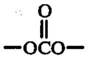

and (c-8)

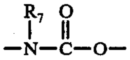

in which $R_7$ and $R_8$ are identical or different and each represent a hydrogen atom, a monovalent or divalent hydrocarbon residue or a mere bond, with the proviso that when these groups represent a divalent hydrocarbon residue or a bond, they can be bonded to $A_3$ or $A_4$, or $R_7$ and $R_8$ may be bonded to each other, are reacted with a benzimidazolone-forming agent capable of introducing

group between the secondary amino group and the primary amino group which are attached to the benzene ring of the repeating unit of formula (B-1).

18. A process for preparing a nitrogen-containing aromatic polymer comprising at least 30 mol%, based on the entire recurring units, of at least one recurring unit of the following formula

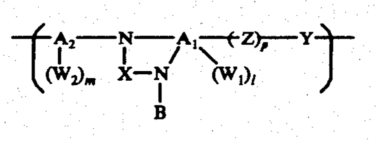
(I)

wherein $A_1$ is an aromatic group having a valence of (3+1), and the two nitrogen atoms, Z and $W_1$ are all bonded to the nuclear carbon atoms of the aromatic group $A_1$; $A_2$ is an organic group having a valence of (2+*m*); Z is $-SO_2-$ or —CO—; *p* is 0 or 1, and when *p* is 0, $-A_1-$ is directly bonded to Y; Y is -0- or

in which $R_1$ is a hydrogen atom or a monovalent hydrocarbon residue, and the two nitrogen atoms bonded to $A_1$ are bonded to the nuclear carbon atoms at the ortho-position of the aromatic group $A_1$; B is a hydrogen atom or a bond with X in which case N-X forms a double bond; said atomic grouping (a)

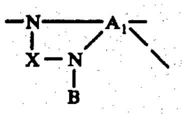
(a)

wherein the dotted line represents the presence of absence of a bond forms a 5- or 6-membered ring through one or two carbon atoms selected from the group consisting of:

| | | |
|---|---|---|
| (a-1) | 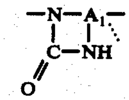 | (benzimidazolone ring) |
| (a-2) | 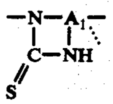 | (benzimidazolthione ring) |
| (a-3) | 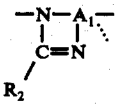 | (benzimidazole ring) |
| ($R_2$ is a hydrogen atom or an organic group having a valence of 1 to 4) | | |
| (a-4) | 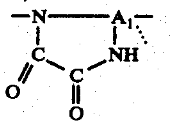 | (quinoxalidinedione ring); |

l and *m* are identical or different and each represent an integer of 0 to 3; when *p* is 0, Y is

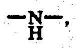

and one of $W_1$ groups is bonded to the nuclear carbon atom at the orthoposition of the aromatic group $A_1$ together with Y, the $W_1$, Y and $A_1$ can form a 5-membered or 6-membered ring same as

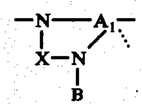

in which all symbols are the same as defined above and the dotted line represents the presence or absence of a bond; and when $W_1$ does not form the 5- or 6-membered ring, $W_1$ and $W_2$ are identical or different and represent at least one group selected from a primary amino group and mono- or di-substituted nitrogen-containing group derived from from the primary amino group, which comprises reacting a substantially linear aromatic polymer containing a primary amino group comprising at least 30 mol%, based on the entire recurring units, of at least one recurring unit of the following formula

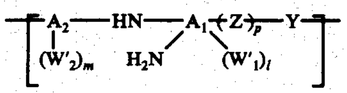
(IV)

wherein $A_1$ is an aromatic group having a valence of (3 + 1), and the two nitrogen atoms, A and $W'_1$ in the above formula are all bonded to the nuclear carbon atoms of the aromatic group $A_1$; $A_2$ is an organic group having a valence of (2 + *m*); Z is $-SO_2-$ or —CO—; *p* is 0 or 1, and when *p* is 0, $-A_1-$ is directly bonded to Y; Y is —0— or

in which $R_1$ is a hydrogen atom or a monovalent hydrocarbon residue; the $-NH_2$ group bonded to $A_1$ is bonded together with the —NH— group to the nuclear carbon atom at the ortho-position of the aromatic group $A_1$; $W'_1$ and $W'_2$ are identical or different and each represent at least one group selected from the group consisting of a primary amino group and mono- or di-substituted nitrogen-containing group derived from the primary amino group; and l and *m* are identical or different and each represent an integer of 0 to 3, with a reagent capable of reacting with the secondary and primary amino groups bonded to the aromatic group $A_1$ in the formula (IV) above to form said 5- or 6-membered ring.

19. The process of claim 18 wherein said reagent capable of reacting with the secondary and primary amino groups bonded to the two nitrogen atoms of the aromatic group $A_1$ in formula (IV) to form a 5- or 6-membered ring is an acid or a functional derivative thereof containing one or two carbon atoms as a central element of the ring-forming atoms and also containing a group capable of being split off together with the hydrogen atoms of the primary and secondary amino groups.

20. The process of claim 19 wherein said reagent capable of forming a 5- or 6-membered ring is capable of introducing at least one of the following atomic groupings between the two nitrogen atoms by reaction with the primary amino group and the secondary amino group bonded to the two nuclear carbon atoms at the ortho-position of the aromatic group $A_1$ in the formula (IV), and is selected from the group consisting of:

1. a benzimidazolone-forming agent capable of introducing

2. a benzimidazolethione-forming agent capable of introducing

3. a benzimidazole-forming agent capable of introducing

in which $R_2$ is a monovalent organic group, and 4. a quinoxalinedione-forming agent capable of introducing

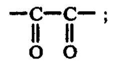

whereby corresponding respectively to the above agents (b-1) to (b-4) there is formed the atomic grouping (a)

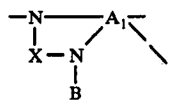

(a)

in the formula (I) selected from the group consisting of:

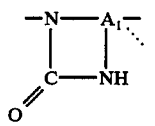

(benzimidazolone ring) (a-1)

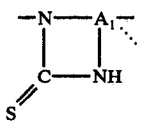

(benzimidazolthione ring) (a-2)

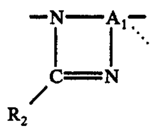

(benzimidazole ring) (a-3)

($R_2$ is a monovalent organic group) and

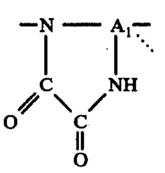

(quinoxalinedione ring). (a-4)

21. A process for preparing a polymer containing an aromatic imidazolone ring which includes at least 30 mol%, based on the entire recurring units of at least one recurring unit of formula (I) or of formula (I-A):

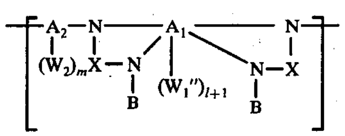

(I-A)

wherein $A_1$, $A_2$, $W_1$, m, $W_2$, l, X and B are the same as defined above with the proviso that $l-1 \geq 0$ according to claim 19 in which the formula

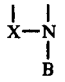

in formula (I) or (I-A) is

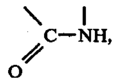

which comprises reacting a primary amino-containing aromatic polymer comprising (1) 30 to 100 mol%, based on the entire recurring units, of the recurring unit of the following formula (IV);

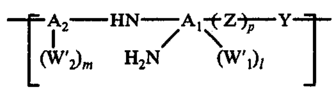

(IV)

wherein $A_1$ is an aromatic group having a valence of $(3+l)$, and the two nitrogen atoms, Z and $W'_1$ in the above formula are all bonded to the nuclear carbon atoms of the aromatic group $A_1$; $A_2$ is an organic group having a valence of $(2+m)$; Z is $—SO_2—$ or —CO—; *p* is 0 or 1, and when *p* is 0, $—A_1—$ is directly bonded to Y; Y is —O— or

in which $R_1$ is a hydrogen atom or a monovalent hydrocarbon residue; the $—NH_2$ group bonded to $A_1$ is bonded together with the —NH— group to the nuclear carbon atom at the ortho-position of the aromatic group $A_1$; $W'_1$ and $W'_2$ are identical or different and each represent at least one group selected from the group consisting of a primary amino group and mono- or disubstituted nitrogen-containing groups derived from the primary amino group; and l and *m* are identical or different and each represent an integer of 0 to 3, and (2) 0 to 70 mol%, based on the entire recurring units, of at least one recurring unit selected from the group consisting of;

2-A. an unsubstituted or substituted amino-containing recurring unit of formula (II)

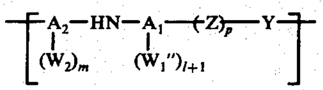

(II)

wherein $A_1$, $A_2$, Z, Y, *p*, 1 and *m* are the same as defined in formula (I); $W''_1$ and $W_2$ are identical or different and each represent at least one group selected from the group consisting of a primary amino group and mono- or di-substituted nitrogen-containing groups derived from the primary amino group, and 2-B. a third recurring unit of the formula

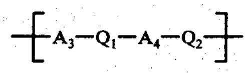

(III)

wherein $A_3$ and $A_4$ are identical or different, and each represent an organic group having a valence of 2 to 4; and $Q_1$ and $Q_2$ are identical or different and represent a group selected from the class consisting of (c-1) 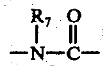

(c-2) 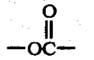

(c-3) 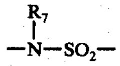

(c-4) $-OSO_2-$ (c-5) 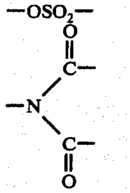

(c-6) 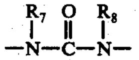

(c-7) 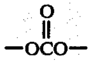

and (c-8) 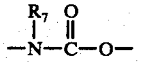

in which $R_7$ and $R_8$ are identical or different and each represent a hydrogen atom, a monovalent or divalent hydrocarbon residue or a mere bond, with the proviso that when these groups represent a divalent hydrocarbon residue or a bond, they can be bonded to $A_3$ or $A_4$, or $R_7$ and $R_8$ may be bonded to each other with a functional derivative of carbonic acid or an isocyanate compound in the dissolved or swollen state.

22. The process of claim 18 wherein the reaction between the substantially linear aromatic polymer and the reagent capable of forming said 5- or 6-membered ring is performed in an inert solvent capable of swelling or dissolving said polymer, thereby converting at least a part of the recurring unit of formula (IV) to a recurring unit of formula (I).

23. The process of claim 18 wherein the reaction between the substantially linear aromatic polymer and the reagent capable of forming said 5- or 6-membered ring is performed in an inert solvent capable of swelling or dissolving said polymer, to thereby convert at least a part of the recurring unit of formula (IV) to a recurring unit of formula (IV-a)

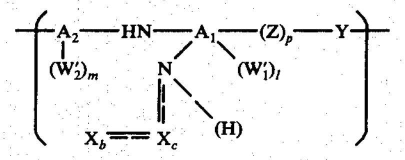

(IV-a)

wherein $A_1$, $A_2$, Z, Y, 1, *m*, *p*, $W'_1$ and $W'_2$ are the same as defined in formula (IV); the dotted line represents the presence or absence of a bond; one of the dotted lines between $X_c$ and N and between N and (H) represents a bond, and when the dotted line between $X_c$ and N represents a bond, the hydrogen atom bonded to N is split off; $X_b$ is a reactive group capable of reacting with the secondary amino group (—NH—) bonded to the aromatic group $A_1$ to split off $HX_b$ or $H_2X_b$; and $X_c$ represents a group selected from the group consisting of

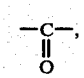 (b-1)

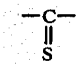 (b-2)

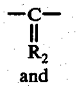 (b-3)

and

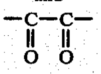 (b-4)

or an atomic group which forms a group selected from the above class upon splitting of $HX_b$ or $H_2X_b$, followed by heating, or adding an agent for promoting the splitting off of the above $HX_b$ or $H_2X_b$ to convert the recurring unit of formula (IV-a) to the recurring unit of formula (I).

24. The process for preparing the nitrogen-containing aromtic polymer of claim 18 which comprises reacting a primary amino-containing aromatic polymer comprising (1) 30 to 100 mol%, based on the entire recurring units, of the recurring unit of the following formula (IV);

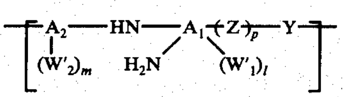

(IV)

wherein $A_1$ is an aromatic group having a valence of (3+1), and the two nitrogen atoms, Z and $W'_1$ in the above formula are all bonded to the nuclear carbon atoms of the aromatic group $A_1$; $A_2$ is an organic group having a valence of (2+*m*); Z is $-SO_2-$ or —CO—; *p* is 0 or 1, and when *p* is 0, $-A_1-$ is directly bonded to Y; Y is —0— or

in which $R_1$ is a hydrogen atom or a monovalent hydrocarbon residue; the $-NH_2-$ group bonded to $A_1$ is bonded together with the —NH— group to the nuclear carbon atom at the ortho-position of the aromatic group $A_1$; $W'_1$ and $W'_2$ are identical or different and each represent at least one group selected from the group consisting of a primary amino group and mono- or di-substituted nitrogen-containing group derived from the primary amino group; and l and *m* are identical or different and each represent an integer of 0 to 3, and (2) 0 to 70 mol%, based on the entire recurring units, of at least one recurring unit selected from the group consisting of:

an unsubstituted or substituted amino-containing recurring unit of formula (II)

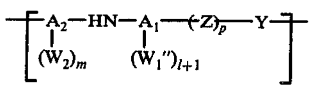

(II)

wherein $A_1$, $A_2$, Z, Y, , l and m are the same as defined in formula (I); $W''_1$ and $W_2$ are identical or different and each represent at least one group selected from the group consisting of a primary amino group and mono- or di-substituted nitrogen-containing group derived from the primary amino group, and a third recurring unit of the formula (III)

$$-[A_3 - Q_1 - A_4 - Q_2]- \quad \text{(III)}$$

wherein $A_3$ and $A_4$ are identical or different, and each represent an organic group having a valence of 2 to 4; and $Q_1$ and $Q_2$ are identical or different and represent a group selected from the class consisting of (c-1) 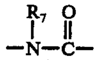

(c-2) 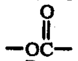

(c-3) 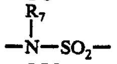

(c-4) $-OSO_2-$ (c-5) 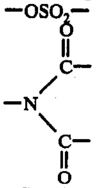

(c-6) 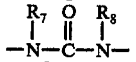

(c-7) 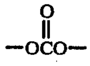

and (c-8) 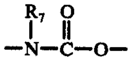

in which $R_7$ and $R_8$ are identical or different and each represent a hydrogen atom, a mono-valent or divalent hydrocarbon residue or a mere bond, with the proviso that when these groups represent a divalent hydrocarbon residue or a bond, they can be bonded to $A_3$ or $A_4$, or $R_7$ and $R_8$ may be bonded to each other, with a reagent capable of reacting with the secondary and primary amino groups bonded to the aromatic group $A_1$ in the formula (IV) to form a 5- or 6-membered ring, wherein said reagent is an acid or a functional derivative thereof containing one or two carbon atoms as a central element of the ring-forming atoms and also containing a group capable of being split off together with the hydrogen atoms of the primary and secondary amino groups, said agent being selected from the group consisting of:

1. a benzimidazolone-forming agent capable of introducing

2. a benzimidazolethione-forming agent capable of introducing

3. a benzimidazole-forming agent capable of introducing

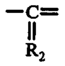

in which $R_2$ is a monovalent organic group containing 1 to 20 carbon atoms, and 4. a quinozalinedione-forming agent capable of introducing

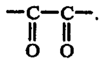

25. The process according to claim 18 for preparing an aromatic polymer containing a benzimidazole ring which includes at least 30 mol%, based on the entire recurring units of at least one recurring unit of formula (I) or formula (I-A):

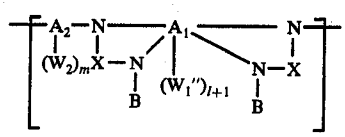

(I-A)

wherein $A_1$, $A_2$, $W_1$, m, $W_2$, l, X and B are the same as defined above with the proviso that l-1≧0 in which the formula

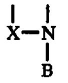

in the formula (I) or (I-A) is

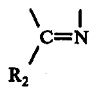

wherein $R_2$ is a hydrogen atom or an organic group having a valence of 1 to 4 comprising reacting a primary amino-containing aromatic polymer comprising (1) 30 to 100 mol%, based on the entire recurring units, of the recurring unit of the following formula (IV)

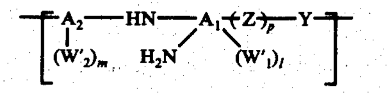

(IV)

wherein $A_1$ is an aromatic group having a valence of $(3+l)$, and the two nitrogen atoms, Z and $W'_1$ in the above formula are all bonded to the nuclear carbon atoms of the aromatic group $A_1$; $A_2$ is an organic group having a valence of $(2+m)$; Z is $—SO_2—$ or —CO—; *p* is 0 or 1, and when *p* is 0, $—A_1—$ is directly bonded to Y; Y is —0— or

in which $R_1$ is a hydrogen atom or a monovalent hydrocarbon residue; the $—NH_2$ group bonded to $A_1$ is bonded together with the —NH— group to the nuclear carbon atom at the ortho-position of the aromatic group $A_1$, $W'_1$ and $W'_2$ are identical or different and each represent at least one group selected from the group consisting of a primary amino group and mono- or di-substituted nitrogen-containing groups derived from the primary amino group; and l and m are identical or different and each represent an integer of 0 to 3 and 2. 0 to 70 mol%, based on the entire recurring units, of at least one recurring unit selected from the group consisting of;

2-A. an unsubstituted or substituted amino-containing recurring unit of formula (II)

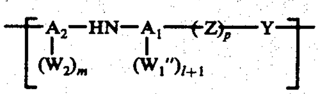

(II)

wherein $A_1$, $A_2$, Z, Y, *p*, l and m are the same as defined in formula (I); $W'_1$ and $W_2$ are identical or different and each represent at least one group selected from the group consisting of a primary amino group and mono- or di-substituted nitrogen-containing groups derived from the primary amino group, and 2-B. a third recurring unit of the formula $$-[A_3-Q_1-A_4-Q_2]-$$

(III)

wherein $A_3$ and $A_{6\ 4}$ are identical or different, and each represent an organic group having a valence of 2 to 4; and $Q_1$ and $Q_2$ are identical or different and represent a group selected from the class consisting of (c-1) 

(c-2) 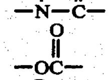

(c-3) 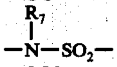

(c-4) $—OSO_2—$ (c-5) 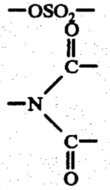

(c-6) 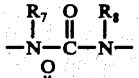

(c-7) 

and (c-8) 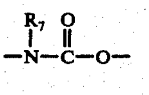

in which $R_7$ and $R_8$ are identical or different and each represent a hydrogen atom, a monovalent or divalent hydrocarbon residue or a mere bond, with the proviso that when these groups represent a divalent hydrocarbon residue or a bond, they can be bonded to $A_3$ or $A_4$; with at least one benzimidazole-forming agent containing 1 to 4 of at least one kind of ring-forming group selected from the class consisting of (a) a carboxyl group and its functional derivatives, (b) a nitrile group and its functional derivatives, (c) an aldehyde group, and (d) a tri- or di-halomethyl group.

* * * * *

UNITED STATES PATENT AND TRADEMARK OFFICE
CERTIFICATE OF CORRECTION

PATENT NO. : 4,085,090

DATED : April 18, 1978

INVENTOR(S) : Shigeyoshi Hara, et al.

It is certified that error appears in the above-identified patent and that said Letters Patent are hereby corrected as shown below:

Claim 1, column 93, line 34, delete "5" in the second instance and insert--6--

Claim 4, column 95, line 30, after "that" insert--$\ell$--

Claim 4, column 95, line 35, in the formula (I-B), insert--Y --after "$A_1$——"

Claim 13, column 99, lines 10-24, delete the formula in its entirety and insert--

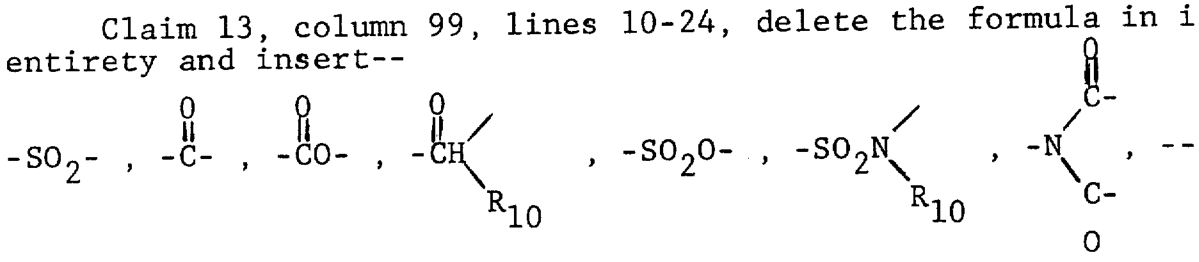

UNITED STATES PATENT AND TRADEMARK OFFICE

CERTIFICATE OF CORRECTION

PATENT NO. : 4,085,090

DATED : April 18, 1978

INVENTOR(S) : Shigeyoshi Hara, et al

It is certified that error appears in the above-identified patent and that said Letters Patent are hereby corrected as shown below:

Claim 15, column 99, line 65, after "(B-1)", insert--

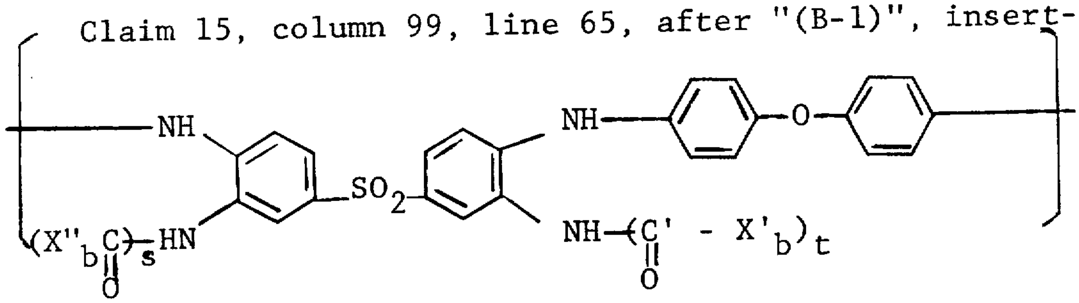

Claim 24, column 109, line 17, insert--p--after "Y,"

Signed and Sealed this

*Tenth* Day of *October 1978*

[SEAL]

*Attest:*

RUTH C. MASON
*Attesting Officer*

DONALD W. BANNER
*Commissioner of Patents and Trademarks*

UNITED STATES PATENT AND TRADEMARK OFFICE

CERTIFICATE OF CORRECTION

PATENT NO. : 4,085,090

DATED : April 18, 1978

INVENTOR(S) : Shigeyoshi Hara, et al.

It is certified that error appears in the above-identified patent and that said Letters Patent are hereby corrected as shown below:

Please Change Item [30] to read as follows --

Japanese Application No. 49-60964/74 - Filed 5/31/74

Japanese Application No. 49-63863/74 - Filed 6/7/74

Japanese Application No. 49-110427/74 - Filed 9/27/74 --

Signed and Sealed this

*Twenty-seventh* Day of *February 1979*

[SEAL]

*Attest:*

RUTH C. MASON
*Attesting Officer*

DONALD W. BANNER
*Commissioner of Patents and Trademarks*